United States Patent
Gilboa et al.

(10) Patent No.: US 11,243,959 B1
(45) Date of Patent: Feb. 8, 2022

(54) GENERATING STATISTICS USING ELECTRONIC DEVICE DATA

(71) Applicant: Amazon Technologies, Inc., Seattle, WA (US)

(72) Inventors: Aviv Gilboa, Los Angeles, CA (US); Mark Troughton, Santa Monica, CA (US); Eric S. Kuhn, Westlake Village, CA (US); Darrell Sommerlatt, Los Angeles, CA (US); Alex Jacobson, Tucson, AZ (US)

(73) Assignee: Amazon Technologies, Inc., Seattle, WA (US)

( * ) Notice: Subject to any disclaimer, the term of this patent is extended or adjusted under 35 U.S.C. 154(b) by 152 days.

(21) Appl. No.: 16/239,036

(22) Filed: Jan. 3, 2019

Related U.S. Application Data

(60) Provisional application No. 62/613,466, filed on Jan. 4, 2018.

(51) Int. Cl.
| | | |
|---|---|---|
| *G06F 16/24* | (2019.01) | |
| *G06F 16/2457* | (2019.01) | |
| *G06F 16/28* | (2019.01) | |
| *G06F 16/58* | (2019.01) | |
| *G06F 16/55* | (2019.01) | |
| *H04N 7/18* | (2006.01) | |

(52) U.S. Cl.
CPC ...... *G06F 16/24575* (2019.01); *G06F 16/285* (2019.01); *G06F 16/55* (2019.01); *G06F 16/5866* (2019.01); *H04N 7/183* (2013.01)

(58) Field of Classification Search
CPC ............. G06F 16/24575; G06F 16/285; G06F 16/5866; G06F 16/55; H04N 7/183
USPC ........................................................ 707/724
See application file for complete search history.

(56) References Cited

U.S. PATENT DOCUMENTS

| | | | |
|---|---|---|---|
| 6,405,213 B1* | 6/2002 | Layson | G08B 21/0286 |
| | | | 707/758 |
| 7,193,644 B2 | 3/2007 | Carter | |
| 8,139,098 B2 | 3/2012 | Carter | |
| 8,144,183 B2 | 3/2012 | Carter | |
| 8,154,581 B2 | 4/2012 | Carter | |
| 8,549,028 B1* | 10/2013 | Alon | G06F 16/245 |
| | | | 707/769 |
| 8,780,201 B1 | 7/2014 | Scalisi et al. | |
| 8,823,795 B1 | 9/2014 | Scalisi et al. | |

(Continued)

*Primary Examiner* — Hicham Skhoun
(74) *Attorney, Agent, or Firm* — Lee & Hayes, P.C.

(57) ABSTRACT

The present application is directed to techniques and processes for using various types of data to generate criminal statistics associated with a geographic area. For instance, a system may store first criminal statistics for a first geographical area. The system may further store image data generated by an electronic device and information describing the image data. Next, the system may determine a second geographic area for generating second criminal statistics, where at least a portion of the first geographic area is located within the second geographic area. The system may then determine that at least a portion of the first criminal statistics occurred in the second geographic area and the electronic device is located in the second geographic area. Based on the determinations, the system may generate the second criminal statistics, where the second criminal statistics includes at least a portion of the first criminal statistics and the information.

19 Claims, 28 Drawing Sheets

(56) References Cited

U.S. PATENT DOCUMENTS

| | | |
|---|---|---|
| 8,842,180 B1 | 9/2014 | Kasmir et al. |
| 8,872,915 B1 | 10/2014 | Scalisi et al. |
| 8,937,659 B1 | 1/2015 | Scalisi et al. |
| 8,941,736 B1 | 1/2015 | Scalisi |
| 8,947,530 B1 | 2/2015 | Scalisi |
| 8,953,040 B1 | 2/2015 | Scalisi et al. |
| 9,013,575 B2 | 4/2015 | Scalisi |
| 9,049,352 B2 | 6/2015 | Scalisi et al. |
| 9,053,622 B2 | 6/2015 | Scalisi |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Kasmir et al. |
| 9,094,584 B2 | 7/2015 | Scalisi et al. |
| 9,113,051 B1 | 8/2015 | Scalisi |
| 9,113,052 B1 | 8/2015 | Scalisi et al. |
| 9,118,819 B1 | 8/2015 | Scalisi et al. |
| 9,142,214 B2 | 9/2015 | Scalisi |
| 9,160,987 B1 | 10/2015 | Kasmir et al. |
| 9,165,444 B2 | 10/2015 | Scalisi |
| 9,172,920 B1 | 10/2015 | Kasmir et al. |
| 9,172,921 B1 | 10/2015 | Scalisi et al. |
| 9,172,922 B1 | 10/2015 | Kasmir et al. |
| 9,179,107 B1 | 11/2015 | Scalisi et al. |
| 9,179,108 B1 | 11/2015 | Scalisi et al. |
| 9,179,109 B1 | 11/2015 | Kasmir et al. |
| 9,196,133 B2 | 11/2015 | Scalisi et al. |
| 9,197,867 B1 | 11/2015 | Scalisi et al. |
| 9,230,424 B1 * | 1/2016 | Scalisi ............... H04L 12/2818 |
| 9,237,318 B2 | 1/2016 | Kasmir et al. |
| 9,247,219 B2 | 1/2016 | Kasmir et al. |
| 9,253,455 B1 | 2/2016 | Harrison et al. |
| 9,342,936 B2 | 5/2016 | Scalisi |
| 9,508,239 B1 | 11/2016 | Harrison et al. |
| 9,736,284 B2 | 8/2017 | Scalisi et al. |
| 9,743,049 B2 | 8/2017 | Scalisi et al. |
| 9,769,435 B2 | 9/2017 | Scalisi et al. |
| 9,786,133 B2 | 10/2017 | Harrison et al. |
| 9,799,183 B2 | 10/2017 | Harrison et al. |
| 2014/0266669 A1 * | 9/2014 | Fadell .................. G08B 19/00 340/501 |
| 2014/0368601 A1 * | 12/2014 | deCharms ............ H04L 65/403 348/14.02 |
| 2017/0289450 A1 * | 10/2017 | Lemberger ....... G08B 13/19645 |
| 2018/0184244 A1 * | 6/2018 | Bestor ................ G06K 9/00771 |

* cited by examiner

GENERATING STATISTICS USING ELECTRONIC DEVICE DATA

RELATED APPLICATIONS

This application claims priority to U.S. Provisional Patent Application No. 62/613,466, filed Jan. 4, 2018, titled "INTEGRATING AUDIO/VIDEO RECORDING AND COMMUNICATION DEVICE DATA INTO CRIMINAL STATISTICS," the entire contents of which are incorporated herein by reference.

BACKGROUND

Home security is a concern for many homeowners and renters. Those seeking to protect or monitor their homes often wish to have video and audio communications with visitors, for example, those visiting an external door or entryway. Audio/Video (A/V) recording and communication devices, such as doorbells, provide this functionality, and may also aid in crime detection and prevention. For example, audio and/or video captured by an A/V recording and communication device may be uploaded to the cloud and recorded on a remote server. Subsequent review of the A/V footage may aid law enforcement in capturing perpetrators of home burglaries and other crimes. Further, the presence of one or more A/V recording and communication devices on the exterior of a home, such as a doorbell unit at the entrance to the home, acts as a powerful deterrent against would-be burglars.

BRIEF DESCRIPTION OF THE DRAWINGS

The various example embodiments for integrating audio/video (A/V) recording and communication device data into criminal statistics now will be discussed in detail with an emphasis on highlighting the advantageous features. These embodiments depict novel and non-obvious techniques for integrating audio/video (A/V) recording and communication device data into criminal statistics, as shown in the accompanying drawings, which are for illustrative purposes only. These drawings include the following figures, in which like numerals indicate like parts.

DETAILED DESCRIPTION

Figure 1:
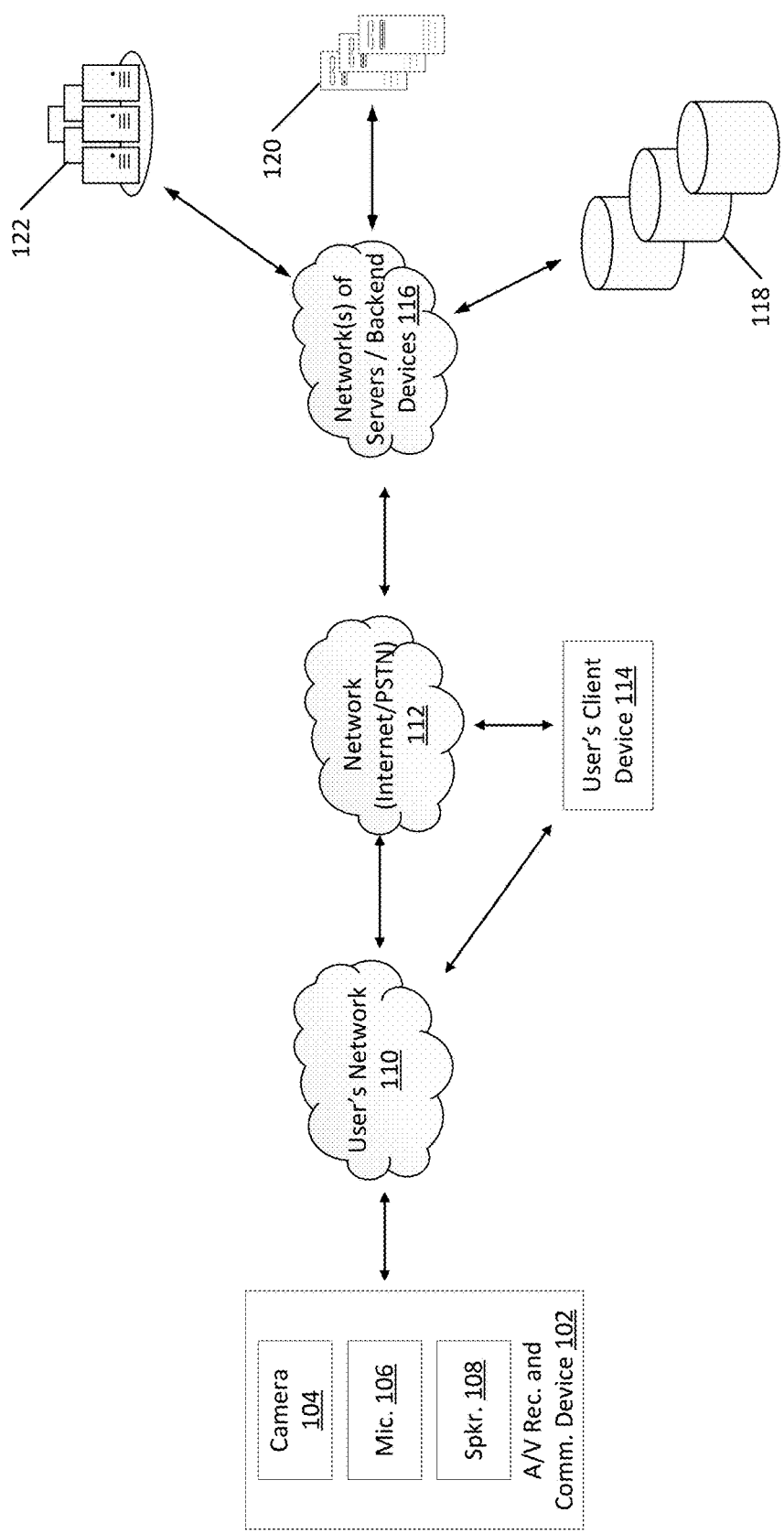
FIG. 1 is a functional block diagram illustrating an example system for streaming and storing A/V content captured by an audio/video (A/V) recording and communication device according to various aspects of the present disclosure.

The following detailed description describes the present embodiments with reference to the drawings. In the drawings, reference numbers label elements of the present embodiments. These reference numbers are reproduced below in connection with the discussion of the corresponding drawing features.

With reference to FIG. 1, the present embodiments include an audio/video (A/V) recording and communication device 102. While the present disclosure provides numerous examples of methods and systems including A/V recording and communication doorbells, the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera may include substantially all of the structure and/or functionality of the doorbells described herein, but without the front button and related components. In another example, the present embodiments may include one or more A/V recording and communication floodlight controllers instead of, or in addition to, one or more A/V recording and communication doorbells.

The A/V recording and communication device 102 may be located near the entrance to a structure (not shown), such as a dwelling, a business, a storage facility, etc. The A/V recording and communication device 102 includes a camera 104, a microphone 106, and a speaker 108. The camera 104 may comprise, for example, a high definition (HD) video camera, such as one capable of capturing video images at an image display resolution of 722p, or 1080p, 4K, or any other image display resolution. While not shown, the A/V recording and communication device 102 may also include other hardware and/or components, such as a housing, a communication module (which may facilitate wired and/or wireless communication with other devices), one or more motion sensors (and/or other types of sensors), a button, etc. The A/V recording and communication device 102 may, in some examples, further include similar componentry and/or functionality as the wireless communication doorbells described in US Patent Application Publication Nos. 2015/0022620 (application Ser. No. 14/499,828) and 2015/0022618 (application Ser. No. 14/334,922), both of which are incorporated herein by reference in their entireties as if fully set forth.

With further reference to FIG. 1, the A/V recording and communication device 102 communicates with a user's network 110, which may be for example a wired and/or wireless network. If the user's network 110 is wireless, or includes a wireless component, the network 110 may be, for example, a Wi-Fi network compatible with the IEEE 802.11 standard and/or other wireless communication standard(s). The user's network 110 is connected to another network 112, which may comprise, for example, the Internet and/or a public switched telephone network (PSTN). As described below, the A/V recording and communication device 102 may communicate with the user's client device 114 via the user's network 110 and/or the network 112 (Internet/PSTN). The user's client device 114 may comprise, for example, a mobile telephone (may also be referred to as a cellular telephone), such as a smartphone, a personal digital assistant (PDA), or another communication device. The user's client device 114 may comprise a display (not shown) and related components capable of displaying streaming and/or recorded video images. The user's client device 114 may also comprise a speaker and related components capable of broadcasting streaming and/or recorded audio, and may also comprise a microphone.

The A/V recording and communication device 102 may also communicate, via the user's network 110 and the network 112 (Internet/PSTN), with a network(s) 116 of servers and/or backend devices, such as (but not limited to) one or more remote storage devices 118 (may be referred to interchangeably as "cloud storage device(s)"), one or more backend servers 120, and one or more backend APIs 122. While FIG. 1 illustrates the storage device 118, the server 120, and the backend API 122 as components separate from the network 116, it is to be understood that the storage device 118, the server 120, and/or the backend API 122 may be considered to be components of the network 116.

The network 116 may be any wireless network or any wired network, or a combination thereof, configured to operatively couple the above-mentioned modules, devices, and systems as shown in FIG. 1. For example, the network 116 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, GPS, CDPD (cellular digital packet data), RIM (Research in Motion, Limited) duplex paging network, Bluetooth network, ZigBee network, or an IEEE 802.11-based radio frequency network. The network may further include or interface with any one or more of the following: RS-232 serial connection, IEEE-4024 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

According to one or more aspects of the present embodiments, when a person (may be referred to interchangeably as "visitor") arrives at the A/V recording and communication device 102, the A/V recording and communication device 102 detects the visitor's presence and begins capturing video images within a field of view of the camera 104. The A/V communication device 102 may also capture audio through the microphone 106. The A/V recording and communication device 102 may detect the visitor's presence by, for example, detecting motion using the camera 104 and/or a motion sensor, and/or by detecting that the visitor has pressed a front button of the A/V recording and communication device 102 (if the A/V recording and communication device 102 is a doorbell).

In response to the detection of the visitor, the A/V recording and communication device 102 transmits an alert to the user's client device 114 (FIG. 1) via the user's network 110 and the network 112. The A/V recording and communication device 102 also transmits streaming video, and may also transmit streaming audio, to the user's client device 114. If the user answers the alert, two-way audio communication may then occur between the visitor and the user through the A/V recording and communication device 102 and the user's client device 114. The user may view the visitor throughout the duration of the call, but the visitor may not see the user (unless the A/V recording and communication device 102 includes a display, which it may in some embodiments).

The video images captured by the camera 104 of the A/V recording and communication device 102 (and the audio captured by the microphone 106) may be uploaded to the cloud and recorded on the remote storage device 118 (FIG. 1). In some examples, the video images and/or audio may additionally or alternatively be stored locally by the A/V recording and communications device 102, a client device of the user, or other device in communication with the A/V recording and communications device 102. In some embodiments, the video and/or audio may be recorded on the remote storage device 118 even if the user chooses to ignore the alert sent to his or her client device 114.

With further reference to FIG. 1, the system may further comprise a backend API 122 including one or more components. A backend API (application programming interface) may comprise, for example, a server (e.g. a real server, or a virtual machine, or a machine running in a cloud infrastructure as a service), or multiple servers networked together, exposing at least one API to client(s) accessing it. These servers may include components such as application servers (e.g. software servers), depending upon what other components are included, such as a caching layer, or database layers, or other components. A backend API may, for example, comprise many such applications, each of which communicate with one another using their public APIs. In some embodiments, the API backend may hold the bulk of the user data and offer the user management capabilities, leaving the clients to have very limited state.

The backend API 122 illustrated FIG. 1 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API may ease the work of programming GUI components. For example, an API may facilitate integration of new features into existing applications (a so-called "plug-in API"). An API may also assist otherwise distinct applications with sharing data, which may help to integrate and enhance the functionalities of the applications.

The backend API 122 illustrated in FIG. 1 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components may both be run on the same machine. Clients and servers may have a user interface, and sometimes other hardware associated with them.

Figure 2:
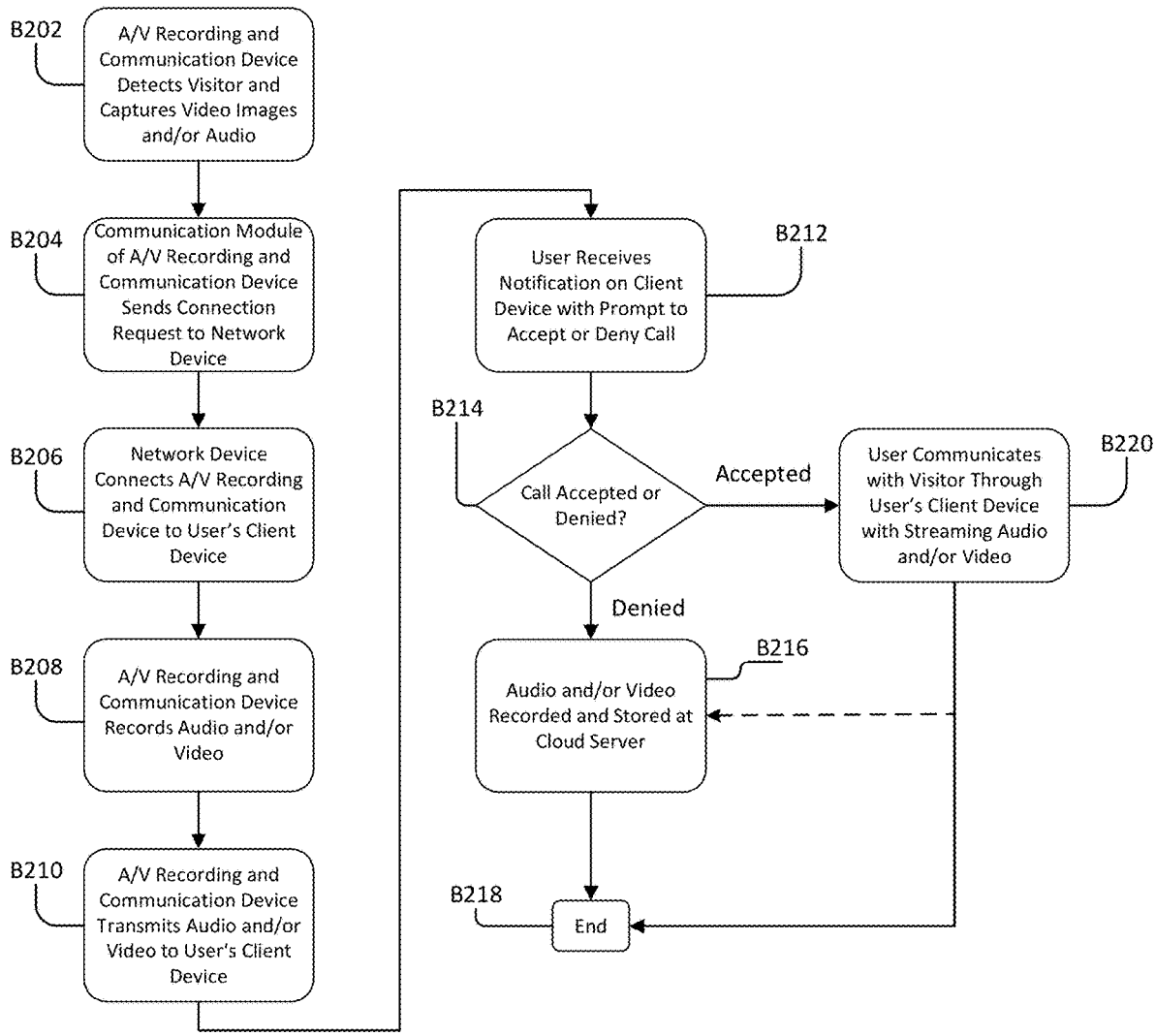
FIG. 2 is a flowchart illustrating an example process for streaming and storing A/V content from an A/V recording and communication device according to various aspects of the present disclosure.

FIG. 2 is a flowchart illustrating a process for streaming and storing A/V content from the A/V recording and communication device 102 according to various aspects of the present disclosure. At block B202, the A/V recording and communication device 102 detects the visitor's presence and captures video images within a field of view of the camera 104. The A/V recording and communication device 102 may also capture audio through the microphone 106. As described above, the A/V recording and communication device 102 may detect the visitor's presence by detecting motion using the camera 104 and/or a motion sensor, and/or by detecting that the visitor has pressed a front button of the A/V recording and communication device 102 (if the A/V recording and communication device 102 is a doorbell). Also, as described above, the video recording/capture may begin when the visitor is detected, or may begin earlier, as described below.

At block B204, a communication module of the A/V recording and communication device 102 transmits a connection request, via the user's network 110 and the network 112, to a device in the network 112. For example, the network device to which the request is sent may be a server such as the server 120. The server 120 may comprise a computer program and/or a machine that waits for requests from other machines or software (clients) and responds to them. A server typically processes data. One purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes. In another example, the network device to which the request is sent may be an API such as the backend API 122, which is described above.

In response to the request, at block B206 the network device may connect the A/V recording and communication device 102 to the user's client device 114 through the user's network 110 and the network 112. At block B208, the A/V recording and communication device 102 may record available audio and/or video data using the camera 104, the microphone 106, and/or any other device/sensor available. At block B208, the audio and/or video data is transmitted (streamed) from the A/V recording and communication device 102 to the user's client device 114 via the user's network 110 and the network 112. At block B212, the user may receive a notification on his or her client device 114 with a prompt to either accept or deny the call.

At block B214, the process determines whether the user has accepted or denied the call. If the user denies the notification, then the process advances to block B216, where the audio and/or video data is recorded and stored at a cloud server. The session then ends at block B218 and the connection between the A/V recording and communication device 102 and the user's client device 114 is terminated. If, however, the user accepts the notification, then at block B220 the user communicates with the visitor through the user's client device 114 while audio and/or video data captured by the camera 104, the microphone 106, and/or other devices/sensors is streamed to the user's client device 114. At the end of the call, the user may terminate the connection between the user's client device 114 and the A/V recording and communication device 102 and the session ends at block B220. In some embodiments, the audio and/or video data may be recorded and stored at a cloud server (block B216) even if the user accepts the notification and communicates with the visitor through the user's client device 114.

Figure 3:
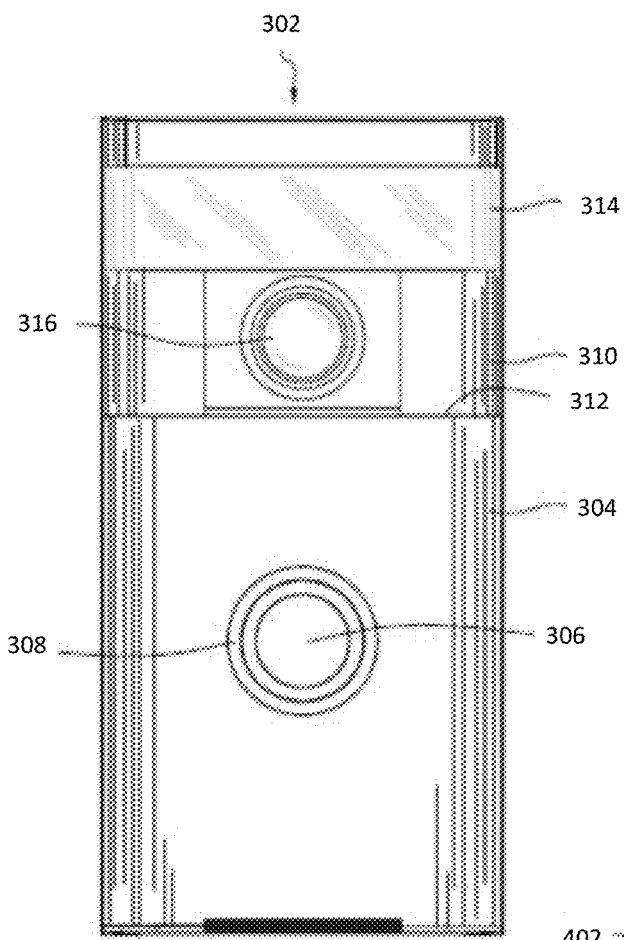
FIG. 3 is a front view of an example A/V recording and communication doorbell according to various aspects of the present disclosure.
Figure 4:
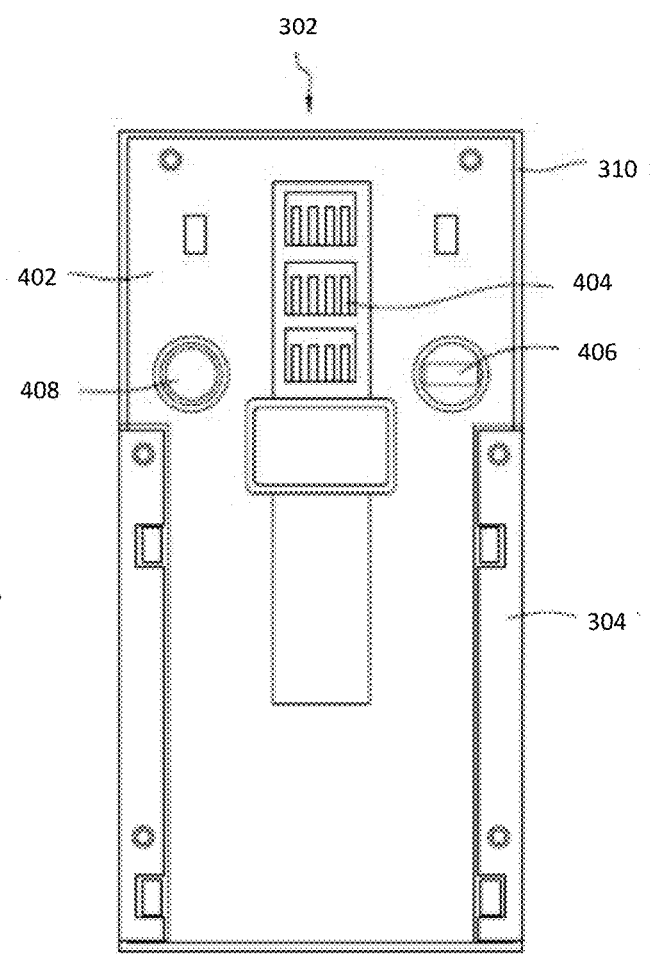
FIG. 4 is a rear view of the example A/V recording and communication doorbell of FIG. 3.
Figure 5:
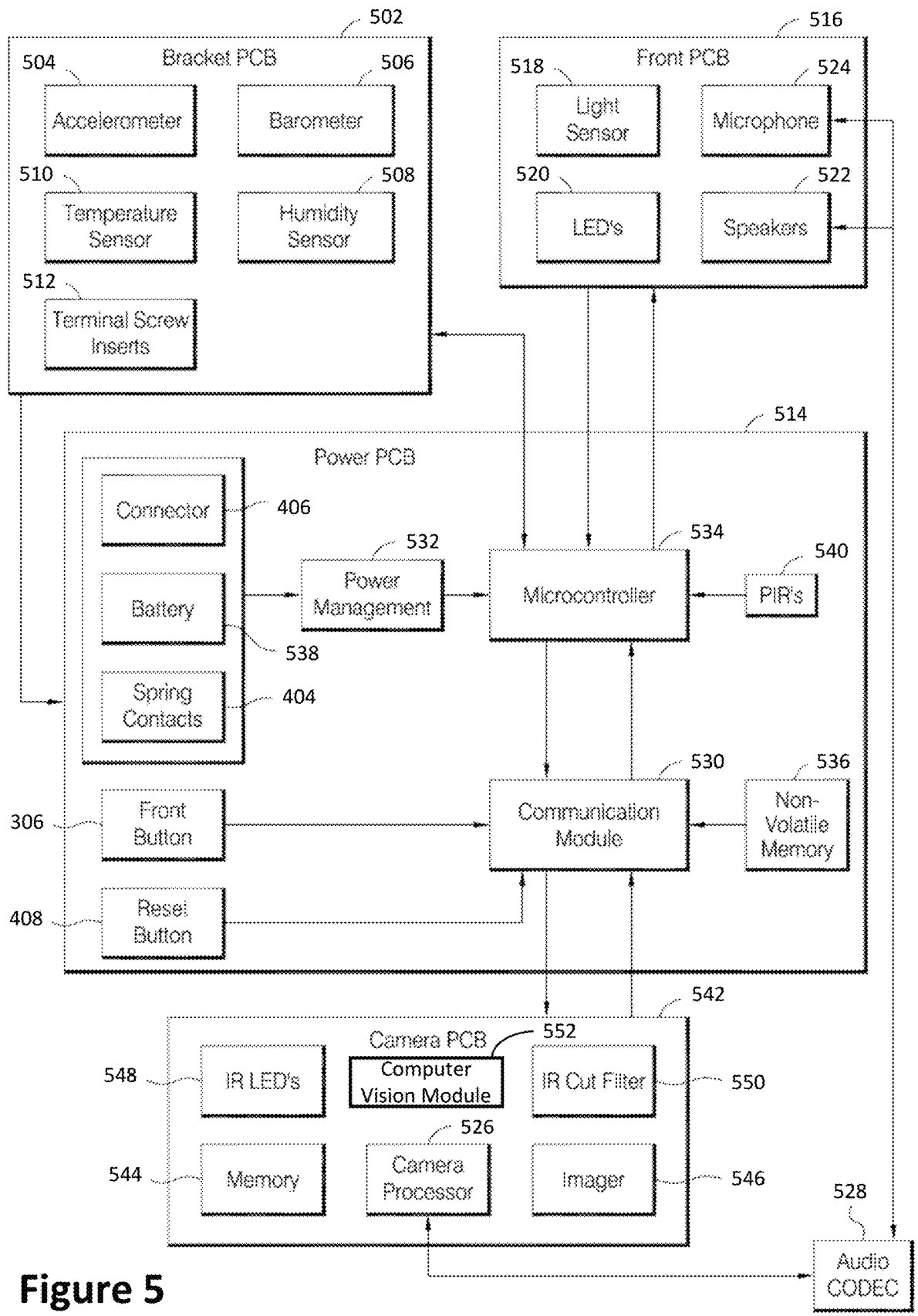
FIG. 5 is a functional block diagram of example components of the A/V recording and communication doorbell of FIGS. 3 and 4.

FIGS. 3-5 illustrate an audio/video (A/V) communication doorbell 302 (also referred to a "doorbell 302" or "video doorbell 302") according to an aspect of present embodiments. FIG. 3 is a front view, FIG. 4 is a rear view, and FIG. 5 is a functional block diagram of the components within or in communication with the doorbell 302. With reference to FIG. 3, the doorbell 302 includes a faceplate 304 mounted to a back plate 402 (FIG. 4). The faceplate 304 may comprise any suitable material, including, without limitation, metals, such as brushed aluminum or stainless steel, metal alloys, or plastics. The faceplate 304 protects the internal contents of the doorbell 302 and serves as an exterior front surface of the doorbell 302.

With reference to FIG. 3, the faceplate 304 includes a button 306 and a light pipe 308. The button 306 and the light pipe 308 may have various profiles that may or may not match the profile of the faceplate 304. The light pipe 308 may comprise any suitable material, including, without limitation, transparent plastic, that is capable of allowing light produced within the doorbell 302 to pass through. The light may be produced by one or more light-emitting components, such as light-emitting diodes (LED's), contained within the doorbell 302, as further described below. The button 306 may make contact with a button actuator (not shown) located within the doorbell 302 when the button 306 is pressed by a visitor. When pressed, the button 306 may trigger one or more functions of the doorbell 302, as further described below.

With further reference to FIG. 3, the doorbell 302 further includes an enclosure 310 that engages the faceplate 304. In the illustrated embodiment, the enclosure 310 abuts an upper edge 312 of the faceplate 304, but in alternative embodiments one or more gaps between the enclosure 310 and the faceplate 304 may facilitate the passage of sound and/or light through the doorbell 302. The enclosure 310 may comprise any suitable material, but in some embodiments the material of the enclosure 310 preferably permits infrared light to pass through from inside the doorbell 302 to the environment and vice versa. The doorbell 302 further includes a lens 314. In some embodiments, the lens 314 may comprise a Fresnel lens, which may be patterned to deflect incoming light into one or more infrared sensors located within the doorbell 302. The doorbell 302 further includes a camera 316, which captures video data when activated, as described below.

FIG. 4 is a rear view of the doorbell 302, according to an aspect of the present embodiments. As illustrated, the enclosure 310 may extend from the front of the doorbell 302 around to the back thereof and may fit snugly around a lip of the back plate 402. The back plate 402 may comprise any suitable material, including, without limitation, metals, such as brushed aluminum or stainless steel, metal alloys, or plastics. The back plate 402 protects the internal contents of the doorbell 302 and serves as an exterior rear surface of the doorbell 302. The faceplate 304 may extend from the front of the doorbell 302 and at least partially wrap around the back plate 402, thereby allowing a coupled connection between the faceplate 304 and the back plate 402. The back plate 402 may have indentations in its structure to facilitate the coupling.

With further reference to FIG. 4, spring contacts 404 may provide power to the doorbell 302 when mated with other conductive contacts connected to a power source. The spring contacts 404 may comprise any suitable conductive material, including, without limitation, copper, and may be capable of deflecting when contacted by an inward force, for example the insertion of a mating element. The doorbell 302 further comprises a connector 406, such as a micro-USB or other connector, whereby power and/or data may be supplied to and from the components within the doorbell 302. A reset button 408 may be located on the back plate 402, and may make contact with a button actuator (not shown) located within the doorbell 302 when the reset button 408 is pressed. When the reset button 408 is pressed, it may trigger one or more functions, as described below.

FIG. 5 is a functional block diagram of the components within or in communication with the doorbell 302, according to an aspect of the present embodiments. A bracket PCB 502 may comprise an accelerometer 504, a barometer 506, a humidity sensor 508, and a temperature sensor 510. The accelerometer 504 may be one or more sensors capable of sensing motion and/or acceleration. The barometer 506 may be one or more sensors capable of determining the atmospheric pressure of the surrounding environment in which the bracket PCB 502 may be located. The humidity sensor 508 may be one or more sensors capable of determining the amount of moisture present in the atmospheric environment in which the bracket PCB 502 may be located. The temperature sensor 510 may be one or more sensors capable of determining the temperature of the ambient environment in which the bracket PCB 502 may be located. The bracket PCB 502 may be located outside the housing of the doorbell 302 so as to reduce interference from heat, pressure, moisture, and/or other stimuli generated by the internal components of the doorbell 302.

With further reference to FIG. 5, the bracket PCB 502 may further comprise terminal screw inserts 512, which may be configured to receive terminal screws (not shown) for transmitting power to electrical contacts on a mounting bracket (not shown). The bracket PCB 502 may be electrically and/or mechanically coupled to the power PCB 514 through the terminal screws, the terminal screw inserts 512, the spring contacts 404, and the electrical contacts. The terminal screws may receive electrical wires located at the surface to which the doorbell 302 is mounted, such as the wall of a building, so that the doorbell may receive electrical power from the building's electrical system. Upon the terminal screws being secured within the terminal screw inserts 512, power may be transferred to the bracket PCB 502, and to all of the components associated therewith, including the electrical contacts. The electrical contacts may transfer electrical power to the power PCB 514 by mating with the spring contacts 404.

With further reference to FIG. 5, the front PCB 516 may comprise a light sensor 518, one or more light-emitting components, such as LED's 520, one or more speakers 522, and a microphone 524. The light sensor 518 may be one or more sensors capable of detecting the level of ambient light of the surrounding environment in which the doorbell 302 may be located. LED's 520 may be one or more light-emitting diodes capable of producing visible light when supplied with power. The speakers 522 may be any electro-mechanical device capable of producing sound in response to an electrical signal input. The microphone 524 may be an acoustic-to-electric transducer or sensor capable of converting sound waves into an electrical signal. When activated, the LED's 520 may illuminate the light pipe 308 (FIG. 3). The front PCB 516 and all components thereof may be electrically coupled to the power PCB 514, thereby allowing data and/or power to be transferred to and from the power PCB 514 and the front PCB 516.

The speakers 522 and the microphone 524 may be coupled to the camera processor 526 through an audio CODEC 528. For example, the transfer of digital audio from the user's client device 114 and the speakers 522 and the microphone 524 may be compressed and decompressed using the audio CODEC 528, coupled to the camera processor 526. Once compressed by audio CODEC 528, digital audio data may be sent through the communication module 530 to the network 112, routed by the one or more servers 120, and delivered to the user's client device 114. When the user speaks, after being transferred through the network 112, digital audio data is decompressed by audio CODEC 528 and emitted to the visitor via the speakers 522.

With further reference to FIG. 5, the power PCB 514 may comprise a power management module 532, a microcontroller 534 (may also be referred to as "processor," "CPU," or "controller"), the communication module 530, and power PCB non-volatile memory 536. In certain embodiments, the power management module 532 may comprise an integrated circuit capable of arbitrating between multiple voltage rails, thereby selecting the source of power for the doorbell 302. The battery 538, the spring contacts 404, and/or the connector 406 may each provide power to the power management module 532. The power management module 532 may have separate power rails dedicated to the battery 538, the spring contacts 404, and the connector 406. In one aspect of the present disclosure, the power management module 532 may continuously draw power from the battery 538 to power the doorbell 302, while at the same time routing power from the spring contacts 404 and/or the connector 406 to the battery 538, thereby allowing the battery 538 to maintain a substantially constant level of charge. Alternatively, the power management module 532 may continuously draw power from the spring contacts 404 and/or the connector 406 to power the doorbell 302, while only drawing from the battery 538 when the power from the spring contacts 404 and/or the connector 406 is low or insufficient. Still further, the battery 538 may comprise the sole source of power for the doorbell 302. In such embodiments, the spring contacts 404 may not be connected to a source of power. When the battery 538 is depleted of its charge, it may be recharged, such as by connecting a power source to the connector 406. The power management module 532 may also serve as a conduit for data between the connector 406 and the microcontroller 534.

With further reference to FIG. 5, in certain embodiments the microcontroller 534 may comprise an integrated circuit including a processor core, memory, and programmable input/output peripherals. The microcontroller 534 may receive input signals, such as data and/or power, from the PIR sensors 540, the bracket PCB 502, the power management module 532, the light sensor 518, the microphone 524, and/or the communication module 530, and may perform various functions as further described below. When the microcontroller 534 is triggered by the PIR sensors 540, the microcontroller 534 may be triggered to perform one or more functions. When the light sensor 518 detects a low level of ambient light, the light sensor 518 may trigger the microcontroller 534 to enable "night vision," as further described below. The microcontroller 534 may also act as a conduit for data communicated between various components and the communication module 530.

With further reference to FIG. 5, the communication module 530 may comprise an integrated circuit including a processor core, memory, and programmable input/output peripherals. The communication module 530 may also be configured to transmit data wirelessly to a remote network device, and may include one or more transceivers (not shown). The wireless communication may comprise one or more wireless networks, such as, without limitation, Wi-Fi, cellular, Bluetooth, and/or satellite networks. The communication module 530 may receive inputs, such as power and/or data, from the camera PCB 542, the microcontroller 534, the button 306, the reset button 408, and/or the power PCB non-volatile memory 536. When the button 306 is pressed, the communication module 530 may be triggered to perform one or more functions. When the reset button 408 is pressed, the communication module 530 may be triggered to erase any data stored at the power PCB non-volatile memory 536 and/or at the camera PCB memory 544. The communication module 530 may also act as a conduit for data communicated between various components and the microcontroller 534. The power PCB non-volatile memory 536 may comprise flash memory configured to store and/or transmit data. For example, in certain embodiments the power PCB non-volatile memory 536 may comprise serial peripheral interface (SPI) flash memory.

With further reference to FIG. 5, the camera PCB 542 may comprise components that facilitate the operation of the camera 316. For example, an imager 546 may comprise a video recording sensor and/or a camera chip. In one aspect of the present disclosure, the imager 546 may comprise a complementary metal-oxide semiconductor (CMOS) array, and may be capable of recording high definition (e.g., 722p, 1080p, 4K, etc.) video files. A camera processor 526 may comprise an encoding and compression chip. In some embodiments, the camera processor 526 may comprise a bridge processor. The camera processor 526 may process video recorded by the imager 546 and audio recorded by the microphone 524, and may transform this data into a form suitable for wireless transfer by the communication module 530 to a network. The camera PCB memory 544 may comprise volatile memory that may be used when data is being buffered or encoded by the camera processor 526. For example, in certain embodiments the camera PCB memory 544 may comprise synchronous dynamic random access memory (SD RAM). IR LED's 548 may comprise light-emitting diodes capable of radiating infrared light. IR cut filter 550 may comprise a system that, when triggered, configures the imager 546 to see primarily infrared light as opposed to visible light. When the light sensor 518 detects a low level of ambient light (which may comprise a level that impedes the performance of the imager 546 in the visible spectrum), the IR LED's 548 may shine infrared light through the doorbell 302 enclosure out to the environment, and the IR cut filter 550 may enable the imager 546 to see this infrared light as it is reflected or refracted off of objects within the field of view of the doorbell. This process may provide the doorbell 302 with the "night vision" function mentioned above. As also shown in FIG. 5, the camera PCB 542 includes a computer vision module 552, which is described in greater detail below.

As discussed above, the present disclosure provides numerous examples of methods and systems including A/V recording and communication doorbells, but the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera may include substantially all of the structure and functionality of the doorbell 302, but without the front button 306 and its associated components. An example A/V recording and communication security camera may further omit other components, such as, for example, the bracket PCB 502 and its associated components.

Figure 6:
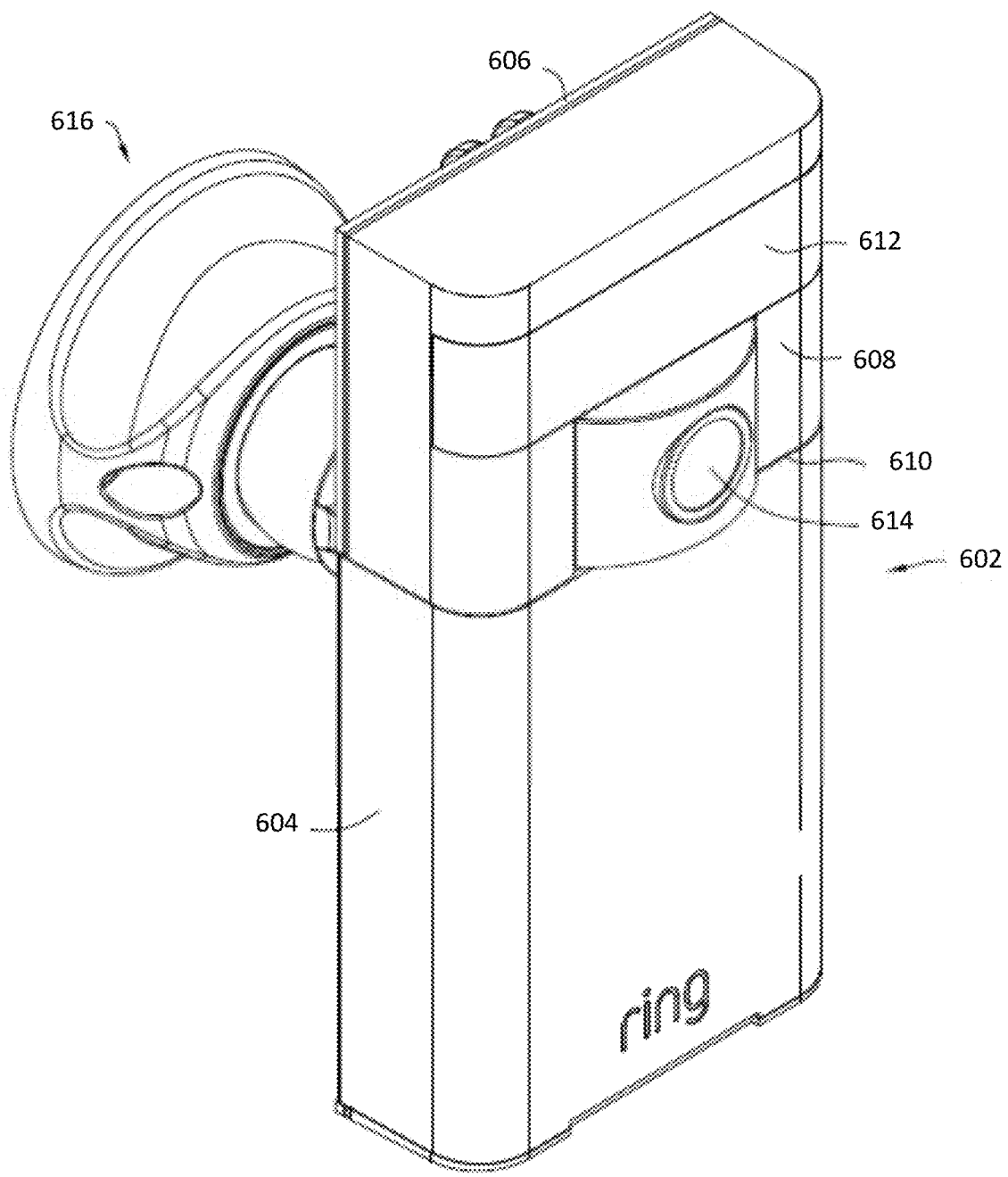
FIG. 6 is an upper front perspective view of an example A/V recording and communication security camera according to various aspects of the present disclosure.
Figure 7:
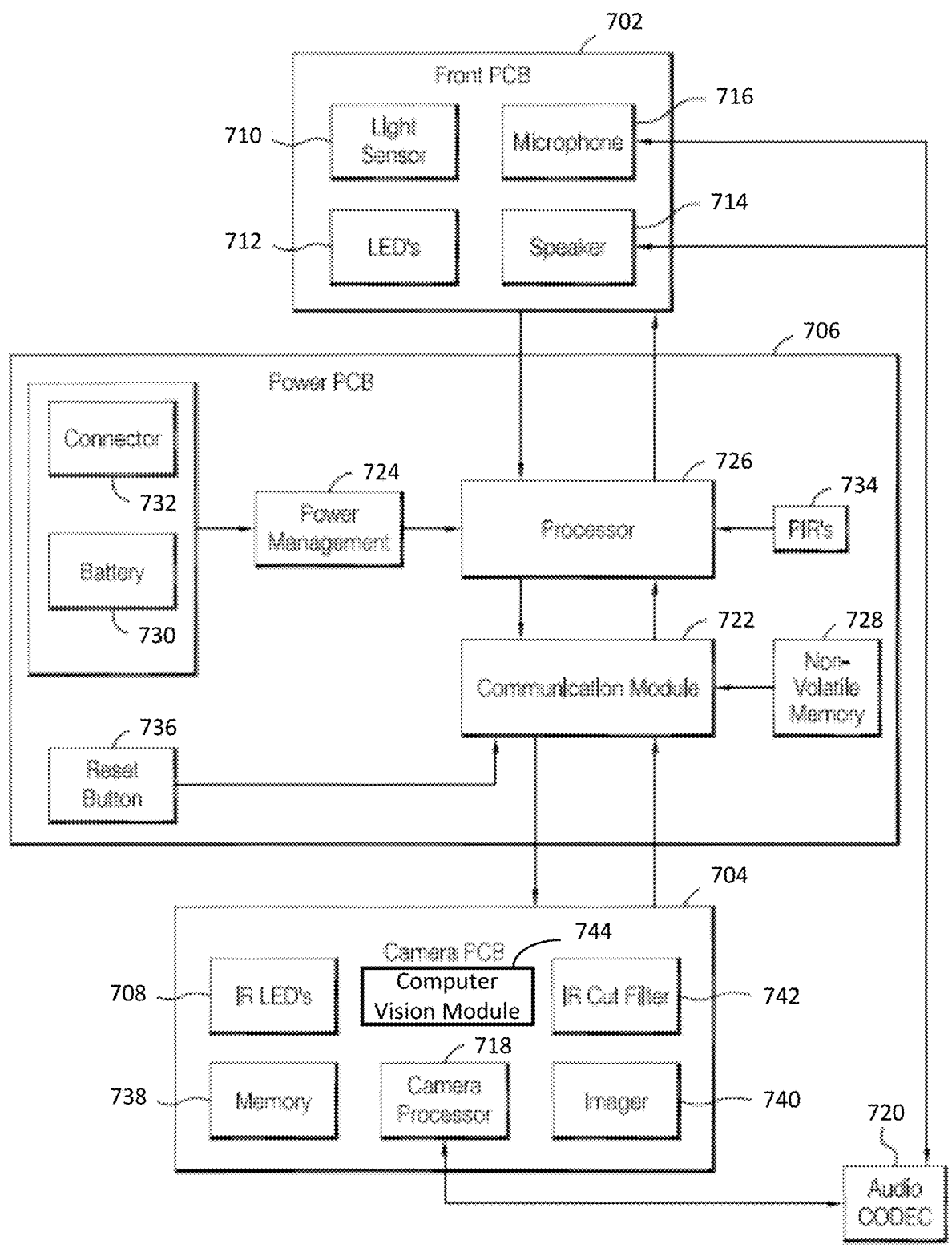
FIG. 7 is a functional block diagram of example components of the A/V recording and communication security camera of FIG. 6.

FIGS. 6 and 7 illustrate an example A/V recording and communication security camera according to various aspects of the present embodiments. With reference to FIG. 6, the security camera 602, similar to the video doorbell 302, includes a faceplate 604 that is mounted to a back plate 606 and an enclosure 608 that engages the faceplate 604. Collectively, the faceplate 304, the back plate 402, and the enclosure 310 form a housing that contains and protects the inner components of the security camera 602. However, unlike the video doorbell 302, the security camera 602 does not include any front button 306 for activating the doorbell. The faceplate 604 may comprise any suitable material, including, without limitation, metals, such as brushed aluminum or stainless steel, metal alloys, or plastics. The faceplate 604 protects the internal contents of the security camera 602 and serves as an exterior front surface of the security camera 602.

With continued reference to FIG. 6, the enclosure 608 engages the faceplate 604 and abuts an upper edge 610 of the faceplate 604. As discussed above with reference to FIG. 3, in alternative embodiments, one or more gaps between the enclosure 608 and the faceplate 604 may facilitate the passage of sound and/or light through the security camera 602. The enclosure 608 may comprise any suitable material, but in some embodiments the material of the enclosure 608 preferably permits infrared light to pass through from inside the security camera 602 to the environment and vice versa. The security camera 602 further includes a lens 612. Again, similar to the video doorbell 302, in some embodiments, the lens may comprise a Fresnel lens, which may be patterned to deflect incoming light into one or more infrared sensors located within the security camera 602. The security camera 602 further includes a camera 614, which captures video data when activated, as described above and below.

With further reference to FIG. 6, the enclosure 608 may extend from the front of the security camera 602 around to the back thereof and may fit snugly around a lip (not shown) of the back plate 606. The back plate 606 may comprise any suitable material, including, without limitation, metals, such as brushed aluminum or stainless steel, metal alloys, or plastics. The back plate 606 protects the internal contents of the security camera 602 and serves as an exterior rear surface of the security camera 602. The faceplate 604 may extend from the front of the security camera 602 and at least partially wrap around the back plate 606, thereby allowing a coupled connection between the faceplate 604 and the back plate 606. The back plate 606 may have indentations (not shown) in its structure to facilitate the coupling.

With continued reference to FIG. 6, the security camera 602 further comprises a mounting apparatus 616. The mounting apparatus 616 facilitates mounting the security camera 602 to a surface, such as an interior or exterior wall of a building, such as a home or office. The faceplate 604 may extend from the bottom of the security camera 602 up to just below the camera 614, and connect to the back plate 606 as described above. The lens 612 may extend and curl partially around the side of the security camera 602. The enclosure 608 may extend and curl around the side and top of the security camera 602, and may be coupled to the back plate 606 as described above. The camera 614 may protrude from the enclosure 608, thereby giving it a wider field of view. The mounting apparatus 616 may couple with the back plate 606, thereby creating an assembly including the security camera 602 and the mounting apparatus 616. The couplings described in this paragraph, and elsewhere, may be secured by, for example and without limitation, screws, interference fittings, adhesives, or other fasteners. Interference fittings may refer to a type of connection where a material relies on pressure and/or gravity coupled with the material's physical strength to support a connection to a different element.

FIG. 7 is a functional block diagram of the components of the A/V recording and communication security camera of FIG. 6. With reference to FIG. 7, the interior of the wireless security camera 602 comprises a plurality of printed circuit boards, including a front PCB 702, a camera PCB 704, and a power PCB 706, each of which is described below. The camera PCB 704 comprises various components that enable the functionality of the camera 614 of the security camera 602, as described below. Infrared light-emitting components, such as infrared LED's 708, are coupled to the camera PCB 704 and may be triggered to activate when a light sensor detects a low level of ambient light. When activated, the infrared LED's 708 may emit infrared light through the enclosure 608 and/or the camera 614 out into the ambient environment. The camera 614, which may be configured to detect infrared light, may then capture the light emitted by the infrared LED's 708 as it reflects off objects within the camera's 614 field of view, so that the security camera 602 may clearly capture images at night (may be referred to as "night vision").

The front PCB 702 comprises various components that enable the functionality of the audio and light components, including a light sensor 710, LED's 712, one or more speakers 714, and a microphone 716. The light sensor 710 may be one or more sensors capable of detecting the level of ambient light of the surrounding environment in which the security camera 602 may be located. The speakers 714 may be any electromechanical device capable of producing sound in response to an electrical signal input. The microphone 716 may be an acoustic-to-electric transducer or sensor capable of converting sound waves into an electrical signal. The front PCB 702 and all components thereof may be electrically coupled to the power PCB 706, thereby allowing data and/or power to be transferred to and from the power PCB 706 and the front PCB 702.

The speakers 714 and the microphone 716 may be coupled to a camera processor 718 on the camera PCB 704 through an audio CODEC 720. For example, the transfer of digital audio from the user's client device 114 and the speakers 714 and the microphone 716 may be compressed and decompressed using the audio CODEC 720, coupled to the camera processor 718. Once compressed by audio CODEC 720, digital audio data may be sent through the communication module 722 to the network 112, routed by one or more servers 120, and delivered to the user's client device 114. When the user speaks, after being transferred through the network 112, digital audio data is decompressed by audio CODEC 720 and emitted to the visitor via the speakers 714.

With continued reference to FIG. 7, the power PCB 706 comprises various components that enable the functionality of the power and device-control components, including a power management module 724, a processor 726 a communication module 722, and power PCB non-volatile memory 728. In certain embodiments, the power management module 724 may comprise an integrated circuit capable of arbitrating between multiple voltage rails, thereby selecting the source of power for the security camera 602. The battery 730 and/or the connector 406 may each provide power to the power management module 532. The power management module 724 (which may be similar to connector 406) may have separate power rails dedicated to the battery 730 and the connector 732. The power management module 724 may control charging of the battery 730 when the connector 732 is connected to an external source of power, and may also serve as a conduit for data between the connector 732 and the processor 726.

With further reference to FIG. 7, in certain embodiments the processor 726 may comprise an integrated circuit including a processor core, memory, and programmable input/output peripherals. The processor 726 may receive input signals, such as data and/or power, from the PIR sensors 734, the power management module 724, the light sensor 710, the microphone 716, and/or the communication module 722, and may perform various functions as further described below. When the processor 726 is triggered by the PIR sensors 734, the processor 726 may be triggered to perform one or more functions, such as initiating recording of video images via the camera 614. When the light sensor 710 detects a low level of ambient light, the light sensor 710 may trigger the processor 726 to enable "night vision," as further described below. The processor 726 may also act as a conduit for data communicated between various components and the communication module 722.

With further reference to FIG. 7, the security camera 602 further comprises a communication module 722 coupled to the power PCB 706. The communication module 722 facilitates communication with devices in one or more remote locations, as further described below. The communication module 722 may comprise an integrated circuit including a processor core, memory, and programmable input/output peripherals. The communication module 722 may also be configured to transmit data wirelessly to a remote network device, such as the user's client device 114, the remote storage device 118, and/or the remote server 120, and may include one or more transceivers (not shown). The wireless communication may comprise one or more wireless networks, such as, without limitation, Wi-Fi, cellular, Bluetooth, and/or satellite networks. The communication module 722 may receive inputs, such as power and/or data, from the camera PCB 704, the processor 726, the reset button 736 (which may be similar to the reset button 408), and/or the power PCB non-volatile memory 728. When the reset button 736 is pressed, the communication module 722 may be triggered to erase any data stored at the power PCB non-volatile memory 728 and/or at the camera PCB memory 738. The communication module 722 may also act as a conduit for data communicated between various components and the processor 726. The power PCB non-volatile memory 728 may comprise flash memory configured to store and/or transmit data. For example, in certain embodiments the power PCB non-volatile memory 728 may comprise serial peripheral interface (SPI) flash memory.

With continued reference to FIG. 7, the power PCB 514 further comprises the connector 406 described above and a battery 538. The connector 406 may protrude outward from the power PCB 514 and extend through a hole in the back plate 402. The battery 538, which may be a rechargeable battery, may provide power to the components of the security camera 602.

With continued reference to FIG. 7, the power PCB 706 further comprises passive infrared (PIR) sensors 734, which may be secured on or within a PIR sensor holder (not shown) that resides behind the lens 612 (FIG. 6). The PIR sensors 734 may be any type of sensor capable of detecting and communicating the presence of a heat source within their field of view. Further, alternative embodiments may comprise one or more motion sensors either in place of or in addition to the PIR sensors 734. The motion sensors may be configured to detect motion using any methodology, such as a methodology that does not rely on detecting the presence of a heat source within a field of view.

With further reference to FIG. 7, the camera PCB 704 may comprise components that facilitate the operation of the camera 614. For example, an imager 740 may comprise a video recording sensor and/or a camera chip. In one aspect of the present disclosure, the imager 740 may comprise a complementary metal-oxide semiconductor (CMOS) array, and may be capable of recording high definition (e.g., 722p or better) video files. A camera processor 718 may comprise an encoding and compression chip. In some embodiments, the camera processor 718 may comprise a bridge processor. The camera processor 718 may process video recorded by the imager 740 and audio recorded by the microphone 716, and may transform this data into a form suitable for wireless transfer by the communication module 722 to a network. The camera PCB memory 738 may comprise volatile memory that may be used when data is being buffered or encoded by the camera processor 718. For example, in certain embodiments the camera PCB memory 738 may comprise synchronous dynamic random access memory (SD RAM). IR LED's 708 may comprise light-emitting diodes capable of radiating infrared light. IR cut filter 742 may comprise a system that, when triggered, configures the imager 740 to see primarily infrared light as opposed to visible light. When the light sensor 710 detects a low level of ambient light (which may comprise a level that impedes the performance of the imager 740 in the visible spectrum), the IR LED's 708 may shine infrared light through the security camera 602 enclosure out to the environment, and the IR cut filter 742 may enable the imager 740 to see this infrared light as it is reflected or refracted off of objects within the field of view of the doorbell. This process may provide the security camera 602 with the "night vision" function mentioned above.

The camera PCB 704 further includes a computer vision module 744. Functionality of the computer vision module 744 is described in greater detail below.

Figure 8:
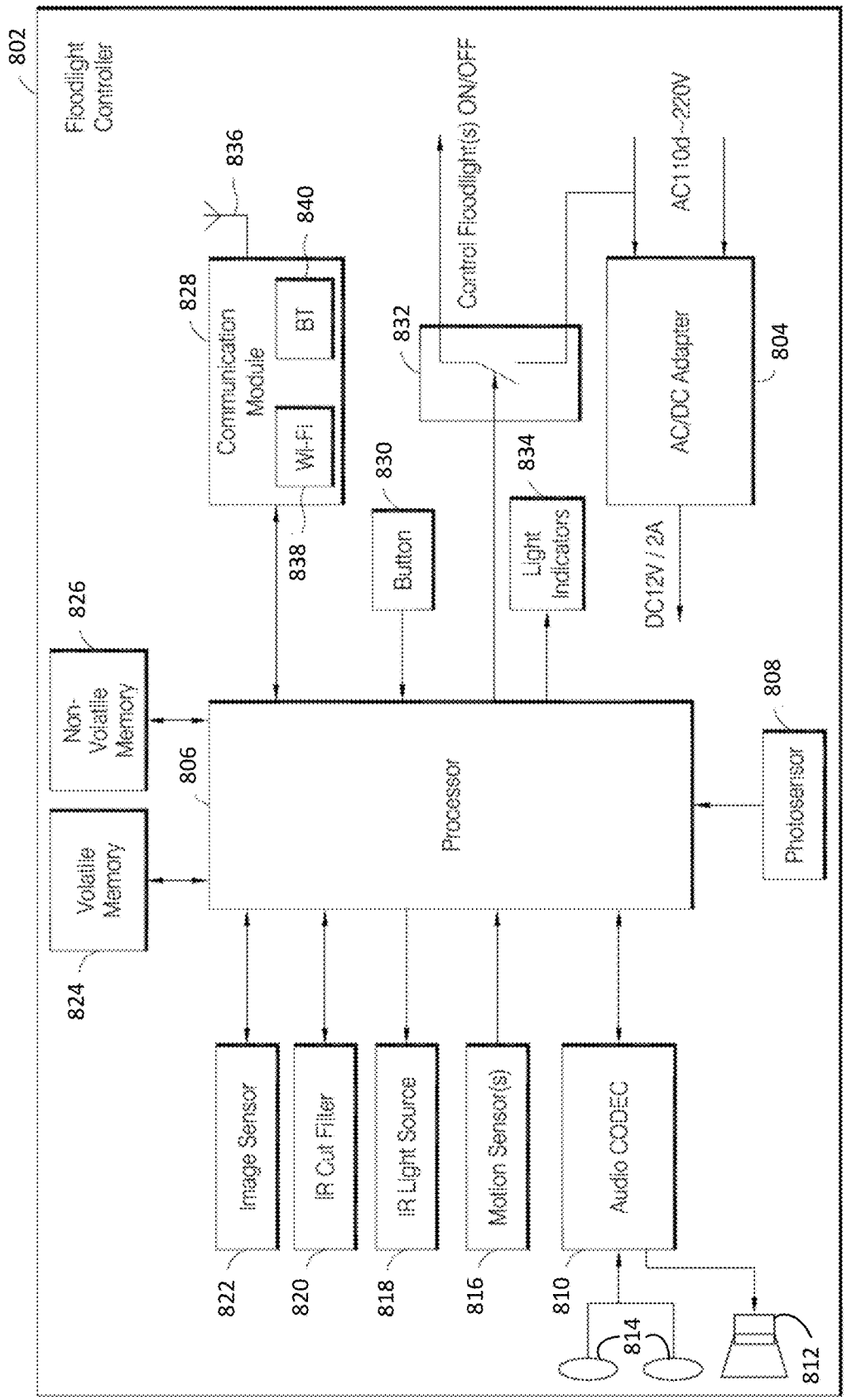
FIG. 8 is a functional block diagram of example components of a floodlight controller with A/V recording and communication features according to various aspects of the present disclosure.
Figure 9:
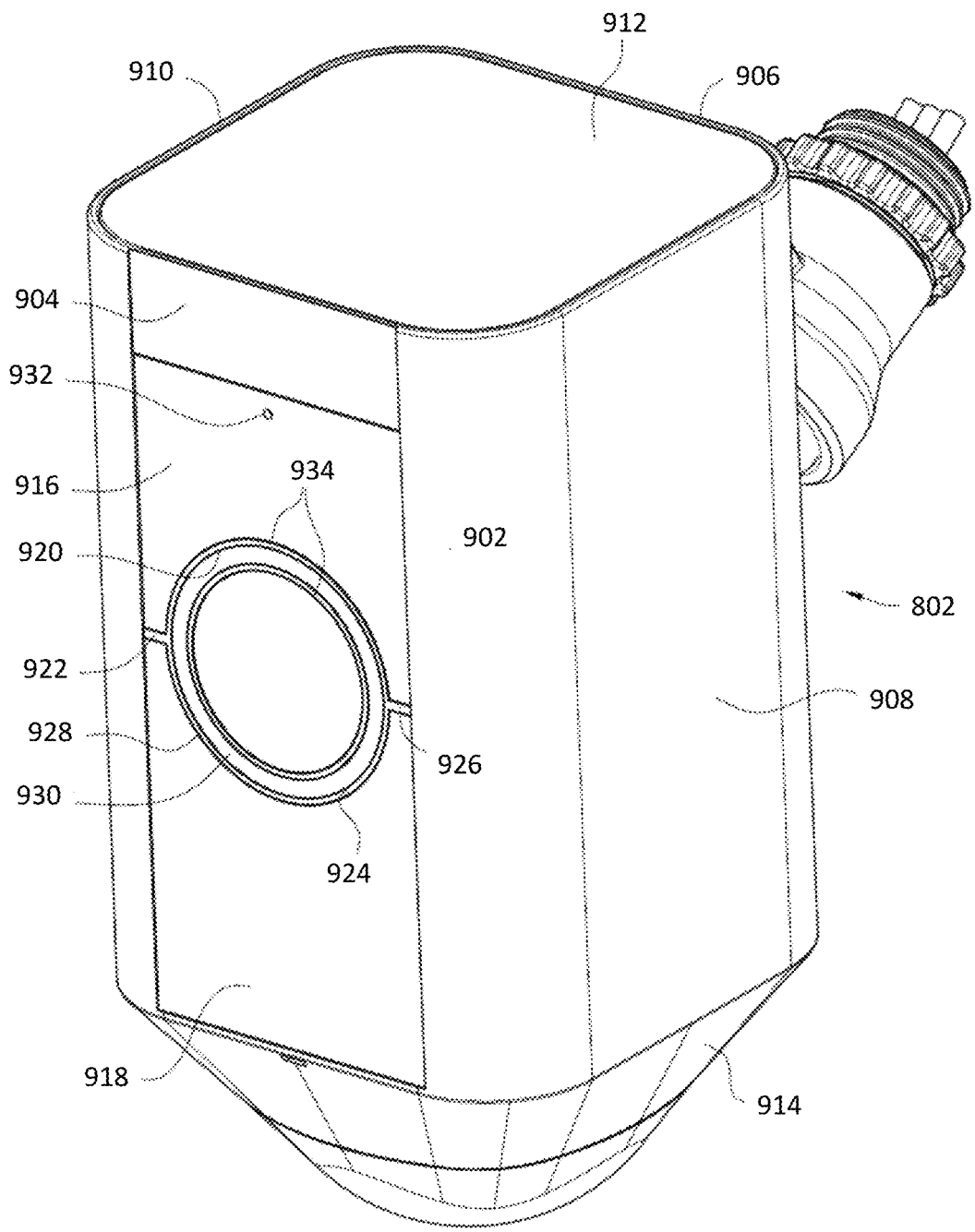
FIG. 9 is an upper front perspective view of an example floodlight controller with A/V recording and communication features according to various aspects of the present disclosure.
Figure 10:
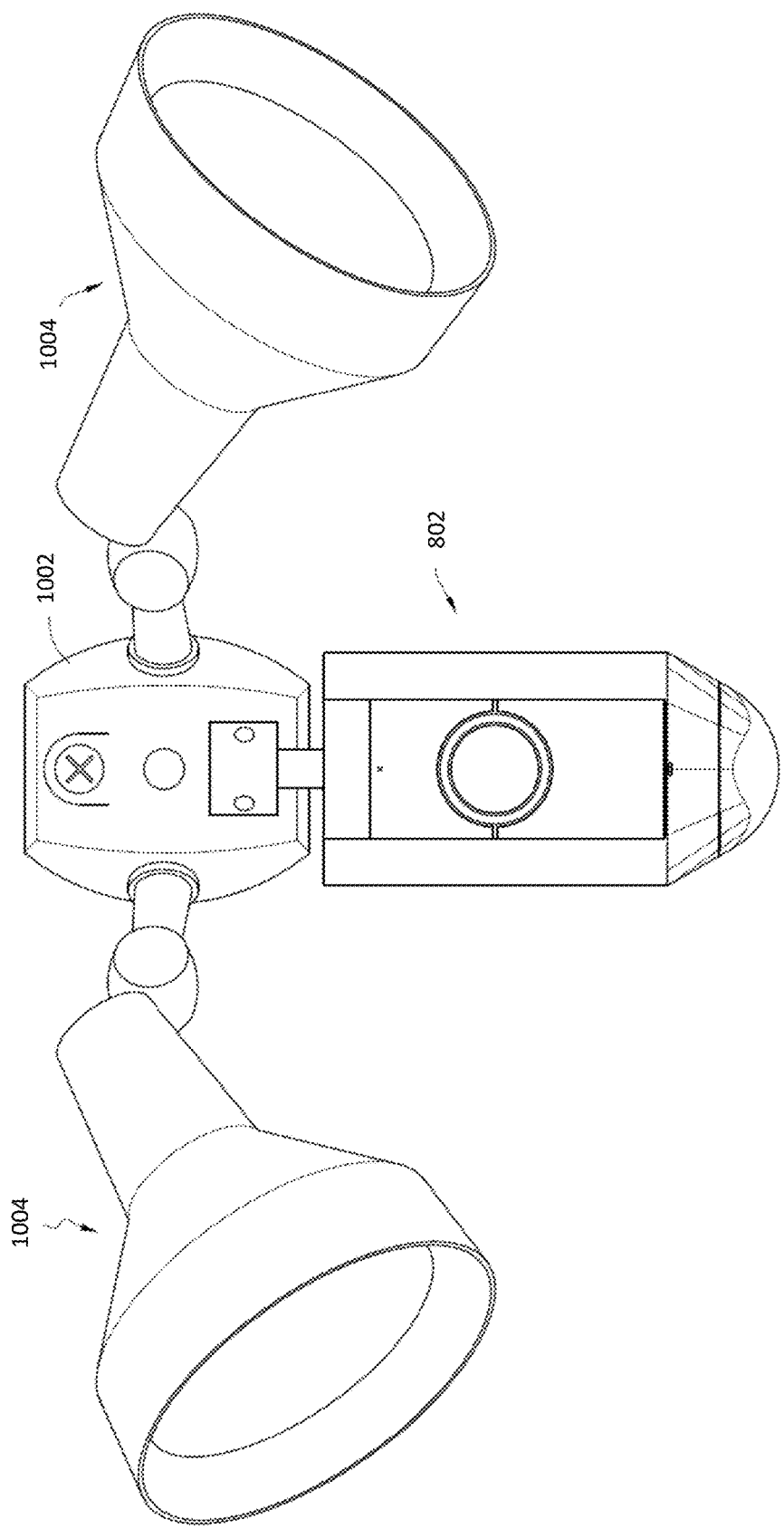
FIG. 10 is a front elevation view of the example floodlight controller with A/V recording and communication features of FIG. 9 in combination with a floodlight device according to various aspects of the present disclosure.

As discussed above, the present disclosure provides numerous examples of methods and systems including A/V recording and communication doorbells, but the present embodiments are equally applicable for A/V recording and communication devices other than doorbells. For example, the present embodiments may include one or more A/V recording and communication floodlight controllers instead of, or in addition to, one or more A/V recording and communication doorbells. FIGS. 8-10 illustrate an example A/V recording and communication floodlight controller according to various aspects of the present embodiments. FIG. 8 is a functional block diagram illustrating various components of the floodlight controller 802 and their relationships to one another. For example, the floodlight controller 802 comprises an AC/DC adapter 804. The floodlight controller 802 is thus configured to be connected to a source of external AC (alternating-current) power, such as a household AC power supply (may also be referred to as AC mains). The AC power may have a voltage in the range of 110-220 VAC, for example. The incoming AC power may be received by the AC/DC adapter 804, which may convert the incoming AC power to DC (direct-current) and may step down the voltage from 110-220 VAC to a lower output voltage of about 12 VDC and an output current of about 2 A, for example. In various embodiments, the output of the AC/DC adapter 804 may be in a range of from about 9 V to about 15 V, for example, and in a range of from about 0.5 A to about 5 A, for example. These voltages and currents are only examples provided for illustration and are not limiting in any way.

With further reference to FIG. 8, the floodlight controller 802 further comprises other components, including a processor 806 (may also be referred to as a controller), a photosensor 808, an audio CODEC (coder-decoder) 810, at least one speaker 812 (which may be similar to speaker 108), the at least one microphone 814 (which may be similar to microphone 106), at least one motion sensor 816, an infrared (IR) light source 818, an IR cut filter 820, an image sensor 822 (may be a component of the camera 104, and may be referred to interchangeably as the camera 104), volatile memory 824, non-volatile memory 826, a communication module 828, a button 830, a switch 832 for controlling one or more floodlights, and a plurality of light indicators 834. Each of these components is described in detail below.

With further reference to FIG. 8, the processor 806 may perform data processing and various other functions, as described below. The processor 806 may comprise an integrated circuit including a processor core, the volatile memory 824, the non-volatile memory 826, and/or programmable input/output peripherals (not shown). The volatile memory 824 may comprise, for example, DDR3 SDRAM (double data rate type three synchronous dynamic random-access memory). The non-volatile memory 826 may comprise, for example, NAND flash memory. In the embodiment illustrated in FIG. 8, the volatile memory 824 and the non-volatile memory 826 are illustrated outside the box representing the processor 806. The embodiment illustrated in FIG. 8 is, however, merely an example, and in some embodiments the volatile memory 824 and/or the non-volatile memory 826 may be physically incorporated with the processor 806, such as on the same chip. The volatile memory 824 and/or the non-volatile memory 826, regardless of their physical location, may be shared by one or more other components (in addition to the processor 806) of the present floodlight controller 802.

With further reference to FIG. 8, the image sensor 822 (camera 104), the IR light source 818, the IR cut filter 820, and the photosensor 808 are all operatively coupled to the processor 806. As described in detail below, the IR light source 818 and the IR cut filter 820 facilitate "night vision" functionality of the image sensor 822. For example, the photosensor 808 is configured to detect the level of ambient light about the floodlight controller 802. The processor 806 uses the input from the photosensor 808 to control the states of the IR light source 818 and the IR cut filter 820 to activate and deactivate night vision, as described below. In some embodiments, the image sensor 822 may comprise a video recording sensor or a camera chip. In some embodiments, the IR light source 818 may comprise one or more IR light-emitting diodes (LEDs).

With further reference to FIG. 8, the at least one speaker 812 and the at least one microphone 814 are operatively coupled to the audio CODEC 810, which is operatively coupled to the processor 806. The transfer of digital audio between the user and a visitor (or intruder) may be compressed and decompressed using the audio CODEC 810, as described below. The motion sensor(s) 816 is also operatively coupled to the processor 806. The motion sensor(s) 816 may comprise, for example, passive infrared (PIR) sensors, or any other type of sensor capable of detecting and communicating to the processor 806 the presence and/or motion of an object within its field of view. When the processor 806 is triggered by the motion sensor(s) 816, the processor 806 may perform one or more functions, as described below.

With further reference to FIG. 8, the communication module 828 is operatively coupled to the processor 806. The communication module 828, which includes at least one antenna 836, is configured to handle communication links between the floodlight controller 802 and other, external devices or receivers, and to route incoming/outgoing data appropriately. For example, inbound data from the antenna(s) 836 may be routed through the communication module 828 before being directed to the processor 806, and outbound data from the processor 806 may be routed through the communication module 828 before being directed to the antenna(s) 836. The communication module 828 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, Bluetooth, or any other protocol and/or technology. In the illustrated embodiment, the communication module 828 includes a Wi-Fi chip 838 and a Bluetooth chip 840, but these components are merely examples and are not limiting. Further, while the Wi-Fi chip 838 and the Bluetooth chip 840 are illustrated within the box representing the communication module 828, the embodiment illustrated in FIG. 8 is merely an example, and in some embodiments the Wi-Fi chip 838 and/or the Bluetooth chip 840 are not necessarily physically incorporated with the communication module 828.

In some embodiments, the communication module 828 may further comprise a wireless repeater (not shown, may also be referred to as a wireless range extender). The wireless repeater is configured to receive a wireless signal from a wireless router (or another network device) in the user's network 110 and rebroadcast the signal. Wireless devices that are not within the broadcast range of the wireless router, or that only weakly receive the wireless signal from the wireless router, may receive the rebroadcast signal from the wireless repeater of the communication module 828, and may thus connect to the user's network 110 through the floodlight controller 802. In some embodiments, the wireless repeater may include one or more transceiver modules (not shown) capable of transmitting and receiving data, and using, for example, one or more protocols and/or technologies, such as Wi-Fi (IEEE 802.11), WiMAX (IEEE 802.16), or any other protocol and/or technology.

With further reference to FIG. 8, when a visitor (or intruder) who is present in the area about the floodlight controller 802 speaks, audio from the visitor (or intruder) is received by the microphones 814 and compressed by the audio CODEC 810. Digital audio data is then sent through the communication module 828 to the network 112 (FIG. 1) via the user's network 110, routed by the server 120 and/or the API 122, and delivered to the user's client device 114. When the user speaks, after being transferred through the network 112, the user's network 110, and the communication module 828, the digital audio data from the user is decompressed by the audio CODEC 810 and emitted to the visitor through the speaker 812, which may be driven by a speaker driver (not shown).

With further reference to FIG. 8, the button 830 is operatively coupled to the processor 806. The button 830 may have one or more functions, such as changing an operating mode of the floodlight controller 802 and/or triggering a reset of the floodlight controller 802. For example, when the button 830 is pressed and released, it may cause the communication module 828 of the floodlight controller 802 to enter access point (AP) mode, which may facilitate connecting the floodlight controller 802 to the user's network 110. Alternatively, or in addition, when the button 830 is pressed and held down for at least a threshold amount of time, it may trigger the erasing of any data stored at the volatile memory 824 and/or at the non-volatile memory 826, and/or may trigger a reboot of the processor 806.

With reference to FIG. 9, the floodlight controller 802 comprises a housing 902 for containing and protecting the interior components of the floodlight controller 802. The housing 902 includes a front wall 904, a rear wall 906, opposing side walls 908, 910, an upper wall 912, and a tapered lower portion 914. The front wall 904 includes a central opening that receives an upper shield 916 and a lower grill 918. In the illustrated embodiment, front surfaces of the upper shield 916 and the lower grill 918 are substantially flush with a front surface of the front wall 904, but in alternative embodiments these surfaces may not be flush with one another. The upper shield 916 is substantially rectangular, and includes a semicircular indentation 920 along its lower edge 922. The lower grill 918 is substantially rectangular, and includes a semicircular indentation 924 along its upper edge 926. Together, the semicircular indentations 920, 924 in the upper shield 916 and the lower grill 918 form a circular opening 928 that accommodates a light pipe 930. A cover extends across and closes an outer open end of the light pipe 930. The upper shield 916, the lower grill 918, the light pipe 930, and the cover are all described in further detail below. The camera (not shown) is located in the circular opening 928 formed by the upper shield 916 and the lower grill 918, behind the cover, and is surrounded by the light pipe 930.

With reference to FIG. 8, the floodlight controller 802 further comprises the microphones 814. In the illustrated embodiment, a first one of the microphones 814 is located along the front of the floodlight controller 802 behind the upper shield 916 (FIG. 9) and a second one of the microphones 814 is located along the left side of the floodlight controller 802 behind the left-side wall 910 (FIG. 9) of the housing 902. Including two microphones that are spaced from one another and located on different sides of the floodlight controller 802 provides the illustrated embodiment of the floodlight controller 802 with advantageous noise cancelling and/or echo cancelling for clearer audio. The illustrated embodiment is, however, just one example and is not limiting. Alternative embodiments may only include one microphone 814, or include two microphones 814 in different locations than as illustrated in FIG. 8.

With reference to FIG. 9, the upper shield 916 may include a first microphone opening 932 located in front of the first microphone 814 to facilitate the passage of sound through the upper shield 916 so that sounds from the area about the floodlight controller 802 may reach the first microphone 814. The left-side wall 910 of the housing 902 may include a second microphone opening (not shown) located in front of the second microphone 814 that facilitates the passage of sound through the left-side wall 910 of the housing 902 so that sounds from the area about the floodlight controller 802 may reach the second microphone 814.

With further reference to FIG. 9, the floodlight controller 802 may further comprise a light barrier 934 surrounding inner and outer surfaces of the light pipe 930. The light barrier 934 may comprise a substantially opaque material that prevents the light generated by the light indicators 834 from bleeding into the interior spaces of the floodlight controller 802 around the light pipe 930. The light barrier 934 may comprise a resilient material, such as a plastic, which may also advantageously provide moisture sealing at the junctures between the light pipe 930 and the upper shield 916 and the lower grill 918. Portions of the light barrier 934 may also extend between the junctures between the upper shield 916 and the lower grill 918.

With further reference to FIG. 9, the floodlight controller 802 further comprises connecting hardware configured for connecting the floodlight controller 802 to a floodlight device 1002 (FIG. 10) and a power source (not shown). The floodlight controller 802 further comprises a plurality of wires for connecting the floodlight controller 802 to the power supply and to the floodlight(s) 1004 (FIG. 10) of the floodlight device 1002 (for enabling the floodlight controller 802 to turn the floodlight(s) 1004 on and off). In the illustrated embodiment, three wires may be used, but the illustrated embodiment is merely one example and is not limiting. In alternative embodiments, any number of wires may be provided.

Some of the present embodiments may comprise computer vision for one or more aspects, such as object and/or facial recognition. Computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that may interface with other thought processes and elicit appropriate action. This image understanding may be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data may take many forms, such as video sequences, views from multiple cameras, or multi-dimensional data from a scanner. As a technological discipline, computer vision seeks to apply its theories and models for the construction of computer vision systems.

One aspect of computer vision comprises determining whether or not the image data contains some specific object, feature, or activity. Different varieties of computer vision recognition include: Object Recognition (also called object classification)—One or several pre-specified or learned objects or object classes may be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based on relatively simple and fast computations is sometimes used for finding smaller regions of interesting image data that may be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT)—Differentiating human beings (e.g., head and shoulder patterns) from objects.

Typical functions and components (e.g., hardware) found in many computer vision systems are described in the following paragraphs. The present embodiments may include at least some of these aspects. For example, with reference to FIGS. 3-5, embodiments of the present A/V recording and communication doorbell 302 may include a computer vision module 552. In addition, with reference to FIGS. 6-7, embodiments of the present security camera 602 may include a computer vision module 744. The computer vision module 552 may include any of the components (e.g., hardware) and/or functionality described herein with respect to computer vision, including, without limitation, one or more cameras, sensors, and/or processors. In some of the present embodiments, with reference to FIGS. 3-5, the microphone 524, the camera 316, and/or the imager 546 may be components of the computer vision module 552.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but may also be related to various physical measures, such as depth, absorption or reflectance of sonic or electromagnetic waves, or nuclear magnetic resonance.

Pre-processing—Before a computer vision method may be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information may be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; Estimation of application-specific parameters, such as object pose or object size; Image recognition—classifying a detected object into different categories; Image registration—comparing and combining two different views of the same object. Decision making—Making the final decision required for the application, for example match/no-match in recognition applications.

One or more of the present embodiments may include a vision processing unit (not shown separately, but may be a component of the computer vision module 552). A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a manycore DSP (digital signal processor). But, like video processing units, vision processing units may have a focus on low precision fixed-point arithmetic for image processing.

Some of the present embodiments may use facial recognition hardware and/or software, as a part of the computer vision system. Various types of facial recognition exist, some or all of which may be used in the present embodiments.

Some face recognition identifies facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms p a gallery of face images and then compress the face data, only saving the data in the image that is useful for face recognition. A probe image is then compared with the face data. One of the earliest successful systems is based on template matching techniques applied to a set of salient facial features, providing a sort of compressed face representation.

Recognition algorithms may be divided into two main approaches, geometric, which looks at distinguishing features, or photometric, which is a statistical approach that distills an image into values and compares the values with templates to eliminate variances.

Popular recognition algorithms include principal component analysis using eigenfaces, linear discriminant analysis, elastic bunch graph matching using the Fisherface algorithm, the hidden Markov model, the multilinear subspace learning using tensor representation, and the neuronal motivated dynamic link matching.

Further, a newly emerging trend, claimed to achieve improved accuracy, is three-dimensional face recognition. This technique uses 3D sensors to capture information about the shape of a face. This information is then used to identify distinctive features on the surface of a face, such as the contour of the eye sockets, nose, and chin.

One advantage of 3D face recognition is that it is not affected by changes in lighting like other techniques. It may also identify a face from a range of viewing angles, including a profile view. Three-dimensional data points from a face vastly improve the precision of face recognition. 3D research is enhanced by the development of sophisticated sensors that do a better job of capturing 3D face imagery. The sensors work by projecting structured light onto the face. Up to a dozen or more of these image sensors may be placed on the same CMOS chip—each sensor captures a different part of the spectrum.

Another variation is to capture a 3D picture by using three tracking cameras that point at different angles; one camera pointing at the front of the subject, a second one to the side, and a third one at an angle. All these cameras work together to track a subject's face in real time and be able to face detect and recognize.

Another emerging trend uses the visual details of the skin, as captured in standard digital images or scanned images, for example. This technique, called skin texture analysis, turns the unique lines, patterns, and spots apparent in a person's skin into a mathematical space.

Another form of taking input data for face recognition is by using thermal cameras, which may only detect the shape of the head and ignore the subject accessories such as glasses, hats, or make up.

Further examples of automatic identification and data capture (AIDC) and/or computer vision that may be used in the present embodiments to verify the identity and/or authorization of a person include, without limitation, biometrics. Biometrics refers to metrics related to human characteristics. Biometrics authentication (or realistic authentication) is used in various forms of identification and access control. Biometric identifiers are the distinctive, measurable characteristics used to label and describe individuals. Biometric identifiers may be physiological characteristics and/or behavioral characteristics. Physiological characteristics may be related to the shape of the body. Examples include, but are not limited to, fingerprints, palm veins, facial recognition, three-dimensional facial recognition, skin texture analysis, DNA, palm prints, hand geometry, iris recognition, retina recognition, and odor/scent recognition. Behavioral characteristics may be related to the pattern of behavior of a person, including, but not limited to, typing rhythm, gait, and voice recognition.

The present embodiments may use any one, or any combination of more than one, of the foregoing biometrics to identify and/or authenticate a person who is either suspicious or who is authorized to take certain actions with respect to a property or expensive item of collateral. For example, with reference to FIGS. 6-7, the computer vision module 744, and/or the camera 614 and/or the processor 726 may receive information about the person using any one, or any combination of more than one, of the foregoing biometrics.

As described above, one aspect of the present embodiments includes the realization that homeowners and property owners may rely on and utilize criminal statistics for various reasons, such as to protect the user's family, pets, and property. However, users may not currently be able to access user interfaces that include the functionality to provide the criminal statistics the user desires in an easily digestible format. For example, a user may be able to access criminal statistics for a town, city, or state, but may not be able to access criminal statistics that are unique to the user's location, such as criminal statistics for the user's neighborhood, or for a user defined area surrounding the user's property. For another example, a user may be able to view criminal statistics that are based on actual crimes, but the criminal statistics may not include information pertaining to suspicious activity or unreported criminal behavior, such as information shared by other users of a network of users located within the surrounding area. As a result of the criminal statistics being inadequate and not easily digestible for the user, the user may be unable to determine which criminal activities and suspicious activities/persons are common in the areas surrounding the user's property. As a result, the user may be unable to take necessary actions to protect the user's family, pets, and/or property, which may put the user's family, pets, and/or property at a greater risk of harm.

The present embodiments solve this problem by, for example, creating criminal statistics that are tailored to user's requesting the criminal statistics and/or include data associated with suspicious activities that occur in a geographic area specific to the user, such as the user's neighborhood or a user defined area including the user's property. For example, a backend device may receive a criminal statistics request from a client device of a user (e.g., in response to a notification on the user's client device that the criminal statistics request is available for viewing), where the criminal statistics request indicates a defined geographic area for which the user is requesting criminal statistics. For instance, the geographic area may include an area that surrounds the user's property, such as, but not limited to, a radius around the user's property. In response, the backend server may use data representing criminal activity, such as criminal reports, that occurred within the geographic area to create the criminal statistics for the user. In some examples, the backend server may further utilize image data, audio data, and/or other data that is generated by one or more A/V recording and communication devices located within the geographic area to create the criminal statistics for the user. The backend server may then transmit the criminal statistics to the client device of the user for viewing. In some examples, the criminal statistics may be curated and transmitted to the user's client device without a statistics request from the user, such that the user receives a notification that the user may view the criminal statistics, and upon selecting the notification, the user is provided with a customized criminal statistics report unique to the user. As a result of tailoring the criminal statistics to the user, and/or by including the additional data from the one or more A/V recording and communication devices, the user may be better informed about the crimes (reported and unreported) and suspicious activity that are occurring around the area surrounding the user's property. Using this information, the user may take various actions to protect the user's family, pets, and/or property, as well as protect families, pets, and/or properties in the surrounding area (e.g., the street on which the property is located, the neighborhood the property is in, etc.). For example, the user may park his or her car in the garage if there are car break-ins reported in the user's neighborhood, or the user may purchase a video doorbell if the user is made aware of parcel thefts being a common occurrence in his or her neighborhood.

Figure 11:
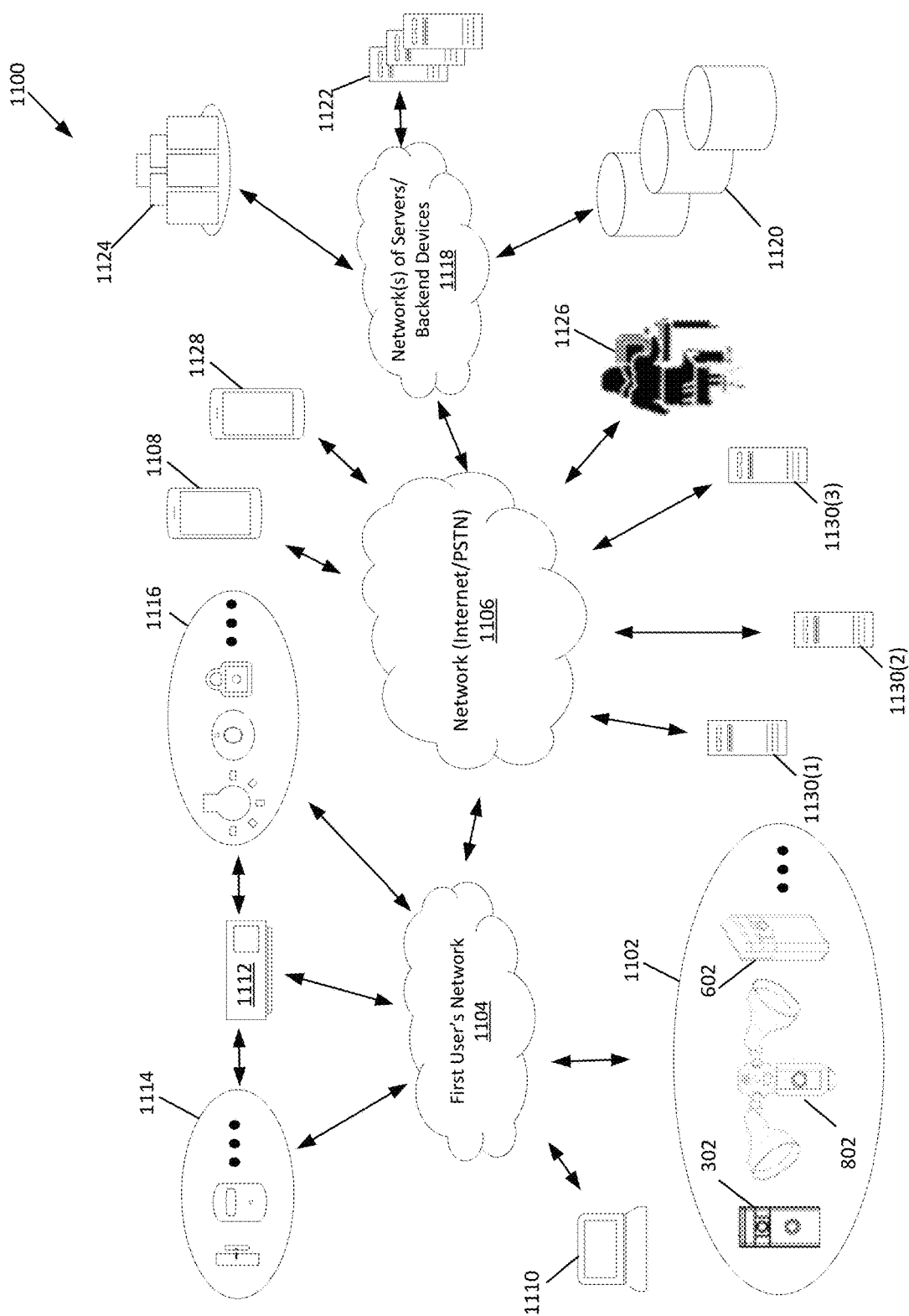
FIG. 11 is a functional block diagram illustrating an example system for communicating in a network according to various aspects of the present disclosure.

FIG. 11 is a functional block diagram illustrating a system 1100 for communicating in a network according to various aspects of the present disclosure. The system 1100 may include one or more A/V recording and communication devices 1102 configured to access a user's network 1104 (which may correspond to the user's network 110) to connect to a network (Internet/PSTN) 1106 (in some embodiments, the devices 1102 may be configured to connect directly to the network (Internet/PSTN) 1106, such as over a cellular connection). The one or more A/V recording and communication devices 1102 may include any or all of the components and/or functionality of the A/V recording and communication device 102 (FIGS. 1-2), the A/V recording and communication doorbell 302 (FIGS. 3-5), the security camera 602 (FIGS. 6-7), and/or the floodlight controller 802 (FIGS. 8-10).

The user's network 1104 may include any or all of the components and/or functionality of the user's network 110 described herein.

The system 1100 may further include a smart-home hub device 1112 (which may alternatively be referred to herein as the hub device 1112) connected to the user's network 1104. The smart-home hub device 1112 (also known as a home automation hub, gateway device, etc.), may comprise any device that facilitates communication with and control of the sensors 1114, automation devices 1116, and/or the one or more A/V recording and communication devices 1102. For example, the smart-home hub device 1112 may be a component of a home automation system installed at a property. In some embodiments, the A/V recording and communication devices 1102, the sensors 1114, and/or the automation devices 1116 may communicate with the smart-home hub device 1112 directly and/or indirectly via the user's network 1104 and/or the network (Internet/PSTN) 1106. In some of the present embodiments, the A/V recording and communication devices 1102, the sensors 1114, and/or the automation devices 1116 may, in addition to or in lieu of communicating with the smart-home hub device 1112, communicate with the first client devices 1108, 1110 and/or one or more of the components of the network of servers/backend devices 1118 directly and/or indirectly via the user's network 1104 and/or the network (Internet/PSTN) 1106.

Home automation, or smart home, is building automation for the home. It involves the control and automation of various devices and/or systems, such as lighting, heating (such as smart thermostats), ventilation, air conditioning (HVAC), blinds/shades, and security, as well as home appliances, such as washers/dryers, ovens, or refrigerators/freezers. Wi-Fi is often used for remote monitoring and control. Smart home devices (e.g., the hub device 1112, the sensors 1114, the automation devices 1116, the A/V recording and communication devices 1102, etc.), when remotely monitored and controlled via the network (Internet/PSTN) 1106, may be considered to be components of the Internet of Things. Smart home systems may include switches and/or sensors (e.g., the sensors 1114) connected to a central hub such as the smart-home hub device 1112, sometimes called a gateway, from which the system may be controlled with a user interface. The user interface may include any or all of a wall-mounted terminal (e.g., a keypad, a touchscreen, etc.), software installed on the first client devices 1108, 1110 (e.g., a mobile application), a tablet computer or a web interface, often but not always via Internet cloud services. The home automation system may use one or more communication protocols, including either or both of wired and wireless protocols, including but not limited to Wi-Fi, X10, Ethernet, RS-485, 6LoWPAN, Bluetooth LE (BTLE), ZigBee, and Z-Wave.

The one or more sensors 1114 may include, for example, at least one of a door sensor, a window sensor, a contact sensor, a tilt sensor, a temperature sensor, a carbon monoxide sensor, a smoke detector, a light sensor, a glass break sensor, a motion sensor, and/or other sensors that may provide the user/owner of the security system a notification of a security event at his or her property.

The one or more automation devices 1116 may include, for example, at least one of an outdoor lighting system, an indoor lighting system, and indoor/outdoor lighting system, a temperature control system (e.g., a thermostat), a shade/blind control system, a locking control system (e.g., door lock, window lock, etc.), a home entertainment automation system (e.g., TV control, sound system control, etc.), an irrigation control system, and/or other automation devices.

As described herein, in some of the present embodiments, some or all of the user's network 1104, the first client devices 1108, 1110, the A/V recording and communication device 1102, the smart-home hub device 1112, the sensors 1114, and the automation devices 1116 may be referred to as a security system, which may be installed at a property or premises.

With further reference to FIG. 11, the system 1100 may also include various backend devices such as (but not limited to) storage devices 1120, backend servers 1122, and backend APIs 1124 that may be in network communication (e.g., over the user's network 1104 and/or the network (Internet/PSTN) 1106) with the A/V recording and communication devices 1102, the hub device 1112, the first client devices 1108, 1110, the sensors 1114, and/or the automation devices 1116. In some embodiments, the storage devices 1120 may be a separate device from the backend servers 1122 (as illustrated) or may be an integral component of the backend servers 1122. The storage devices 1120 may be similar in structure and/or function to the storage device 118 (FIG. 1). In addition, in some embodiments, the backend servers 1122 and backend APIs 1124 may be similar in structure and/or function to the server 120 and the backend API 122 (FIG. 1), respectively.

With further reference to FIG. 11, the system 1100 may also include a security monitoring service 1126. The security monitoring service 1126 may be operated by the same company that manufactures, sells, and/or distributes the A/V recording and communication devices 1102, the hub device 1112, the sensors 1114, and/or the automation devices 1116. In other embodiments, the security monitoring service 1126 may be operated by a third-party company (e.g., a different company than the one that manufactured, sold, and/or distributed the A/V recording and communication devices 1102, the hub device 1112, the sensors 1114, and/or the automation devices 1116). In any of the present embodiments, the security monitoring service 1126 may have control of at least some of the features and components of the security system (e.g., the security monitoring service 1126 may be able to arm and/or disarm the security system, lock and/or unlock doors, activate and/or deactivate one or more of the sensors 1114 and/or the automation devices 1116, etc.). For example, the security monitoring service 1126 may operate and control their own client devices and/or network of servers/backend devices for monitoring and/or controlling security systems. In such an example, the A/V recording and communication devices 1102, the hub device 1112, the sensors 1114, and/or the automation devices 1116 may communicate with the client devices and/or one or more components of the network of servers/backend devices of the security monitoring service 1126 over the network (Internet/PSTN) 1106 (in some embodiments, via one or more of the components of the network of backend servers/backend devices 1118).

The system 1100 may also include one or more client devices 1108, 1110 (alternatively referred to herein as a "first client devices 1108, 1110"), which in various embodiments may be configured to be in network communication and/or associated with the A/V recording and communication device 1102. The first client devices 1108, 1110 may comprise, for example, a mobile phone such as a smartphone, or a computing device such as a tablet computer, a laptop computer, a desktop computer, etc. In some embodiments, the first client devices 1108, 1110 may include a smart watch or a combination of a smart watch and a mobile phone. The first client devices 1108, 1110 may include any or all of the components and/or functionality of the client device 114 (FIG. 1) and/or the client device 2902 (FIG. 29) described herein. In some embodiments, one or more of the first client devices 1108, 1110 may not be associated with the A/V recording and communication device 1102.

With further reference to FIG. 11, system 1100 may also include at least one additional client device 1128 (alternatively referred to as the "second client device 1128"). The second client device 1128 may comprise, for example, a mobile phone such as a smartphone, or a computing device such as a tablet computer, a laptop computer, a desktop computer, etc. In some embodiments, the second client devices 1128 may include a smart watch or a combination of a smart watch and a mobile phone. In some examples, the second client device 1128 may be associated with one or more A/V recording and communication devices (not shown). In other examples, the second client device 1128 may not be associated with one or more A/V recording and communication devices.

With further reference to FIG. 11, the system 1100 may include one or more third-party services 1130(1)-1130(3) (alternatively referred to herein individually as third party-service 1130 and/or in combination as third-party services 1130). The backend server(s) 1122 may be in network communication with the third-party services 1130 to retrieve data (criminal data) representing criminal statistics. The criminal statistics may indicate incidents that have occurred within a geographic area. In some examples, the incidents may include criminal reports, such as, but not limited to, reported suspicious activity, reported crimes, and/or the like. In some examples, the backend server 1122 may retrieve the data continuously from the third-party services 1130. In some examples, the backend server 1122 may retrieve the data from the third-party services 1130 at given time intervals. The given time intervals may include, but are not limited to, every hour, day, week, month, or the like.

For a first example, a third-party service 1130 may include a service that collects, stores, generates, filters, and/or provides criminal statistics for one or more geographic areas. The geographic areas may include, but are not limited to, countries, states, cities, and/or towns. For instance, the third-party services 1130 may include CRIME REPORTS® OR SPOTCRIME®. For a second example, a third-party service 1130 may include a law enforcement agency that collects, stores, generates, filters, and/or provides criminal statistics for one or more geographic areas. As described above, the geographic areas may include, but are not limited to, countries, states, cities, and/or towns. For a third example, a third-party service 1130 may include online resources that users can use to search for content, such as criminal statistics. For instance, the online resources may include, but are not limited to, search engines, social media sites, databases, and/or other online resources.

Figure 12:
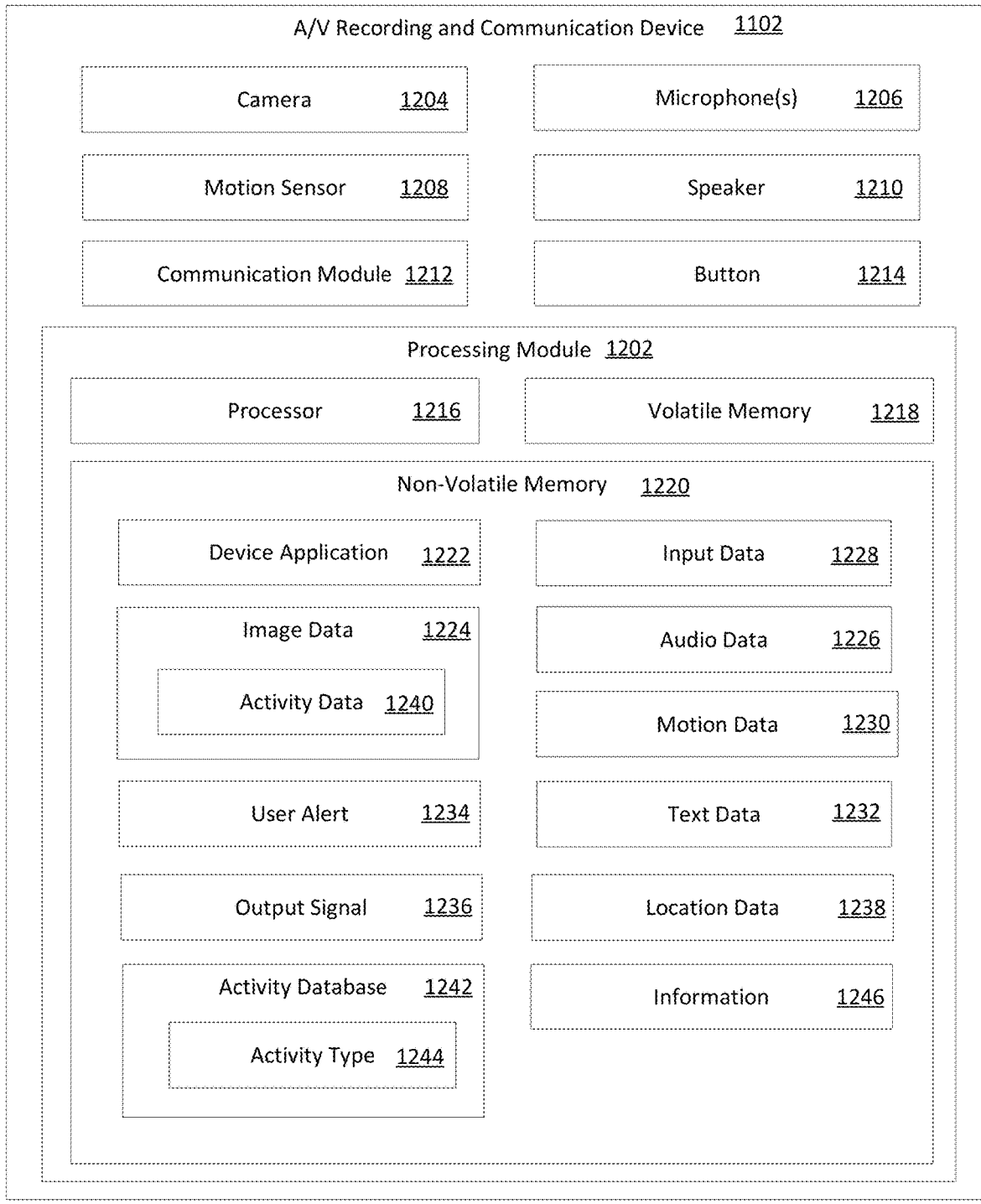
FIG. 12 is a functional block diagram illustrating one example embodiment of an A/V recording and communication device according to various aspects of the present disclosure.

FIG. 12 is a functional block diagram illustrating an embodiment of an A/V recording and communication device 1102 according to various aspects of the present disclosure. In some embodiments, the A/V recording and communication device 1102 may represent, and further include one or more of the components from, the A/V recording and communication doorbell 302, the A/V recording and communication security camera 602, and/or the floodlight controller 802. Additionally, in some embodiments, the A/V recording and communication device 1102 may omit one or more of the components shown in FIG. 12 and/or may include one or more additional components not shown in FIG. 12.

The A/V recording and communication device 1102 may comprise a processing module 1202 that is operatively connected to a camera 1204, microphone(s) 1206, a motion sensor 1208, a speaker 1210, a communication module 1212, and a button 1214 (in embodiments where the A/V recording and communication device 1102 is a doorbell, such as the A/V recording and communication doorbell 302). The processing module 1202 may comprise a processor 1216, volatile memory 1218, and non-volatile memory 1220, which includes a device application 1222. In various embodiments, the device application 1222 may configure the processor 1216 to capture image data 1224 using the camera 1204, audio data 1226 using the microphone(s) 1206, input data 1228 using the button 1214 (and/or the camera 1204 and/or the motion sensor 1208, depending on the embodiment), and/or motion data 1230 using the camera 1204 and/or the motion sensor 1208. In some embodiments, the device application 1222 may also configure the processor 1216 to generate text data 1232 describing the image data 1224, the audio data 1226, and/or the input data 1228, such as in the form of metadata, for example.

In addition, the device application 1222 may configure the processor 1216 to transmit the image data 1224, the audio data 1226, the motion data 1230, the input data 1228, the text data 1232, and/or a user alert 1234 to the first client devices 1108, 1110, the hub device 1112, and/or the backend server 1122 using the communication module 1212. In various embodiments, the device application 1222 may also configure the processor 1216 to generate and transmit an output signal 1236 that may include the image data 1224, the audio data 1226, the text data 1232, the input data 1228, and/or the motion data 1230. In some of the present embodiments, the output signal 1236 may be transmitted to the backend server 1122 and/or the hub device 1112 using the communication module 1212, and the backend server 1122 and/or the hub device 1112 may transmit (or forward) the output signal 1236 to the first client devices 1108, 1110 and/or the backend server 1122 may transmit the output signal 1236 to the hub device 1112. In other embodiments, the output signal 1236 may be transmitted directly to the first client devices 1108, 1110 and/or the hub device 1112.

In further reference to FIG. 12, the image data 1224 may comprise image sensor data such as (but not limited to) exposure values and data regarding pixel values for a particular sized grid. The image data 1224 may include still images, live video, and/or pre-recorded images and/or video. The image data 1224 may be recorded by the camera 1204 in a field of view of the camera 1204.

In further reference to FIG. 12, the motion data 1230 may comprise motion sensor data generated in response to motion events. For example, the motion data 1230 may include an amount or level of a data type generated by the motion sensor 1208 (e.g., the voltage level output by the motion sensor 1208 when the motion sensor 1208 is a PIR type motion sensor). In some of the present embodiments, such as those where the A/V recording and communication device 1102 does not include the motion sensor 1208, the motion data 1230 may be generated by the camera 1204. In such embodiments, based on a frame by frame comparison of changes in the pixels from the image data 1124, it may be determined that motion is present.

The input data 1228 may include that data generated in response to an input to the button 1214. The button 1214 (which may include similar design and functionality to that of the front button 306 (FIG. 3)) may receive an input (e.g., a press, a touch, a series of touches and/or presses, etc.) and may generate the input data 1228 in response that is indicative of the type of input. In embodiments where the A/V recording and communication device 1102 is not a doorbell, the A/V recording and communication device 1102 may not include the button 1214, and in such embodiments, the A/V recording and communication device 1102 may not generate the input data 1228 and/or the input data 1228 may be generated by another component of the A/V recording and communication device 1102 (e.g., the camera 1204).

With further reference to FIG. 12, a user alert 1234 may be generated by the processor 1216 and transmitted, using the communication module 1212, to the first client devices 1108, 1110, the hub device 1112, and/or the backend server 1122. For example, in response to detecting motion using the camera 1204 and/or the motion sensor 1208, the A/V recording and communication device 1102 may generate and transmit the user alert 1234. In some of the present embodiments, the user alert 1234 may include at least the image data 1224, the audio data 1226, the text data 1232, and/or the motion data 1230. Upon receiving the user alert 1234, the user of the first client device 1108, 1110 may be able to share the user alert 1234 (or at least some of the contents of the user alert 1234, such as the image data 1224) with a geographic area network, which is described in more detail below.

With further reference to FIG. 12, the non-volatile memory 1220 stores location data 1238. The location data 1238 may indicate the geographic location of the A/V recording and communication device 1102. For example, location data 1238 may indicate, but is not limited to, the street address, zip code, city, state, property, neighborhood, GPS coordinates, distance from one or more cell towers, and/or the like of where the A/V recording and communication device 1102 is located. In some examples, the processor 1216 of the A/V recording and communication device 1102 may transmit, using the communication module 1212, the location data 1238 to the first client devices 1108, 1110, the hub device 1112, and/or the backend server 1122. In some embodiments, the location data 1238 may be used by the backend server 1122 when determining which crime reports, image data, and/or other data to include the second criminal statistics provided to the user.

As described herein, at least some of the processes of the hub device 1112, the backend server 1122, and/or the first client device 1108, 1110 may be executed by the A/V recording and communication device 1102. For example, the device application 1222 may configure the processor 1216 to analyze the image data 1224 in order to determine if the image data 1224 depicts a suspicious activity, such as a criminal activity. For example, computer vision processing and/or image processing, as described herein, may be performed by the processor 1216 of the A/V recording and communication device 1102 to determine that the image data 1224 depicts the suspicious activity. For example, in any of the present embodiments, the image data 1224 generated by the camera 1204 may be analyzed to determine activity data 1240. In some of the present embodiments, one or more of the image data 1224, the motion data 1230, and the audio data 1226 may be used to determine the activity data 1240. The computer vision and/or image processing may be executed using computer vision and/or image processing algorithms. Examples of computer vision and/or image processing algorithms may include, without limitation, spatial gesture models that are 3D model-based and/or appearance based. 3D model-based algorithms may include skeletal and volumetric, where volumetric may include NURBS, primitives, and/or super-quadrics, for example.

In some embodiments, the processor 1216 of the A/V recording and communication device 1102 may compare the activity data 1240 to an activity database 1242 to determine what, if any, activities the image data 1124 depicts in the field of view of the A/V recording and communication device 1102. For example, the activity database 1242 may store image data corresponding to images and/or video footage that depict various activities, where the image data may be labeled (e.g., tagged, such as in the form of metadata) to indicate an activity type 1244 (alternatively referred to herein as the "type of activity 1244") depicted by each image and/or video represented by the image data 1124. Based on the comparing, the processor 1216 of the A/V recording and communication device 1102 may match the activity data 1240 from the image data 1224 to the image data stored in the activity database 1242. The processor 1216 of the A/V recording and communication device 1102 may then use the match to determine that the activity data 1240 represents an activity and/or to determine the type of activity 1244 that the activity data 1240 represents. In some examples, when the activity data 1240 represents multiple activities, the processor 1216 of the A/V recording and communication device 1102 may perform a similar analysis to identify each activity represented by the activity data 1240 and/or the respective type of activity 1244 associated with each of the activities represented by the activity data 1240.

In some examples, the types of activities 1244 may correspond to suspicious activities, such as various categories of criminal behavior. For example, the types of activities 1244 may include, but are not limited to, vehicle crimes (e.g., burglary, theft, etc.), assaults, break-ins (e.g., burglary to a property, vehicle, etc.), shootings, murder, homicides, kidnapping, sex crimes, robberies, fraud, arson, embezzlement, forgery, solicitation, parcel theft, stabbing, suspicious package, armed robberies, theft, breaking and entering, vandalism, and/or any types of attempted crime and/or suspicious activity. As such, in some examples, the activity database 1242 may include image data that depicts each of the suspicious activities, which the processor 1216 of the A/V recording and communication device 1102 may use to match with the activity data 1240 from the image data 1224.

For a first example, the processor 1216 of the A/V recording and communication device 1102 may match the activity data 1240 from the image data 1224 to image data, stored in the activity database 1242, that depicts a person breaking into a vehicle. Based on the match, the processor 1216 of the A/V recording and communication device 1102 may determine that the image data 1224 depicts a break-in (e.g., a burglary) of a vehicle (e.g., that the image data 1224 depicts an activity). For a second example, the processor 1216 of the A/V recording and communication device 1102 may match the activity data 1240 from the image data 1224 to image data, stored in the activity database 1242, that depicts a first person assaulting a second person. Based on the match, the processor 1216 of the A/V recording and communication device 1102 may determine that the image data 1224 depicts an assault (e.g., that the image data 1224 depicts an activity). For a third example, the processor 1216 of the A/V recording and communication device 1102 may match the activity data 1240 from the image data 1224 to image data, stored in the activity database 1242, that depicts a person grabbing an object from a property and walking off with the object. Based on the match, the processor 1216 of the A/V recording and communication device 1102 may determine that the image data 1224 depicts a larceny (e.g., that the image data 1224 depicts an activity).

In some embodiments, in addition to or in place of comparing the image data 1224 to image data stored in the activity database 1242, certain sequences, patterns, and/or characteristics of events may be determined based on an analysis of the image data 1224, motion data 1230, input data 1228, and/or audio data 1226, and the sequences, patterns, and/or characteristics may be compared against sequences, patterns, and/or characteristics stored in the activity database 1243 that are indicative of activity types 1244. For example, it may be determined from the image data 1224 and/or audio data 1226 that a person loiters in proximity to a vehicle for a threshold period of time, then a door of the vehicle opens, and then an alarm of the vehicle sounds. This information (e.g., person loitering near car, car door opening, alarm sounding) may be compared against the sequences, patterns, and/or characteristics stored in the activity database 1242, and the result may be that the image data 1224 and/or audio data 1226 are indicative of a vehicle break-in. If the analysis of the image data 1224 further yielded the determination that the vehicle moved from its original location, the determination may be that the vehicle was stolen. In either example, the activity type 1244 may be determined to be a vehicle related crime and/or suspicious activity.

In some examples, based on determining that the image data 1224 depicts the activity and/or based on determining the type of activity 1244, the processor 1216 of the A/V recording and communication device 1102 may generate a user alert 1234 that indicates that the image data 1224 depicts the activity and/or the type of activity 1244. The processor 1216 of the A/V recording and communication device 1102 may then transmit, using the communication module 1212, the user alert 1234 to the first client device 1108, 1110, the hub device 1112, the backend server 1122, and/or the security monitoring service 1126.

In some examples, in addition to generating the user alert 1234, the processor 1216 of the A/V recording and communication device 1102 may generate information 1246 associated with the image data 1224. The information 1224 may describe the activity and/or the type of activity 1244 depicted by the image data 1224. After generating the information 1246, the processor 1216 of the A/V recording and communication device 1102 may transmit, using the communication module 1212, the information 1246 to the first client device 1108, 1110, the hub device 1112, the backend server 1122, and/or the security monitoring service 1126.

Figure 13:
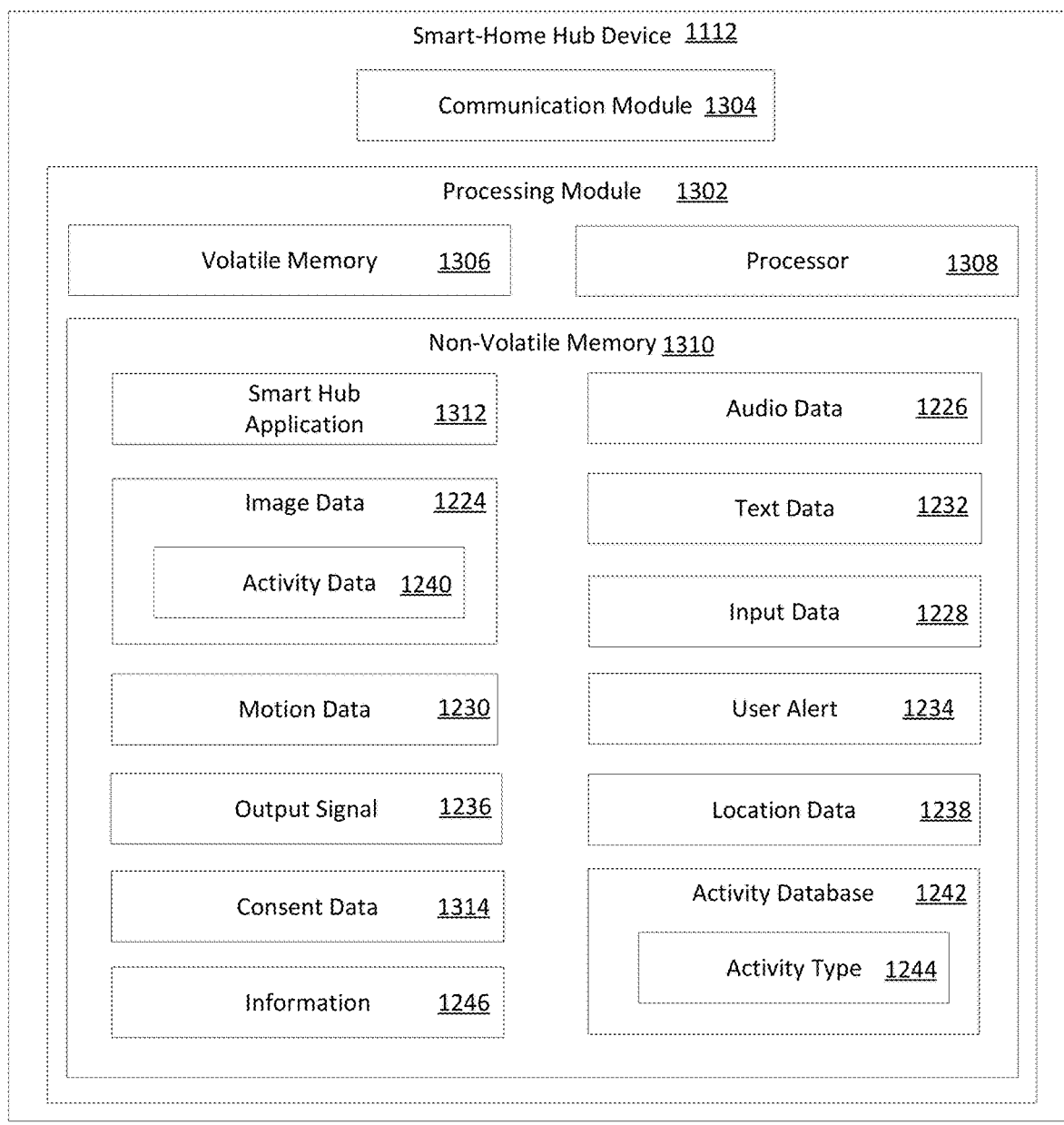
FIG. 13 is a functional block diagram illustrating one example embodiment of a hub device according to various aspects of the present disclosure.

FIG. 13 is a functional block diagram illustrating an example of the smart-home hub device 1112 (alternatively referred to herein as the hub device 1112) according to various aspects of the present disclosure. The hub device 1112 may be, for example, one or more of a Wi-Fi hub, a smart-home hub, a hub of a home security/alarm system, a gateway device, a hub for a legacy security/alarm system (e.g., a hub for connecting a pre-existing security/alarm system to the network (Internet/PSTN) 1106 for enabling remote control of the hub device 1112), and/or another similar device. The hub device 1112 may comprise a processing module 1302 that is operatively connected to a communication module 1304. In examples, the hub device 1112 may comprise one or more of a camera (not shown), a microphone (not shown), and a speaker (not shown). The processing module 1302 may comprise volatile memory 1306, a processor 1308, and non-volatile memory 1310, which includes a smart-home hub application 1312.

In various embodiments, the smart-home hub application 1312 may configure the processor 1308 to receive sensor data from the sensors 1114 and/or the automation devices 1116. For example, the sensor data may include a current state (e.g., opened/closed for door and window sensors, motion detected for motion sensors, living room lights on/off for a lighting automation system, etc.) of each of the sensors 1114 and/or the automation devices 1116. In examples, the sensor data may be received in response to sensor triggers. The sensor triggers may be a door opening/closing, a window opening/closing, lights being turned on/off, blinds being opened/closed, etc. As such, the sensor data may include the current state of the sensors 1114 and/or the automation devices 1116 as well as any updates to the current state based on sensor triggers.

With further reference to FIG. 13, the smart-home hub application 1312 may configure the processor 1308 to receive the audio data 1226, the text data 1232, the image data 1224, the motion data 1230, the input data 1228, the user alerts 1234, and/or the location data 1238 from the A/V recording and communication device 1102 (in some embodiments, via the backend server 1122 and/or the first client devices 1108, 1110) using the communication module 1304. For example, the hub device 1112 may receive and/or retrieve (e.g., after receiving a signal from the A/V recording and communication device 1102 that the A/V recording and communication device 1102 has been activated) the image data 1224, the input data 1228, and/or the motion data 1230 from the A/V recording and communication device 1102 and/or the backend server 1122 in response to motion being detected by the A/V recording and communication device 1102. Additionally, the smart-home hub application 1312 may configure the processor 1308 to transmit, using the communication module 1304, the audio data 1226, the text data 1232, the image data 1224, the motion data 1230, the input data 1228, the user alerts 1234, and/or the location data 1238 to the first client devices 1108, 1110 and/or the backend server 1122.

As described herein, at least some of the processes of the A/V recording and communication device 1102, the backend server 1122, and/or the first client device 1108, 1110 may be executed by the hub device 1112. For example, the smart hub application 1312 may configure the processor 1308 to analyze the image data 1224 in order to determine if the image data 1224 depicts an activity and/or the type of activity 1244 depicted by the image data, using the processes described above. In some examples, based on determining that the image data 1224 depicts the activity and/or based on determining the type of activity 1244, the processor 1308 of the hub device 1112 may generate a user alert 1234 that indicates that the image data 1224 depicts the activity and/or the type of activity 1244. The processor 1308 of the hub device 1112 may then transmit, using the communication module 1304, the user alert 1234 to the first client devices 1108, 1110, the backend server 1122, and/or the security monitoring service 1126. Additionally, the processor 1308 of the hub device 1112 may generate information 1246 for the image data 1224, where the information 1246 may describe the activity and/or the type of activity 1244.

As further illustrated in FIG. 13, the non-volatile memory 1310 may store consent data 1314. For example, the processor 1308 of the hub device 1112 may receive, using the communication module 1304, consent to share the image data 1224 from the A/V recording and communication devices 1102, the first client devices 1108, 1110, and/or the backend server 1122, where the consent may be represented by the consent data 1314. In addition to receiving the consent (and, in some embodiments, included with the consent), in some examples, the processor 1308 of the hub device 1112 may further receive, using the communication module 1304, information 1246 describing the image data 1224 from the first client device 1108, 1110 and/or the A/V recording and communication device 1102. The information 1246 may include, but is not limited to, comments, messages, and/or tags that describe one or more activities (e.g., suspicious behavior) depicted by the image data 1224.

In some embodiments, as described herein, a user uploading the image data 1224, audio data 1226, text data 1232, input data 1228, and/or other data to a network of users associated with a geographic area (e.g., a neighborhood) may be indicative of his or her consent. As such, in response to the user uploading (or sharing) the data with the network, the consent data 1314 may be generated and associated with the data.

For a first example, the information 1246 may include a tag that indicates a category of criminal behavior that is depicted by the image data 1224, such as larceny. For a second example, the information 1246 may include a comment describing an activity depicted by the image data 1224. For instance, the comment may include "A person picked up a package from my porch and then walked off with the package". After receiving the consent data 1314 and/or the information 1246, the processor 1308 of the hub device 1112 may transmit, using the communication module 1304, the consent data 1314 and/or the information 1246 to the backend server 1122.

Figure 14:
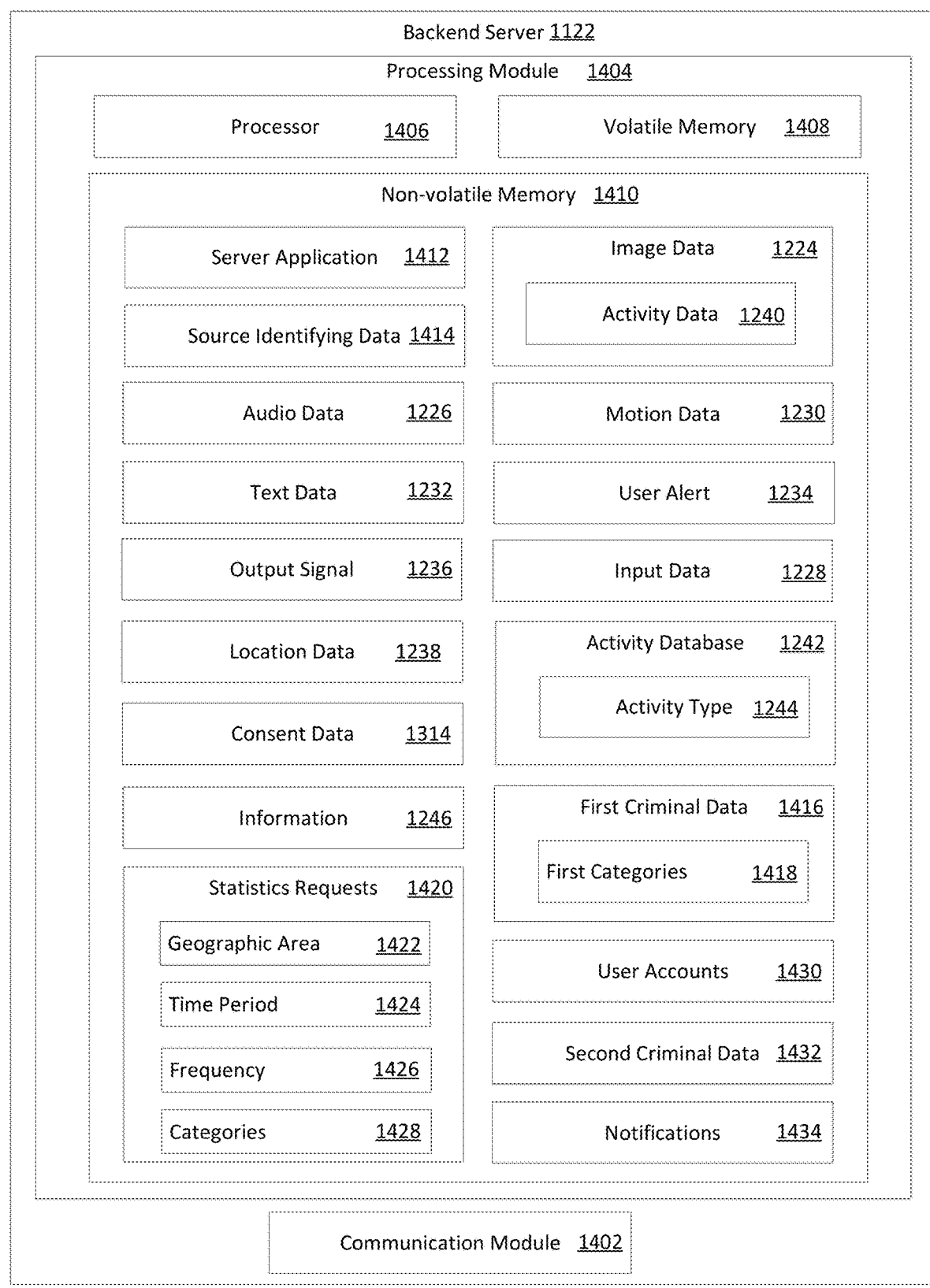
FIG. 14 is a functional block diagram illustrating one example embodiment of a backend server according to various aspects of the present disclosure.

FIG. 14 is a functional block diagram illustrating one embodiment of the backend server 1122 according to various aspects of the present disclosure. The backend server 1122 may comprise a communication module 1402 and a processing module 1404, which includes a processor 1406, volatile memory 1408, and non-volatile memory 1410. The communication module 1402 may allow the backend server 1122 to access and communicate with devices connected to the network (Internet/PSTN) 1106 (e.g., the A/V recording and communication device 1102, the hub device 1112, the first client devices 1108, 1110, a device controlled by the security monitoring service 1126, the second client device 1128, and/or the third-party services 1130). The non-volatile memory 1410 may include a server application 1412 that configures the processor 1406 to receive and/or retrieve (e.g., obtain), using the communication module 1402, the audio data 1226, the text data 1232, the input data 1228, the user alerts 1234, the image data 1224, and/or the motion data 1230 from the A/V recording and communication device 1102 (e.g., in the output signal 1236) and/or the hub device 1112. Additionally, the server application 1412 may configure the processor 1406 to receive and/or retrieve, using the communication module 1402, the location data 1238, the consent data 1314, and/or the information 1246 from the A/V recording and communication device 1102, the first client devices 1108, 1110, and/or the hub device 1112. The server application 1412 may also configure the processor 1406 to transmit (and/or forward) the audio data 1226, the text data 1232, the input data 1228, the user alerts 1234, the image data 1224, and/or the motion data 1230 to the first client devices 1108, 1110 and/or the hub device 1112 using the communication module 1402.

In further reference to FIG. 14, the non-volatile memory 1410 may also include source identifying data 1414 that may be used to identify the A/V recording and communication device 1102, the hub device 1112, and/or the first client devices 1108, 1110. In addition, the source identifying data 1414 may be used by the processor 1406 of the backend server 1122 to determine whether the first client devices 1108, 1110 are associated with the A/V recording and communication device 1102 and/or the hub device 1112.

In some embodiments, the server application 1412 may further configure the processor 1406 to generate and transmit a report signal (not shown) to a third-party client device (not shown) using the communication module 1402, which may be associated with a law enforcement agency or the security monitoring service, for example. The report signal, which may be the user alert 1234, in some examples, may include the image data 1224, the audio data 1226, and/or the text data 1232. In such embodiments, an operator of the third-party client device may be able to view the image data 1224 and/or the text data 1232 to help in making a determination of whether a person in the field of view of the A/V recording and communication device 1102 is suspicious and/or performing suspicious activities. The processor 1406 of the backend server 1122 may then receive, using the communication module 1402, data from the third-party client device that indicates the suspicious activities.

As described herein, at least some of the processes of the A/V recording and communication device 1102, the hub device 1112, and/or the first client device 1108, 1110 may be executed by the backend server 1122. For example, the server application 1412 may configure the processor 1406 to analyze the image data 1224 in order to determine if the image data 1224 depicts an activity and/or the type of activity 1244 depicted by the image data, using the processes described above. In some examples, based on determining that the image data 1224 depicts the activity and/or based on determining the type of activity 1244, the processor 1406 of the backend server 1122 may generate a user alert 1234 that indicates that the image data 1224 depicts the activity and/or the type of activity 1244. The processor 1406 of the backend server 1122 may then transmit, using the communication module 1402, the user alert 1234 to the first client devices 1108, 1110, the hub device 1112, and/or the security monitoring service 1126. Furthermore, the processor 1406 of the backend server 1122 may generate information 1246 for the image data 1224, where the information 1246 describes the activity and/or the type of activity 1244.

As further illustrated in FIG. 14, the non-volatile memory 1410 stores first criminal data 1416. The first criminal data 1416 may represent criminal statistics (referred to as "first criminal statistics") that the backend server 1122 receives and/or retrieves from the third-party services 1130. For example, the server application 1412 may configure the processor 1406 to receive and/or retrieve, using the communication module 1402, the first criminal data 1416 from the third-party services 1130. In some examples, the processor 1406 of the backend server 1122 retrieves and/or receives the first criminal data 1416 at given time intervals, such as, but not limited to, every hour, day, week, month, year, and/or the like. In some examples, the processor 1406 of the backend server 1122 retrieves and/or receives the first criminal data 1416 continuously (and/or perpetually) as the first criminal data 1416 is collected, stored, generated, filtered, and/or provided by the third-party services 1130. Still, in some examples, the processor 1406 of the backend server 1122 retrieves and/or receives the first criminal data 1416 in response to receiving requests for criminal statistics (referred to as "second criminal statistics"), as described below.

In some embodiments, the first criminal statistics represented by the first criminal data 1416 may correspond to a geographic area, such as a town, city, state, or country. Additionally, the first criminal statistics represented by the first criminal data 1416 may be organized into first categories 1418. In some examples, the first categories 1418 may correspond to categories of criminal behavior (e.g., categories of crimes). For example, the first categories 1418 may include, but are not limited to, one or more of vehicle crimes (e.g., burglary, theft, etc.), assaults, break-ins (e.g., burglary to a property, vehicle, etc.), shootings, murder, homicides, kidnapping, sex crimes, robberies, fraud, arson, embezzlement, forgery, solicitation, parcel theft, stabbing, suspicious package, armed robberies, theft, breaking and entering, vandalism, and/or any types of attempted crime and/or suspicious activity.

As further illustrated in FIG. 14, the non-volatile memory 1410 stores statistics requests 1420. For example, the server application 1412 may configure the processor 1406 to receive, using the communication module 1402, the statistics requests 1420 from client devices, such as the first client devices 1108, 1110 and/or the second client device 1128. A statistics request 1420 may include a geographic area 1422, a time period 1424, a frequency 1426, and/or categories 1428 (referred to as "second categories 1428"). The geographic area 1422 may correspond to an area in which a user is requesting second criminal statistics. For example, the geographic area 1422 may include, but is not limited to, a zip code, a town, a city, a state, a country, or the like. For another example, the geographic area 1422 may include an area of interest from which the user wishes to gather the second criminal statistics. The area of interest may include an area around the user's address, such as a radius around the user's address (e.g., five-mile radius, ten-mile radius, etc.), a polygon shape around the user's address, a triangle around the user's address, a user defined area including the user's address, or the like.

The time period 1424 may include a range of dates and/or times for requesting the second criminal statistics. For a first example, the time period 1424 may indicate a range of dates, such as October 17 through October 24. For a second example, the time period 1424 may indicate a time range, such as, but not limited to, the last day, week, month, year, and/or the like. The frequency 1426 may correspond to a time interval for which the user wishes to receive the second criminal statistics. For example, the frequency 1426 may include, but is not limited to, each hour, each day, each week, each month, and/or the like. In some examples, the backend server 1122 uses the frequency 1426 to determine when to create and/or transmit second criminal statistics to the client device that transmitted the statistics request 1420, such as the first client devices 1108, 1110 and/or the second client device(s) 1128.

The second categories 1428 may indicate categories of criminal behavior (e.g., categories of crimes and/or suspicious activities) that the user is requesting to receive the second criminal statistics and/or that the user wishes to use in order to organize the second criminal statistics. For example, the second categories 1428 may include, but are not limited to, one or more of vehicle crimes (e.g., burglary, theft, etc.), assaults, break-ins (e.g., burglary to a property, vehicle, etc.), shootings, murder, homicides, kidnapping, sex crimes, robberies, fraud, arson, embezzlement, forgery, solicitation, parcel theft, stabbing, suspicious package, armed robberies, theft, breaking and entering, vandalism, and/or any types of attempted crime and/or suspicious activity. In some examples, the second categories 1428 may be similar to the first categories 1418. In some examples, one or more of the second categories 1428 differ from one or more of the first categories 1418. For example, as described herein, the one or more first categories 1418 may be filtered and/or sorted into the one or more second categories 1428.

As further illustrated in FIG. 14, the non-volatile memory 1410 may store user accounts 1430. The server application 1412 may configure the processor 1406 to generate user accounts 1430 for users that request second criminal statistics from the backend server 1122, such as by transmitting statistics requests 1420. A user account 1430 associated with a user may include data indicating an identity of the user, a location of the user and/or the user's A/V recording and communication devices and/or hub device (e.g., physical address, physical location, GPS coordinates, etc.), contact information (e.g., phone number, email address, fax number, etc.) for a client device associated with the user, a region that the user is interested in receiving the criminal statistics for (e.g., as defined by the user, a radius around the of the user, etc.), and one or more identities of one or more A/V recording and communication devices associated with the user and/or the client device. The user account 1420 may further include data that associated the user account 1420 with a geographic area 1422 included in a statistics request 1420, a time period 1424 included in the statistics request 1420, a frequency 1426 included in the statistics request 1420, and/or second categories 1428 included in the statistics request 1420. In some examples, the processor 1406 of the hub device 1112 may then use the user accounts 1430 to determine how to create the second criminal statistics for the users and/or when to transmit the second criminal statistics to the users.

For example, based on receiving a statistics request 1420 from a client device, such as the second client device 1128 (and/or similar the first client devices 1108, 1110), the processor 1406 of the backend server 1122 may generate the second criminal statistics for the user associated with the second client device 1128. To generate the second criminal statistics, the processor 1406 of the backend server 1122 may analyze the first criminal data 1416 representing the first criminal statistics in order to identify a portion (referred to as the "first portion") of the first criminal data that corresponds to the geographic area 1422 included in the statistics request 1420. For example, the processor 1406 of the backend server 1122 may analyze the first criminal data 1416 in order to identify criminal statistics (e.g., criminal reports) that are associated with crimes and/or suspicious activities that occurred within the geographic area 1422. In some examples, the processor 1406 of the backend server 1122 then uses the first portion of the criminal data 1416 to generate the second criminal statistics.

Additionally, or alternatively, in some examples, the processor 1406 of the backend server 1122 may further analyze the first portion of the first criminal data 1416 to identify a portion (referred to as the "second portion") of the first criminal data 1416 that corresponds to both the geographic area 1422 and the time period 1424 included in the statistics request 1420. For example, the processor 1406 of the backend server 1122 may analyze the first criminal data 1416 in order to identify criminal statistics (e.g., criminal reports) that are associated with crimes and/or suspicious activities that occurred within the geographic area 1422 during the time period 1424. In such examples, the processor 1406 of the backend server 1122 may then generate the second criminal statistics using the second portion of the first criminal data 1416.

Additionally, or alternatively, in some examples, the processor 1406 of the backend server 1122 may further analyze the first portion of the first criminal data 1416 to identify a portion (referred to as the "third portion") of the first criminal data 1416 that corresponds to both the geographic area 1422 and the second categories 1428 included in the statistics request 1420. For example, the processor 1406 of the backend server 1122 may analyze the first criminal data 1416 in order to identify criminal statistics (e.g., criminal reports) that are associated with crimes and/or suspicious activities that occurred within the geographic area 1422 and are associated with the second categories 1428 of crimes and/or suspicious activities that the user is requesting. In such examples, the processor 1406 of the backend server 1122 may then generate the second criminal statistics using the third portion of the first criminal data 1416.

Additionally, or alternatively, in some examples, the processor 1406 of the backend server 1122 may further analyze the first portion, the second portion, and/or the third portion of the first criminal data 1416 to identify a portion (e.g., referred to as the "fourth portion") of the first criminal data 1416 that corresponds to each of the geographic area 1422, the time period 1424, and the second categories 1428. For example, the processor 1406 of the backend server 1122 may analyze the first criminal data 1416 in order to identify criminal statistics (e.g., criminal reports) that are associated with crimes and/or suspicious activities that occurred within the geographic area 1422, during the time period 1424, and which are associated with the second categories 1428 of crimes and/or suspicious activities that the user is requesting. In such examples, the processor 1406 of the backend server 1122 may then generate the second criminal statistics using the fourth portion of the first criminal data 1416.

In some examples, when creating the second criminal statistics, the processor 1406 of the backend server 1122 may determine one or more of the geographic area, the time period, and/or the second categories when the one or more of the geographic area 1422, the time period 1424, and/or the second categories 1428 are not included in the statistics request 1420. For a first example, the processor 1406 of the backend server 1122 may utilize a default geographic area, such as, but not limited to, the zip code, the town, the city, the state, the country, a radius, or the like in which the user's address is included. Additionally, or alternatively, and for a second example, the processor 1406 of the backend server 1122 may utilize a default time period, such as, but not limited to, a day, a week, a month, a year, and/or the like. Additionally, or alternatively, and for a third example, the processor 1406 of the backend server 1122 may utilize one or more default second categories, such as, but not limited to, one or more of vehicle crimes (e.g., burglary, theft, etc.), assaults, break-ins (e.g., burglary to a property, vehicle, etc.), shootings, murder, homicides, kidnapping, sex crimes, robberies, fraud, arson, embezzlement, forgery, solicitation, parcel theft, stabbing, suspicious package, armed robberies, theft, breaking and entering, vandalism, and/or any types of attempted crime and/or suspicious activity.

In some examples, the processor 1406 of the backend server 1122 may further generate the second criminal statistics using image data generated by one or more A/V recording and communication devices that are located within the geographic area 1422 and/or information describing the image data. For example, the processor 1406 of the backend server 1122 may utilize the location data 1238 to determine that the A/V recording and communication device 1102 is located within the geographic area 1422. Based on the determination, the processor 1406 of the backend server 1122 may determine that the user associated with the A/V recording and communication devices 1102 has provided consent to share image data 1224 generated by the A/V recording and communication device 1102. Furthermore, the processor 1406 of the backend server 1122 may determine that the image data 1224 was generated by the A/V recording and communication device 1102 during the time period corresponding to the second criminal statistics, such as the time period 1424. Additionally, in some examples, the processor 1406 of the backend server 1122 may determine that the image data 1224 depicts an activity that corresponds to one of the second categories corresponding to the second criminal statistics, such as one of the second categories 1428. In response, the processor 1406 of the backend server 1122 may utilize the image data 1224 and/or the information 1246 when creating the second criminal statistics.

For example, if the information 1246 describes a suspicious activity depicted within the image data 1224, the processor 1406 of the backend server 1122 may analyze the information 1246 to determine a second category 1428 corresponding to the image data 1224. For instance, if the information 1246 describes that the image data 1224 depicts a person breaking into a vehicle, then the processor 1406 of the backend server 1122 may determine that the image data 1224 corresponds to a break-in (e.g., burglary) category 1428 and/or a vehicle crime category 1428. For a second example, if the information 1246 describes that the image data 1224 depicts a first person assaulting a second person, then the processor 1406 of the backend server 1122 may determine that the image data 1224 corresponds to an assault category 1428. For a third example, if the information 1246 describes that the image data 1224 depicts person grabbing an object from a property and walking off with the object, then the processor 1406 of the backend server 1122 may determine that the image data 1224 corresponds to larceny category 1428. In either of the examples, and in response to determining that the image data 1224 corresponds to one of the categories 1428, the processor 1406 of the backend server 1122 may add a statistic associated with the image data 1224 to the second criminal statistics. For example, if the image data 1224 is associated with larceny, the processor 1406 of the backend server 1122 may add an additional larceny to the second criminal statistics.

Additionally, or alternatively, to using the information 1246, the processor 1406 of the backend server 1122 may utilize the analysis of the image data 1224 (e.g., by comparing the image data to the activity database 1242 and/or by comparing patterns, sequences, and/or characteristics from the data generated by the A/V recording and communication device 1102 to the activity database 1242, as described above) to determine the second category 1428 corresponding to the image data 1224. For example, the processor 1406 of the backend server 1122 may match the activity data 1240 from the image data 1224 to image data, stored in the activity database 1242, that depicts a person grabbing an object from a property and walking off with the object. Based on the match, the processor 1406 of the backend server 1122 may determine that the image data 1224 depicts a larceny. In response, the processor 1406 of the backend server 1122 may generate information 1246 describing that the image data 1224 depicts a larceny. Additionally, the processor 1406 of the backend server 112 may add a statistic associated with the image data 1224 to the second criminal statistics. For example, the processor 1406 of the backend server 1122 may add an additional larceny to the second criminal statistics.

In some examples, when using the image data 1224 to create the second criminal statistics, the processor 1406 of the backend server 1122 may include the image data 1224 with the second criminal statistics. As such, the user requesting the second criminal statistics may be able to view the image data 1224 after receiving the second criminal statistics. In other examples, when using the image data 1224 to create the second criminal statistics, the processor 1406 of the backend server 1122 may include a link to view the image data 1224. As such, the user requesting the second criminal statistics may be able to use the link to request the image data 1224 from the backend server 1122.

After generating the second criminal statistics, the server application 1412 may configure the processor 1406 to transmit, using the communication module 1402, second criminal data 1432 representing the second criminal statistics to the client device that transmitted the statistics request 1420, such as the second client device 1128 in the examples above. As discussed above, the second criminal categories may be organized using one or more second categories, such as the second categories 1428. In some examples, the second categories may be similar to the first categories 1418. In some examples, one or more of the second categories may be different than one or more of the first categories 1418.

As further illustrated in FIG. 14, the non-volatile memory 1410 further stores notifications 1434. The server application 1412 may configure the processor 1406 to generate a notification 1434, which may indicate that the second criminal statistics have been created and/or are ready for review by the user. For example, after creating the second criminal statistics, the processor 1406 of the backend server 1122 may generate the notification 1434 indicating that the second criminal statistics are ready for the user of the second client device 1128 to review. Additionally, the processor 1406 of the backend server 1122 may transmit, using the communication module 1402, the notification 1434 to the second client device 1128. After sending the notification 1434, the processor 1406 of the backend server 1122 may receive, using the communication module 1402, a message from the second client device 1128 that the user wishes to receive the second criminal statistics, which may also be indicated by a statistics request 1420. In response, the processor 1406 of the backend server 1122 may transmit, using the communication module 1402, the second criminal data 1432 representing the second criminal statistics to the second client device 1128.

In some examples, such as when the statistics request 1420 indicates the frequency 1426 (which may then be associated with a user account 1430 of the user) for receiving the second criminal statistics, the server application 1412 may configure the processor 1406 to generate the second criminal statistics for the user based on the frequency 1426. For example, if the frequency 1426 indicates that the user wishes to receive the second criminal statistics every week, then the server application 1412 application may configure the processor 1406 to generate the second criminal statistics each week using new first criminal data 1416, new image data 1224, and/or new information 1246 describing the new image data 1224, using the processes described above. The server application 1412 may then configure the processor 1406 to transmit, using the communication module 1402, and to the second client device 1128, the notification 1434 indicating that the second criminal statistics are ready for viewing and/or the second criminal data 1432 representing the second criminal statistics. As such, the user associated with the second client device 1128 may continue to receive updated criminal statistics from the backend server 1122 at time intervals that are based on the frequency 1426.

Figure 15:
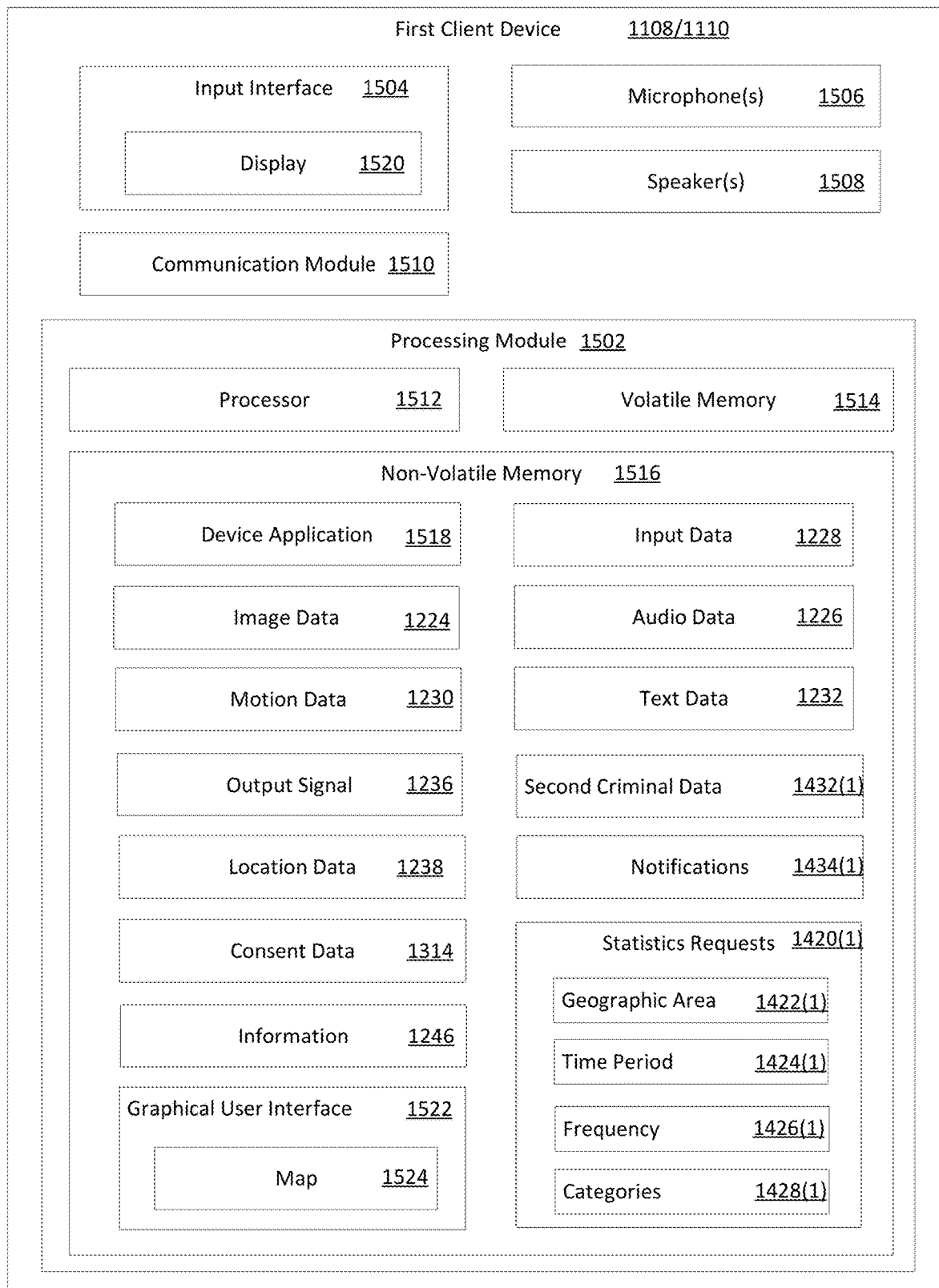
FIG. 15 is a functional block diagram illustrating one example embodiment of a first client device according to various aspects of the present disclosure.

FIG. 15 is a functional block diagram illustrating one embodiment of a first client device 1108, 1110 according to various aspects of the present disclosure. The first client device 1108, 1110 may comprise a processing module 1502 that is operatively connected to an input interface 1504, microphone(s) 1506, speaker(s) 1508, and a communication module 1510. The first client device 1108, 1110 may further comprise a camera (not shown) operatively connected to the processing module 1502. The processing module 1502 may comprise a processor 1512, volatile memory 1514, and non-volatile memory 1516, which includes a client application 1518. In various embodiments, the client application 1518 may configure the processor 1512 to receive input(s) to the input interface 1504 (e.g., requests for access to the A/V recording and communication device 1102), for example.

In addition, the client application 1518 may configure the processor 1512 to receive, using the communication module 1510, the input data 1228, the image data 1224, the audio data 1226, the output signal 1236, the user alerts 1234, and/or the location data 1238 from one or more of the A/V recording and communication device 1102, the hub device 1112, or the backend server 1122. Furthermore, the client application 1518 may configure the processor 1512 to receive and/or retrieve, using the communication module 1502, the notifications 1434(1) and/or the second criminal data 1432(1) from one or more of the hub device 1112 or the backend server 1122. Furthermore, the client application 1518 may configure the processor 1512 to transmit, using the communication module 1510, the input data 1228, the image data 1224, the audio data 1226, the output signal 1236, the user alerts 1234, the location data 1238, the information 1246, and/or the statistics requests 1420(1) to one or more of the hub device 1112 or the backend server 1122.

In some embodiments, the first client device 1108, 1110 may generate, using the communication module 1510, the consent data 1314 using the image data 1224, the audio data 1226, and/or the text data 1232. Additionally, the device application 1518 may configure the processor 1512 to transmit, using the communication module 1510, the consent data 1314 to one or more of the hub device 1112 and the backend server 1122. As further described below, the consent data 1314 may be received by the backend server 1122 and, in response, at least the image data 1224 may be provided to members of a geographic area using client devices such as (but not limited to) the first client devices 1108, 1110 and the second client device 1128.

With further reference to FIG. 15, the input interface 1504 may include a display 1520. The display 1520 may include a touchscreen, such that the user of the first client device 1108, 1110 may provide inputs directly to the display 1520 (e.g., a request for access to the A/V recording and communication device 1102). In some embodiments, the first client device 1108, 1110 may not include a touchscreen. In such embodiments, the user may provide an input using any input device, such as, without limitation, a mouse, a trackball, a touchpad, a joystick, a pointing stick, a stylus, etc.

In some examples, based at least in part on receiving a user alert 1234, the device application 1518 may configure the processor 1512 to cause the display 1520 to display the user alert 1234. While displaying the user alert 1234, the user interface 1504 may receive input from the user to answer the user alert 1234. In response, the device application 1518 may configure the processor 1512 to display the received image data 1224 using the display 1520. Additionally, the device application 1518 may configure the processor 1512 to output audio represented by the audio data 1226 using the speaker 1508. Furthermore, the device application 1520 may configure the processor 1512 to receive, using the user interface 1504, input associated with the information 1246 describing the image data 1224.

In some examples, the device application 1518 may further configure the processor 1512 to display a graphical user interface (GUI) 1522 using the display 1520. The GUI 1522 may allow the user to request the second criminal statistics from the backend server 1122. For example, the processor 1512 of the first client device 1108, 1110 may receive, using the input interface 1504, input indicating a geographic location. Based on receiving the input, the device application 1518 may configure the processor 1512 to display, using the display 1520, a map 1524 corresponding to an initial geographic area, wherein the initial geographic area includes at least the inputted location. Next, the processor 1512 of the first client device 1108, 1110 may receive, using the input interface 1504, one or more inputs indicating one or more of the geographic area 1422(1) (which may correspond to a geographic area 1422), the time period 1424(1) (which may correspond to a time period 1424), the frequency 1426(1) (which may correspond to a frequency 1426), and the categories 1428(1) (which may correspond to categories 1428). In response, the device application 1518 may configure the processor 1512 to generate a statistics request 1420(1) (which may correspond to a statistics request 1420), where the statistics request 1420(1) includes the one or more of the geographic area 1422(1), the time period 1424(1), the frequency 1426(1), and the categories 1428(1). The device application 1518 may then configure the processor 1512 to transmit, using the communication module 1510, the statistics request 1420(1) to the backend server 1122 (which may be via the hub device 1112).

In some examples, the device application 1518 may configure the processor 1512 to display notifications 1434(1) (which may correspond to a notification 1434) when the first client device 1108, 1110 receives the notifications 1434(1) from the backend server 1122. When displaying the notifications 1343(1), the processor 1512 of the first client device 1108, 1110 may receive, using the input interface 1504, input indicating that the user would like to receive the second criminal statistics. In response, the device application 1518 may configure the processor 1512 to transmit, using the communication module 1510, a request to the backend server 1122 for the second criminal statistics, which may also be represented by a statistics request 1420(1). Based on transmitting the request, the processor 1512 of the first client device 1108, 1110 may receive, from the backend server 1122, the second criminal data 1432(1) representing the second criminal statistics.

In response to receiving the second criminal data, the device application 1518 may configure the processor 1512 to display at least a portion of the second criminal statistics using the display 1510. As shown in detail below, the at least the portion of the second criminal statistics may indicate a number of incidents (e.g., crimes, suspicious activity, etc.) per category 1428(1), locations of one of more of the incidents (e.g., using the map 1524), whether one or more of the incidents corresponds to image data (e.g., the image data 1224) and/or information (e.g., information 1246) describing the image data, and/or the like. In some examples, processor 1512 of the first client device 1108, 1110 may then receive input associated with the at least the portion of the second criminal statistics and perform an action in response. For a first example, the processor 1512 of the first client device 1108, 1110 may receive input selecting one of the incidents and, in response, display additional information (e.g., a criminal report associated with the incident, image data of the incident, etc.) using the display 1520. For a second example, the processor 1512 of the first client device 1108, 1110 may receive input selecting one of the incidents associated with the image data 1224 and, in response, display the image data 1224 using the display. For a third example, the processor 1512 of the first client device 1108, 1110 may receive input that causes the processor 1512 to display a second portion of the second criminal statistics using the display. In such an example, the input may correspond to the user scrolling through the second criminal statistics and/or the user selecting a new geographic area to display on the GUI 1522.

Figure 16:
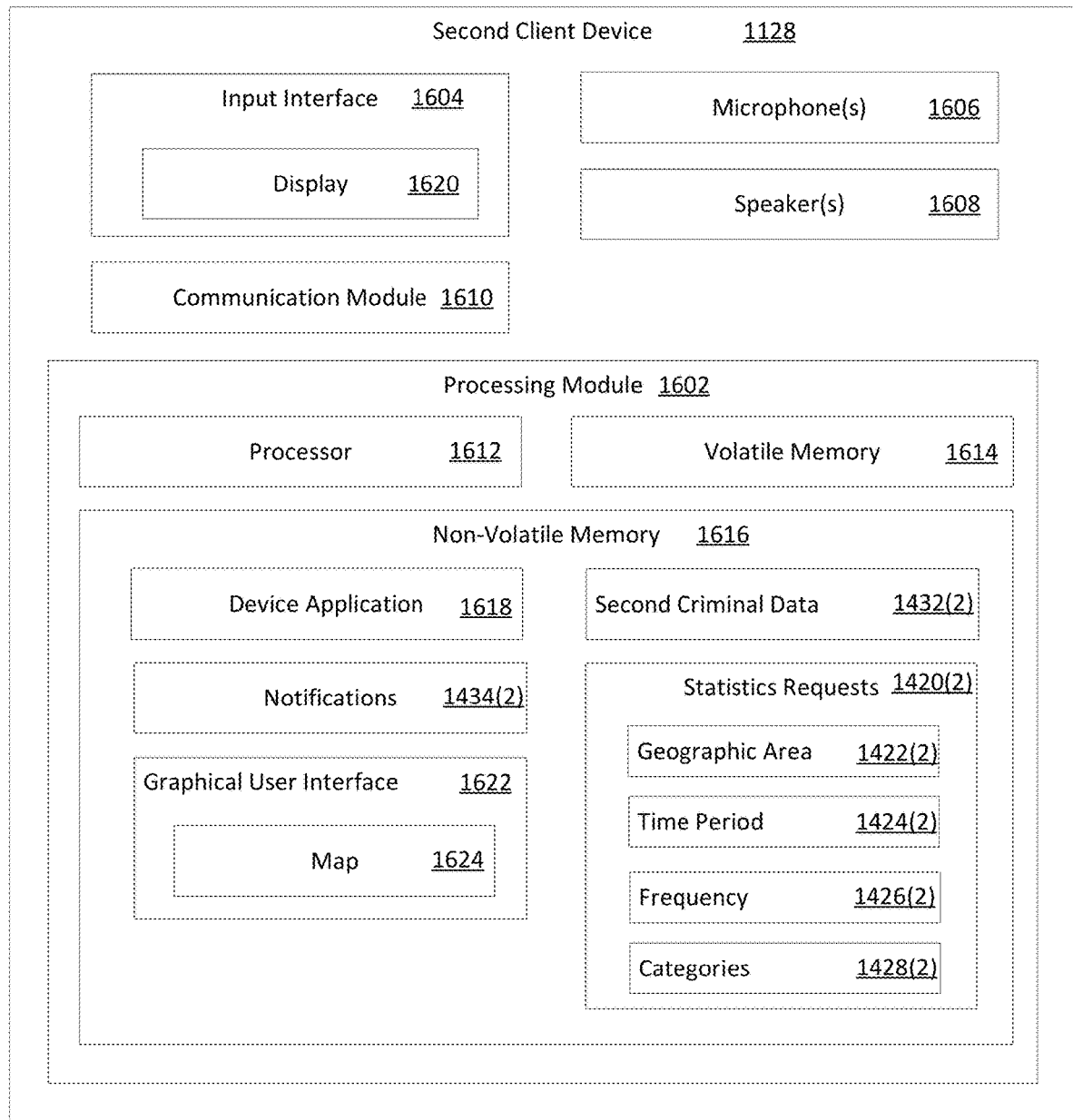
FIG. 16 is a functional block diagram illustrating one example embodiment of a second client device according to various aspects of the present disclosure.

FIG. 16 is a functional block diagram illustrating one embodiment of a second client device 1128 according to various aspects of the present disclosure. The second client device 1128 may comprise a processing module 1602 that is operatively connected to an input interface 1604, microphone(s) 1606, speaker(s) 1608, and a communication module 1610. The second client device 1128 may further comprise a camera (not shown) operatively connected to the processing module 1602. The processing module 1602 may comprise a processor 1612, volatile memory 1614, and non-volatile memory 1616, which includes a device application 1618.

With further reference to FIG. 16, the input interface 1604 may include a display 1620. The display 1620 may include a touchscreen, such that the user of the first client device 1108, 1110 may provide inputs directly to the display 1620 (e.g., a request for access to the A/V recording and communication device 1102). In some embodiments, the first client device 1108, 1110 may not include a touchscreen. In such embodiments, the user may provide an input using any input device, such as, without limitation, a mouse, a trackball, a touchpad, a joystick, a pointing stick, a stylus, etc.

In some examples, device application 1618 may be similar to the device application 1518 and may configure the processor 1612 to perform similar processes as the processor 1512 described above. For example, the device application 1618 may configure the processor 1612 to display a GUI 1622 using the display 1620, where the GUI 1622 is configured to request the second criminal statistics (which may differ (e.g., based on location information) from the second criminal statistics requested/received by the first client device 1108, 1110) from the backend server 1122. For example, the processor 1612 of the second client device 1128 may receive, using the input interface 1604, input indicating a location. Based on receiving the input, the device application 1618 may configure the processor 1612 to display a map 1624 on the GUI, where the map 1624 includes an initial geographic area that includes at least the location. While displaying the map 1624, the processor 1612 of the second client device 1128 may receive one or more inputs indicating one more of a geographic area 1422(2) (which may correspond to a geographic area 1422), a time period 1424(2) (which may correspond to a time period 1424), a frequency 1426(2) (which may correspond to a frequency 1426), and/or categories 1428(2) (which may correspond to categories 1428). In response, the device application 1618 may configure the processor 1612 to generate a statistics request 1420(2) (which may correspond to a statistics request 1420) that includes the one or more of the geographic area 1422(2), the time period 1424(2), the frequency 1426(2), and/or the categories 1428(2). The device application 1618 may then configure the processor 1612 to transmit, using the communication module 1610, the statistics request 1420(2) to the backend server 1122.

Additionally, the device application 1618 may configure the processor 1612 to receive, using the communication module 1610, a notification 1434(2) (which may correspond to a notification 1434) that the second criminal statistics are ready for view. The processor 1612 of the second client device 1128 may then receive input associated with viewing the second criminal statistics and, in response, transmit another statistics request 1420(2) to the backend server 1122 using the communication module 1610. After transmitting the second statistics request 1420(2), the device application 1618 may configure the processor 1612 to receive, using the communication module 1610, second criminal data 1432(2) representing the second criminal statistics. The device application 1618 may then configure the processor 1612 to display at least a portion of the second criminal statistics, using similar processes as described above for the first client device 1108, 1110. Additionally, while displaying the at least the portion of the second criminal statistics, the device application 1618 may configure the processor 1612 to perform one or more actions (similar to the actions above) in response to receiving input using the input interface.

In some embodiments, the geographic area 1422(1), the time period 1424(1), the frequency 1426(1), and the categories 1428(1) included in the statistics request 1420(1) may be similar to the geographic area 1422(2), the time period 1424(2), the frequency 1426(2), and the categories 1428(2) included in the statistics request 1420(2). In some embodiments, one or more of the geographic area 1422(1), the time period 1424(1), the frequency 1426(1), and the categories 1428(1) included in the statistics request 1420(1) may be different than the geographic area 1422(2), the time period 1424(2), the frequency 1426(2), and the categories 1428(2) included in the statistics request 1420(2). In such embodiments, a first user associated with the first client device 1108, 1110 may request second criminal statistics that differ from a second user of the second client device 1128, even if an address of the first user is located proximate (e.g., within 100 feet, 100 yards, a block, a mile, 20 miles, etc.) to an address of the second user. In other words, each user is capable of tailoring the second criminal statistics based on preferences of the respective user. For example, because each user may be able to define a geographic area for which the user desires to receive the second criminal statistics, such as by defining a radius, by dragging and dropping markers to create an amorphous area, and/or by other methods.

In the illustrated embodiment of FIGS. 12-16, the various components including (but not limited to) the processing modules 1202, 1302, 1404, 1502, 1602 and the communication modules 1212, 1304, 1406, 1510, 1610 are represented by separate boxes. The graphical representations depicted in each of FIGS. 12-16 are, however, merely examples, and are not intended to indicate that any of the various components of the A/V recording and communication device 1102, the hub device 1112, the backend server 1122, the first client device 1108, 1110, and the second client device 1128 are necessarily physically separate from one another, although in some embodiments they might be. In other embodiments, however, the structure and/or functionality of any or all of the components of the A/V recording and communication device 1102 may be combined. In addition, in some embodiments the communication module 1212 may include its own processor, volatile memory, and/or non-volatile memory. Likewise, the structure and/or functionality of any or all of the components of the hub device 1112 may be combined. In addition, in some embodiments the communication module 1304 may include its own processor, volatile memory, and/or non-volatile memory. Moreover, the structure and/or functionality of any or all of the components of the backend server 1122 may be combined. In addition, in some embodiments the communication module 1402 may include its own processor, volatile memory, and/or non-volatile memory. Furthermore, the structure and/or functionality of any or all of the components of the first client device 1108, 1110 may be combined. In addition, in some embodiments the communication interface 1510 may include its own processor, volatile memory, and/or non-volatile memory. Finally, the structure and/or functionality of any or all of the components of the second client device 1128 may be combined. In addition, in some embodiments the communication interface 1610 may include its own processor, volatile memory, and/or non-volatile memory.

Figure 17:
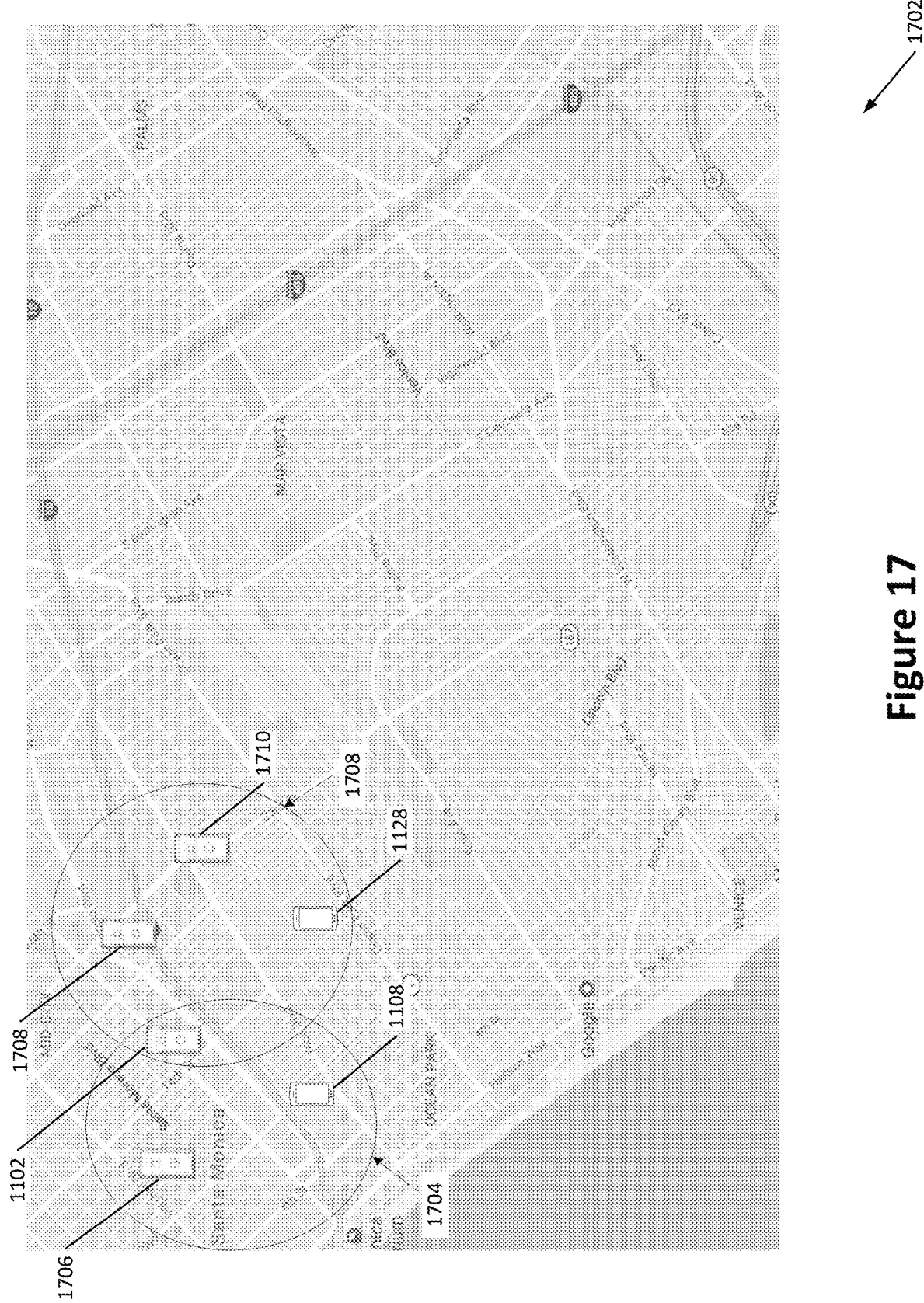
FIG. 17 is a screenshot of a map illustrating a plurality of network areas according to an aspect of the present disclosure.

FIG. 17 is a screenshot of a map 1702 illustrating a plurality of geographic areas according to an aspect of the present disclosure. In many embodiments, each of the plurality of geographic areas may include a subset of the users of the network of users corresponding to a geographical area. In some embodiments, an individual geographic area of the plurality of geographic areas may include a grouping of A/V recording and communication devices that are located an area that may be defined using various methods. For example, the individual geographic area may be associated with a town, city, state, neighborhood, or country. In a further example, the individual geographic area may be determined by the backend server 1122 based on grouping a particular number of A/V recording and communication devices about a particular vicinity. In a further example, a user may customize a geographic area (e.g., geographic area 1422). In some embodiments, various A/V recording and communication devices may be grouped into only one geographic area or more than one geographic area. In other embodiments, various A/V recording and communication devices may not be grouped into any geographic area.

In reference to FIG. 17, the map 1702 illustrates a first geographic area 1704 identified as Santa Monica, Calif. In many embodiments, the first geographic area 1704 may include one or more A/V recording and communication devices, such as (but not limited to) the A/V recording and communication device 1102 and a second A/V recording and communication device 1706. As described above, the A/V recording and communication device 1102 may be associated with the first client device 1108 and configured to share video footage (e.g., the image data 1224) captured by the A/V recording and communication device 1102. Likewise, the second A/V recording and communication device 1706 may be associated with another client device (not shown) and configured to share video footage (e.g., the second image data) captured by the second A/V recording and communication device 1706. Further, the map 1702 illustrates a second geographic area 1708. In many embodiments, the second geographic area 1708 may include one or more A/V recording and communication devices, including the A/V recording and communication device 1102, a third A/V recording and communication device 1708, and a fourth A/V recording and communication device 1710.

In some embodiments, a first user may use the first client device 1108 to customize the first geographic area 1704 (which may correspond to the geographic area 1422(1) in some examples) and a second user may use the second client device 1128 to customize the second geographic area 1708 (which may correspond to the geographic area 1422(2) in some examples). For example, the backend server 1122 may create criminal statistics associated with the first geographic area 1704 for the first user. The criminal statistics may include data corresponding to one or more suspicious activities and/or crimes depicted by image data generated by the A/V recording and communication device 1102 and the second A/V recording and communication device 1706. Additionally, the backend server 1122 may create criminal statistics associated with the second geographic area 1706 for the second user. The criminal statistics may include data corresponding to one or more suspicious activities depicted by image data generated by the A/V recording and communication device 1102, the third A/V recording and communication device 1708, and the fourth A/V recording and communication device 1710.

Figure 18:
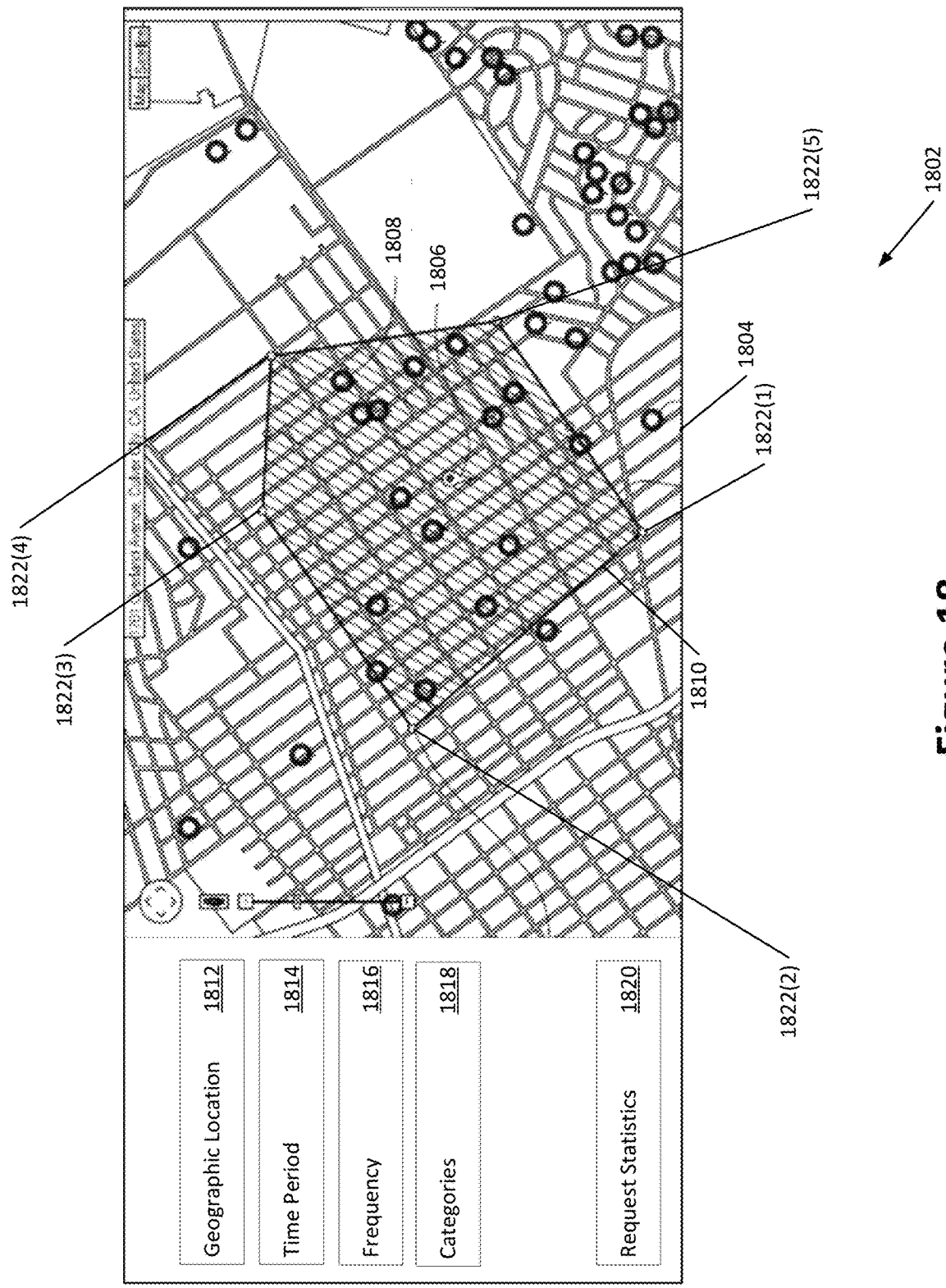
FIG. 18 is a sample screenshot of a graphical user interface (GUI) associated with a process for requesting criminal statistics associated with a geographic area according to various aspects of the present disclosure.

FIG. 18 illustrates one example of a graphical user interface (GUI) 1802 (which may correspond to the GUI 1522 and/or the GUI 1622) associated with a process for requesting criminal statics associated with a geographic area. For example, a requesting party may login through a user portal at a website (or using a mobile application) using a client device, which may include the second client device 1128 in the example of FIG. 18 (however, it could also include the first client device 1108 performing similar processes in other examples). Using the GUI 1802, the requester may enter an address that identifies a location around which the requester wishes to receive the criminal statistics. The GUI 1802 then displays a map 1804 (which may correspond to the map 1624) of the geographic area around the address. An icon of a first type 1806 may indicate the location of the entered address on the map 1804. The map 1804 may further display one or more additional icons of a second type 1808 (although only one is labeled) that indicate the locations of A/V recording and communication devices.

Using the map 1804, the requester may then specify an area 1810 of interest (from which the requester wishes to gather the second criminal statistics) by indicating the area 1810 on the map 1804. The requester may specify the area 1810 from which the second criminal statistics will be created in any of a variety of ways. For example, the requester may draw a polygon of any shape and size on the map 1804 of the GUI 1802 by specifying locations of vertices of the polygon, such as by touching, dragging, and/or dropping the locations of the vertices 1822(1)-1822(5), if the second client device 1128 includes a touchscreen, or by using a pointing device, such as a mouse or a trackball, and an onscreen pointer to specify the locations of the vertices 1822(1)-1822(5). In certain embodiments, the polygon specified by the requester may not have any vertices 1822(1)-1822(5), such as a circle. The requester in such an embodiment may specify an area of interest by providing a radius around the address that the requester has entered.

In some embodiments, the area 1810 of interest may be the same area 1810 of interest that the user defined when joining a network of users associated with the user's geographic area. For example, the user may have joined a "neighborhoods network", a "local community watch network", or another type of network that is associated with the user's geographic location. When joining, the user may have defined the area 1810 that the user is interested in receiving shared information from other users of the network, such as data generated by A/V recording and communication devices located within the area 1810 and/or data generated by security systems within the area 1810. As such, the backend server 1122, with or without user input, may utilize the previously defined area 1810 as the area 1810 for generating the second criminal statistics. In examples where user input is requested, the user may be able to select a "use existing area" button, or input "use existing area" within the first text box and/or dropdown menu 1812.

With further reference to FIG. 18, the GUI 1802 may also include a first text box and/or dropdown menu 1812 that enables the requester to identify the geographic location 1806, a second text box and/or dropdown menu 1814 that enables the requester to identify the time period (e.g., the time period 1424(2)), a third text box and/or dropdown menu 1816 that enables the requester to identify the frequency (e.g., the frequency 1426(2)), and a fourth text box and/or dropdown menu 1818 that enables the requester to identify the categories (e.g., the categories 1428(2)). Furthermore, the GUI 1802 includes a button and/or other graphical element 1820 that enables the requester to cause the second client device 1128 to transmit a statistics request (e.g., the statistics request 1420(2)) for the second criminal statistics.

Figure 19:
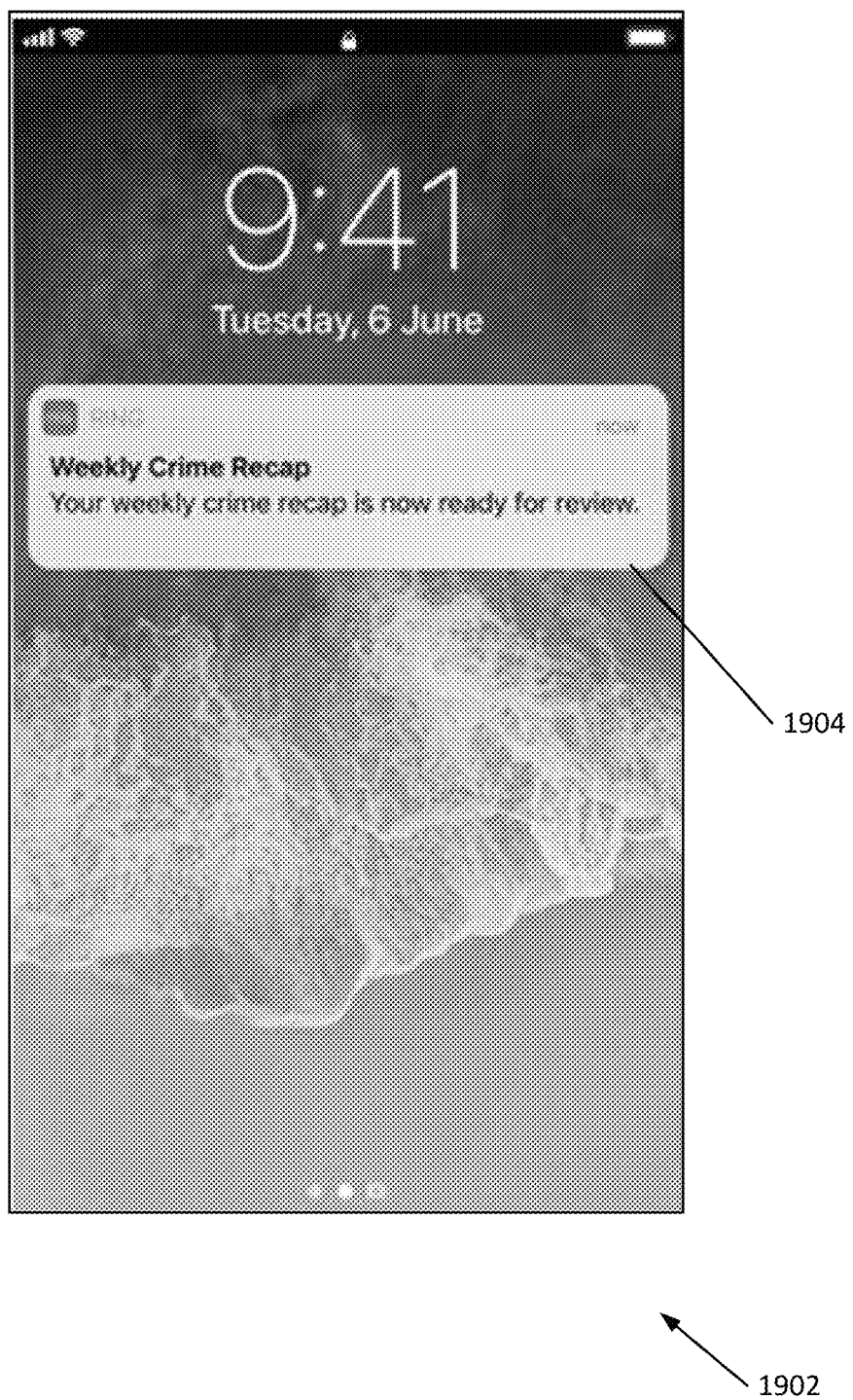
FIG. 19 is a screenshot of a GUI illustrating an example of providing a notification according to various aspects of the present disclosure.

FIG. 19 is a screenshot of a GUI 1902 illustrating an example of providing a notification 1904 according to various aspects of the present disclosure. For example, the second client device 1128 (and/or similarly the first client device 1108) may display the GUI 1902 to a user, such as when the second client device 1128 receives a notification 1434 from the backend server 1122 that the second criminal statistics are ready to review. As shown, the GUI 1902 may provide the notification 1904 indicating that the second criminal statistics are ready for review. For example, the notification 1904 may include, but is not limited to, a message reciting "Your weekly crime recap is now ready for review". In other examples, the notification 1904 may include any other type of message, graphical indicator, and/or alert (e.g., a sound output by the second client device 1128) that indicates to the second criminal statistics are available to review.

In some embodiments, the notification 1904 may be included in a feed within the device application 1618 operating on the second client device 1128. For example, the user may be viewing a feed that includes the shared data (e.g., image data, audio data, textual data, etc.) from other users in the user's geographic area (e.g., neighborhood), news stories, and/or other information, and within the feed, one of the items may be the notification 1904. The notification 1904, in such an example, may include information such as "Your weekly crime recap for the week of January 8-January 14 is now ready for review, this week there were 18 assaults in your neighborhood."

Figure 20:
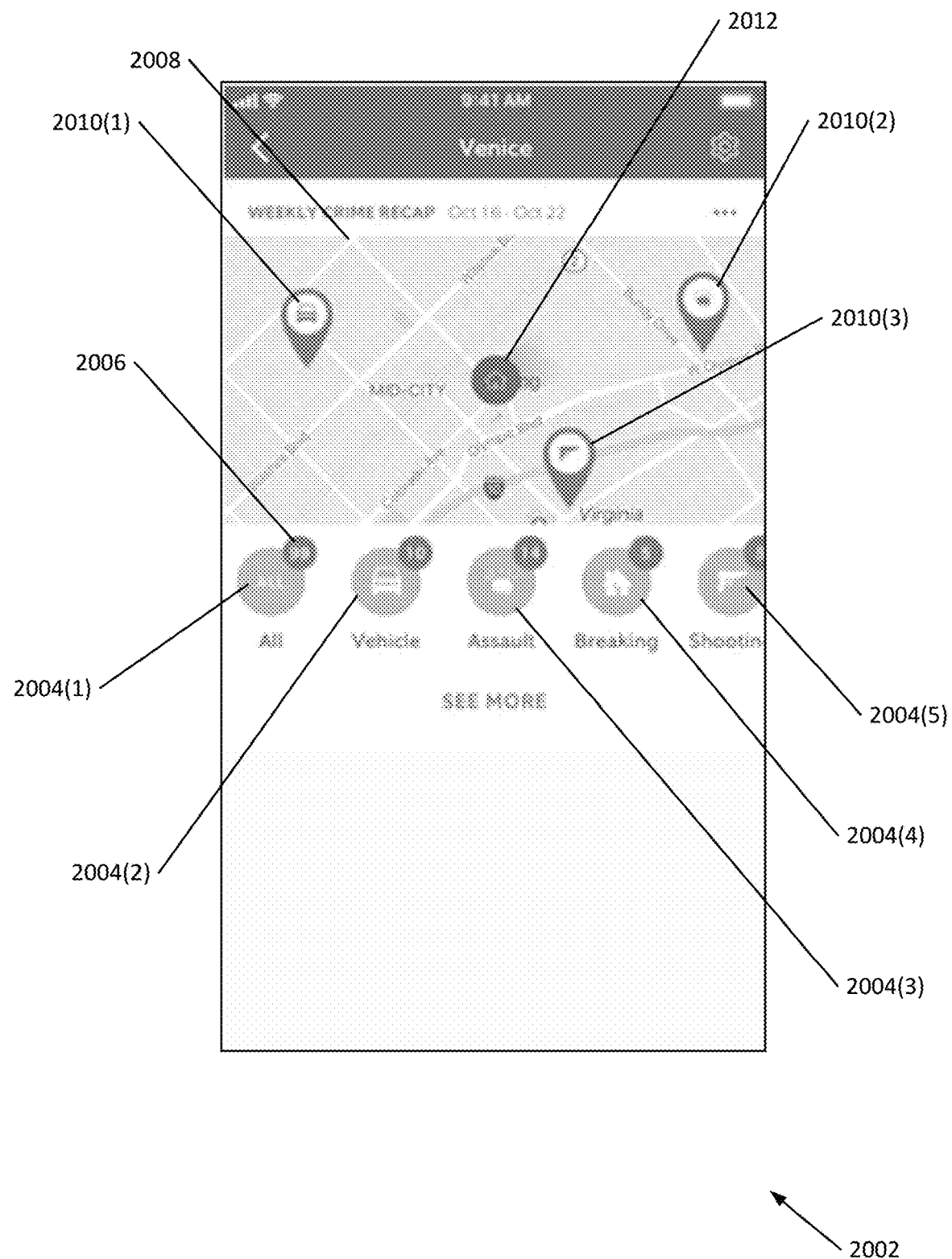
FIG. 20 is a screenshot of a GUI illustrating an example of providing criminal statistics that are organized according to categories according to various aspects of the present disclosure.

FIG. 20 is a screenshot of a GUI 2000 illustrating an example of providing second criminal statistics that are organized according to categories according to various aspects of the present disclosure. For example, the second client device 1128 (and/or similarly the first client device 1108) may display the GUI 2002 to a user, such as when the second client device 1128 receives the second criminal statistics from the backend server 1122. As shown, the GUI 2002 may include categories 2004(1)-2004(5), which, in the example, include an all category 2004(1), a vehicle category 2004(2), an assault category 2004(3), a breaking category 2004(4), and a shooting category 2005(5). The GUI 2002 may further include a number of incidents 2006 (criminal reports, suspicious activity, information describing image data, etc.) for each category 2005(1) 2005(5), although, for illustrative purposes, only the number of incidents 2006 is labeled for the all category 2004(1).

Additionally, the GUI 2002 may include a map 2008 of a geographic area, wherein the map 2008 includes icons 2010(1)-2010(3) indicating the locations of the incidents (e.g., police reports, suspicious activities, image data captured by A/V recording and communication devices and shared by the associated users, etc.). For example, a first icon 2010(1) indicates the location of a first incident that is included within the vehicle category 2004(2), a second icon 2010(2) indicates the location of a second incident that is included in the assault category 2004(3), and a third icon 2010(3) indicates the location of a third incident that is included in the shooting category 2004(5). Furthermore, the map 2008 may include an icon 2012 that indicates a location of the user's address. As such, the user may use the GUI 2002 to determine which incidents are occurring near the user's address, such as in within a geographic area including the user's address.

Figure 21:
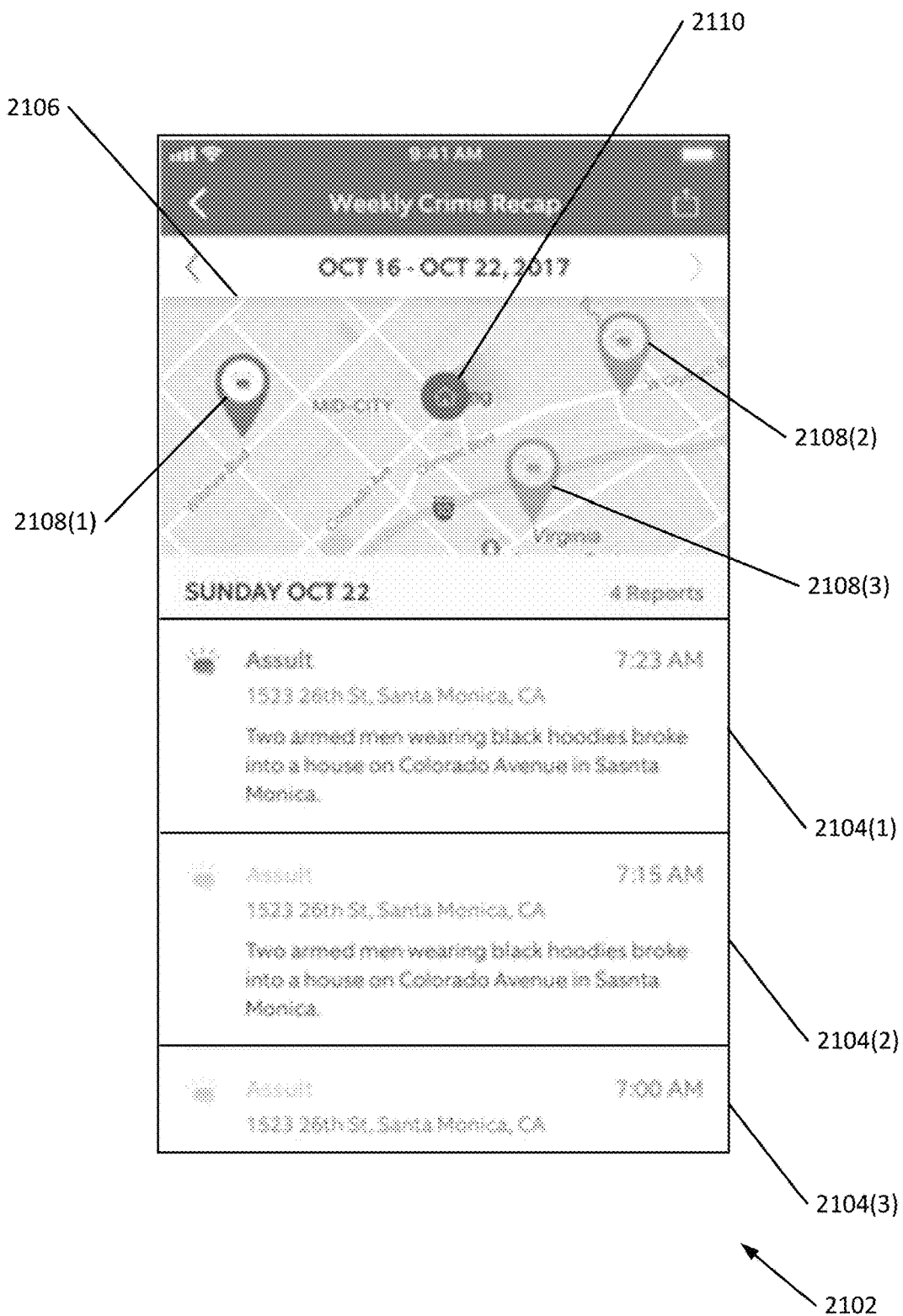
FIG. 21 is a screenshot of a GUI illustrating an example of providing criminal statistics that are specific to one of the categories according to various aspects of the present disclosure.

FIG. 21 is a screenshot of a GUI 2100 illustrating an example of providing second criminal statistics that are specific to one of the categories according to various aspects of the present disclosure. For example, the second client device 1128 (and/or similarly the first client device 1108) may display the GUI 2102 to a user, such as when the second client device 1128 receives input selecting a category (e.g., the assault category 2004(3) from the example GUI 2002 from FIG. 20). As shown, the GUI 2102 may include details for incidents 2104(1)-2104(3) that are included in the selected category. For example, each of the details for the incidents 2104(1)-2104(3) includes the type of incident, the location of the incident, and details about what occurred during the incident. In some embodiments, the incidents 2104(1)-2104(3) may include a link (e.g., a physical link, or may link when selected) to associated data related to the incident, such as image data, audio data, and/or other data. In some examples, the second client device 1128 may receive input to scroll through details of additional incidents.

The GUI 2102 may further include a map 2106 (which may be similar to the map 2008 from the example GUI 2002 of FIG. 20) of a geographic area, where the map 2106 includes icons 2108(1)-2108(3) indicating the locations of the incidents 2104(1)-2104(3). In some examples, and as shown in the example of FIG. 21, when an incident 2104(1) is selected by a user, the GUI 2102 causes the icon 2108(1) corresponding to that incident to display differently than the icons 2108(2)-2108(3) corresponding to the other incidents 2104(2)-2104(3). Furthermore, the map 2106 may include an icon 2110 that indicates a location of the user's address.

As such, the user use the GUI 2102 to determine which incidents included in the selected category occurred near the user's address.

Figure 22:
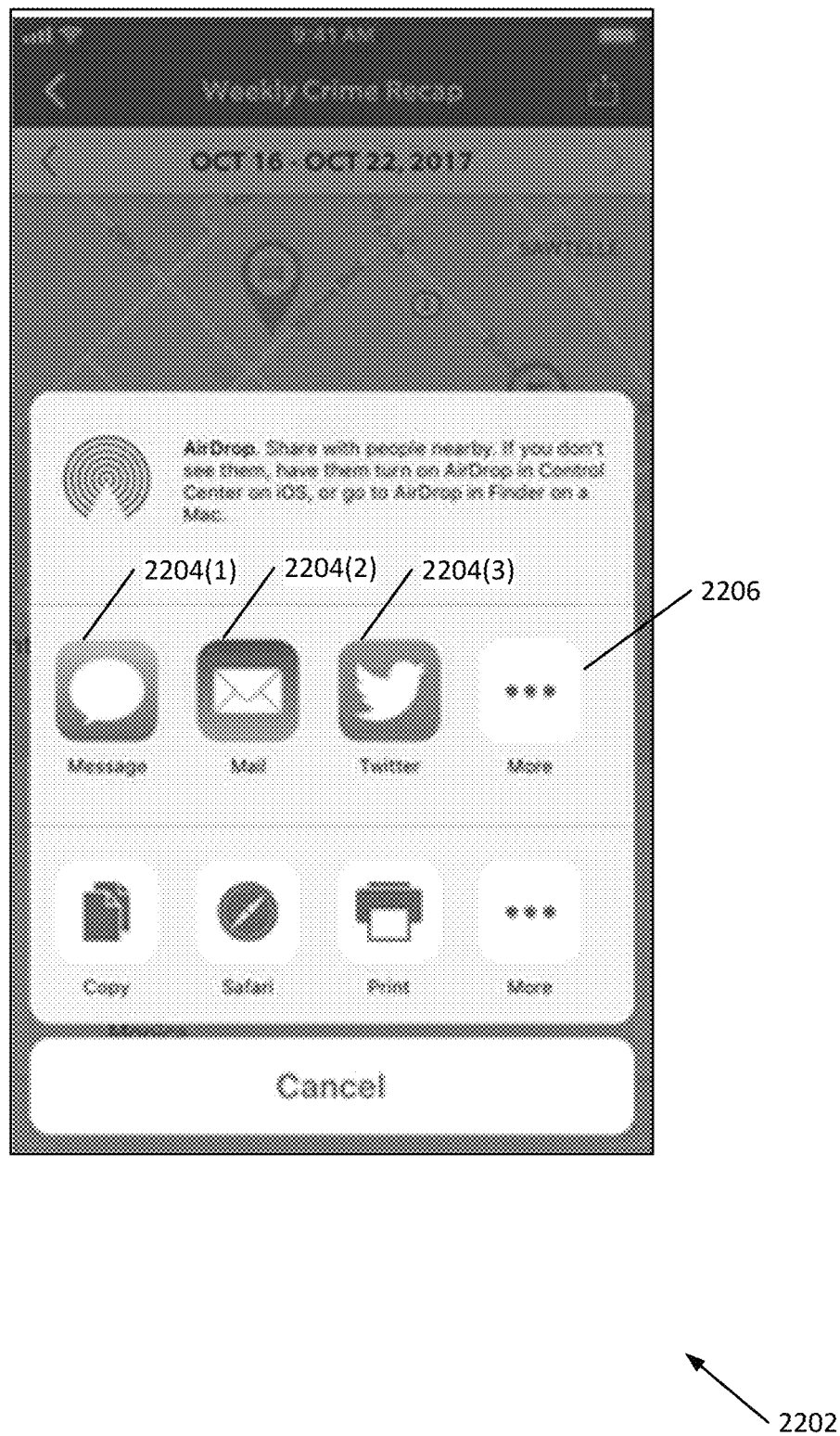
FIG. 22 is a screenshot of a GUI illustrating an example of providing options for sharing criminal statistics according to various aspects of the present disclosure.

FIG. 22 is a screenshot of a GUI 2202 illustrating an example of providing options for sharing the second criminal statistics according to various aspects of the present disclosure. For example, the second client device 1128 (and/or similarly the first client device 1108) may display the GUI 2202 to a user, such as when the second client device 1128 receives input for sharing the second criminal statistics. As shown, the GUI 2202 may include different options 2204(1)-2204(3) for how to share the second criminal statistics. For example, and without limitation, the first option 2204(1) may include transmitting data representing the second criminal statistics using a short message service (SMS), the second option 2204(2) may include sharing the second criminal statistics using FACEBOOK® (or other social media network), and the third option 2204(3) may include sharing the second criminal statistics using TWITTER® (or other social media network). The GUI 2202 may further include a button 2206 that the user may select for additional options for how the user may share the second criminal statistics (e.g., email).

Figure 23:
FIG. 23 is a screenshot of a GUI illustrating an example of transmitting the criminal statistics to another user according to various aspects of the present disclosure.

FIG. 23 is a screenshot of a GUI 2302 illustrating an example of transmitting the second criminal statistics to another user according to various aspects of the present disclosure. For example, the second client device 1128 (and/or similarly the first client device 1108) may display the GUI 2302 to a user, such as when the second client device 1128 receives input for sharing the second criminal statistics (e.g., receives input selecting the first option 2204(1) from the example GUI 2202 of FIG. 22) As shown, the GUI 2302 includes a message 2304 (e.g., an auto-populated message) that the second client device 1128 and/or the backend server 1122, in response to the input to send the message 2304, may transmit to a client device of another user (e.g., the first client device 1108). The message 2304 may include the second criminal statistics and a request that the other user download the application (e.g., the device application 1518, the device application 1618, etc.) for creating criminal statistics. In other embodiments, the message may include a request to download the application in order to review the criminal statistics and/or to create a personalized criminal statistics report for the new user (e.g., the user that receives the message 2304).

Each of the processes described herein, including the processes 2400, 2500, 2600, 2700, and 2800 are illustrated as a collection of blocks in a logical flow graph, which represent a sequence of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks may be combined in any order and/or in parallel to implement the processes. Additionally, any number of the described blocks may be optional and eliminated to implement the processes.

Figure 24:
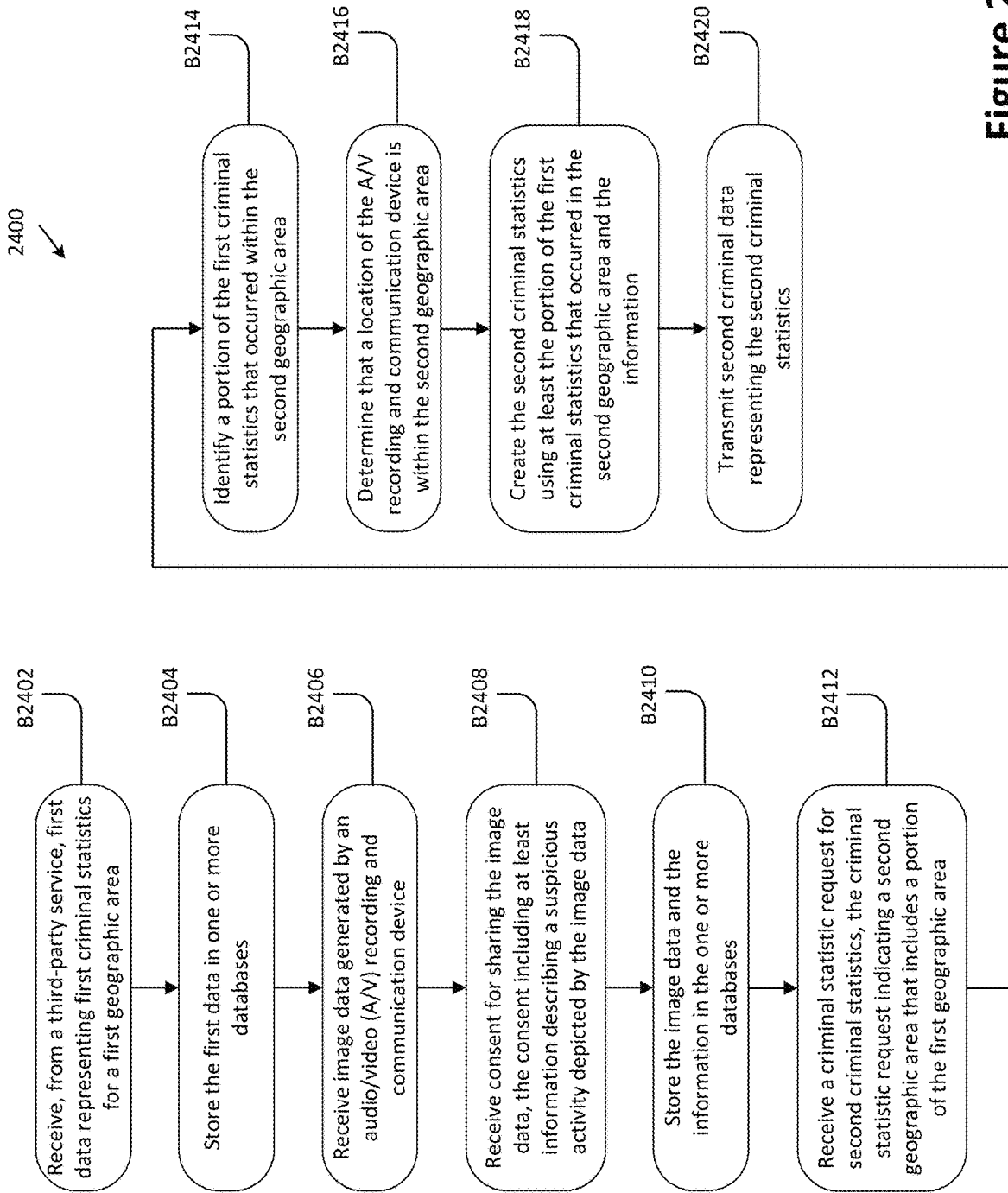
FIG. 24 is a flowchart illustrating an example process for integrating A/V recording and communication device data into criminal statistics according to various aspects of the present disclosure.

FIG. 24 is a flowchart illustrating an example process 2400 for integrating A/V recording and communication device data into criminal statistics according to various aspects of the present disclosure. The process 2400, at block B2402, receives, from a third-party server, first data representing first criminal statistics for a first geographic area. For example, the processor 1406 of the backend server 1122 may receive, using the communication module 1402, and from one or more third-party services 1130, the first criminal data 1416 representing the first criminal statistics. In some examples, the first criminal statistics represented by the first criminal data 1416 may correspond to a geographic area, such as a city, state, or country. In addition, each incident/report from the first criminal data 1416 may be associated with a location, such as an address, an intersection, GPS coordinates, or the like. In some embodiments, the processor 1406 of the backend server 1122 may receive the first criminal data 1416 continuously from the one or more third-party services 1130 using the communication module 1402. Additionally, or alternatively, in some embodiments, the processor 1406 of the backend server 1122 may receive the first criminal data 1416 from the one or more third-party services 1130 using the communication module 1402 at given time intervals and/or in response to statistics requests 1420.

The process 2400, at block B2404, stores the first data in one or more databases. For example, based on receiving the first criminal data 1416, the processor 1406 of the backend server 1122 may store the first criminal data 1416 in one or more databases, such as the storage devices 1120.

The process 2400, at block B2406, receives image data generated by an audio/video (A/V) recording and communication device. For example, the processor 1406 of the backend server 1122 may receive, using the communication module 1402, the image data 1224 generated by the A/V recording and communication device 1102. In some examples, the processor 1406 of the backend server 1122 may receive, using the communication module 1402, the image data 1224 from the A/V recording and communication device 1102 and/or the hub device 1112. In some examples, the processor 1406 of the backend server 1122 may receive the image data 1224 based on the A/V recording and communication device 1102 detecting motion in its field of view. For instance, the image data 1224 may depict an activity that occurs in a field of view of the camera 1204 of the A/V recording and communication device 1102.

The process 2400, at block B2408, receives consent for sharing the image data, the consent including at least information describing a suspicious activity depicted by the image data. For example, the processor 1406 of the backend server 1122 may receive, using the communication module 1402, consent data 1314 from the client device 1108, 1110 associated with the A/V recording and communication device 1102 and/or the hub device 1112. The consent data 1314 may indicate consent for sharing the image data 1224 with other users that are members of one or more geographic areas, such as the geographic area 1704 and/or geographic area 1708. The consent data 1314 may further include information 1246 that indicates that the image data 1224 depicts a suspicious activity, such as criminal behavior. In some examples, the information 1246 may include a comment created by a user of the first client device 1108, 1110. In some examples, the information 1246 may include a tag selected by the user, where the tag indicates the suspicious activity. In some examples, the information 1246 may be generated by the A/V recording and communication device 1102 and/or the hub device 1112, which may describe the suspicious behavior (e.g., activity) depicted by the image data 1224.

The process 2400, at block B2410, stores the image data and the information in the one or more databases. For example, based on receiving the image data 1224 and the information 1246, the processor 1406 of the backend server 1122 may store the image data 1224 and the information 1246 in the one or more databases, such as the storage device(s) 1120.

The process 2400, at block B2412, receives a criminal statistics request for second criminal statistics, the criminal statistics request indicating a second geographic area that includes a portion of the first geographic area. For example, the processor 1406 of the backend server 1122 may receive, using the communication module 1402, a statistics request 1420 from the first client device 1108, 1110 or the second client device 1128, where the statistics request 1420 indicates the second geographic area 1422 that includes a portion of the first geographic area. The second geographic area 1422 may correspond to an area in which a user wishes to receive the second criminal statistics. In some examples, the statistics request 1420 may further indicate the time period 1424 for the second criminal statistics, the frequency 1426 for which to create the second criminal statistics, and/or the categories 1428 for organizing the second criminal statistics. In some examples, the processor 1406 of the backend server 112 may store the statistics request 1420 (e.g., the second geographic area 1422, the time period 1424, the frequency 1426, and/or the categories 1428) in association with a user account 1430 associated with the user.

The process 2400, at block B2414, identifies a portion of the first criminal statistics that occurred within the second geographic area. For example, the processor 1406 of the backend server 1122 may analyze the first criminal data 1416 to identify a portion of the first criminal statistics that occurred in the second geographic area 1422. The portion of the first criminal statistics may correspond to criminal reports describing crimes and/or other suspicious activities that occurred within the second geographic area 1422. In some examples, the processor 1406 of the backend server 1122 may further analyze the criminal data 1416 corresponding to the portion of the first criminal statistics to identify an additional portion of the first criminal statistics that corresponds to the time period 1424 and/or the categories 1428.

The process 2400, at block B2416, determines that a location of the A/V recording and communication device is within the second geographic area. For example, the processor 1406 of the backend server 1122 may utilize the location data 1238 to determine the location of the A/V recording and communication device 1102. The processor 1406 of the backend server 1122 may then determine that the location of the A/V recording and communication device 1102 is within the second geographic area 1422. In some examples, the processor 1406 of the backend server 1122 determines that the location of the A/V recording and communication device 1102 is within the second geographic area 1422 in response to receiving the statistics request 1420.

The process 2400, at block B2418, creates the second criminal statistics using at least the portion of the first criminal statistics that occurred within the second geographic area and the information. For example, the processor 1406 of the backend server 1122 may create the second criminal statistics using the portion of the first criminal data 1416 that corresponds to the portion of the first criminal statistics that are associated with the second geographic area 1422 and the information 1246 describing the image data 1224. In some examples, the processor 1406 of the backend server 1122 may create the second criminal statistics by curating the portion of the first criminal data 1416 that corresponds to the portion of the first criminal statistics that are associated with the second geographic area 1422 and the information 1246 describing the image data 1224. In some examples, the processor 1406 of the backend server 1122 creates the second criminal statistics by further organizing the second criminal statistics into the categories 1428.

The process 2400, at block B2420, transmits second criminal data representing the second criminal statistics. For example, the processor 1406 of the backend server 1122 may transmit, using the communication module 1402, the second criminal data 1432 representing the second criminal statistics to the first client device 1108, 1110 or the second client device 1128 (e.g., whichever client device transmitted the statistics request 1420). In response, the first client device 1108, 1110 or the second client device 1128 may receive the second criminal data 1432 and display the second criminal statistics to the user.

The process 2400 of FIG. 24 may be implemented in a variety of embodiments, including those discussed above. However, the below-detailed embodiments are not intended to be limiting, and are provided merely as example embodiments of the present disclosure. Other embodiments similar to those outlined herein may also fall within the scope of the present disclosure.

For example, the processor 1406 of the backend server 1122 may receive, using the communication module 1402 and from a third-party service 1130, first criminal data 1416 representing first criminal statistics for the city of San Diego (e.g., block B2402). The processor 1406 of the backend server 1122 may then store the first criminal data 1416 in the storage databases 1120 (e.g., block B2404). Next, the processor 1406 of the backend server 1122 may receive, using the communication module 1402, image data 1224 generated by the A/V recording and communication device 1102, where the image data 1224 depicts a larceny (e.g., block B1406). After receiving the image data 1224, the processor 1406 of the backend server 1122 may receive, using the communication module 1402 and from the first client device 1108, consent data 1314 that includes information 1246 describing the image data 1224 (e.g., bock B2408). For example, the information 1246 may indicate that the image data 1224 depicts a person stealing a package off of a porch. The processor 1406 of the backend server 1122 may then store the image data 1224 and the information 1246 in the storage databases 1120 (e.g., block B2410).

The processor 1406 of the backend server 1122 may then receive, using the communication module 1402 and from the second client device 1128, a criminal statistics request 1420 that indicates a geographic area 1422, where the geographic area 1422 includes a mile radius around a user's address within San Diego (e.g., block B1412). Based on receiving the criminal statistics request 1420, the processor 1406 of the backend server 1122 may analyze the first criminal statistics for the city of San Diego to identify a portion of the first criminal statistics that corresponds to the mile radius around the user's address (e.g., block B2414). Additionally, the processor 1406 of the backend server 1122 may analyze the location data 1238 for the A/V recording and communication device 1102 to determine that the A/V recording and communication device 1102 is located within the mile radius around the user's address (e.g., block B1416). Next, the processor 1406 of the backend server 1122 may create second criminal statistics that are associated with the mile radius around the user's address using the identified portion of the first criminal statistics and the information 1246 (e.g., block B2418). After creating the second criminal statistics, the processor 1406 of the backend server 1122 may transmit, using the communication module 1406, second criminal data 1432 representing the second criminal statistics to the second client device 1128.

Figure 25:
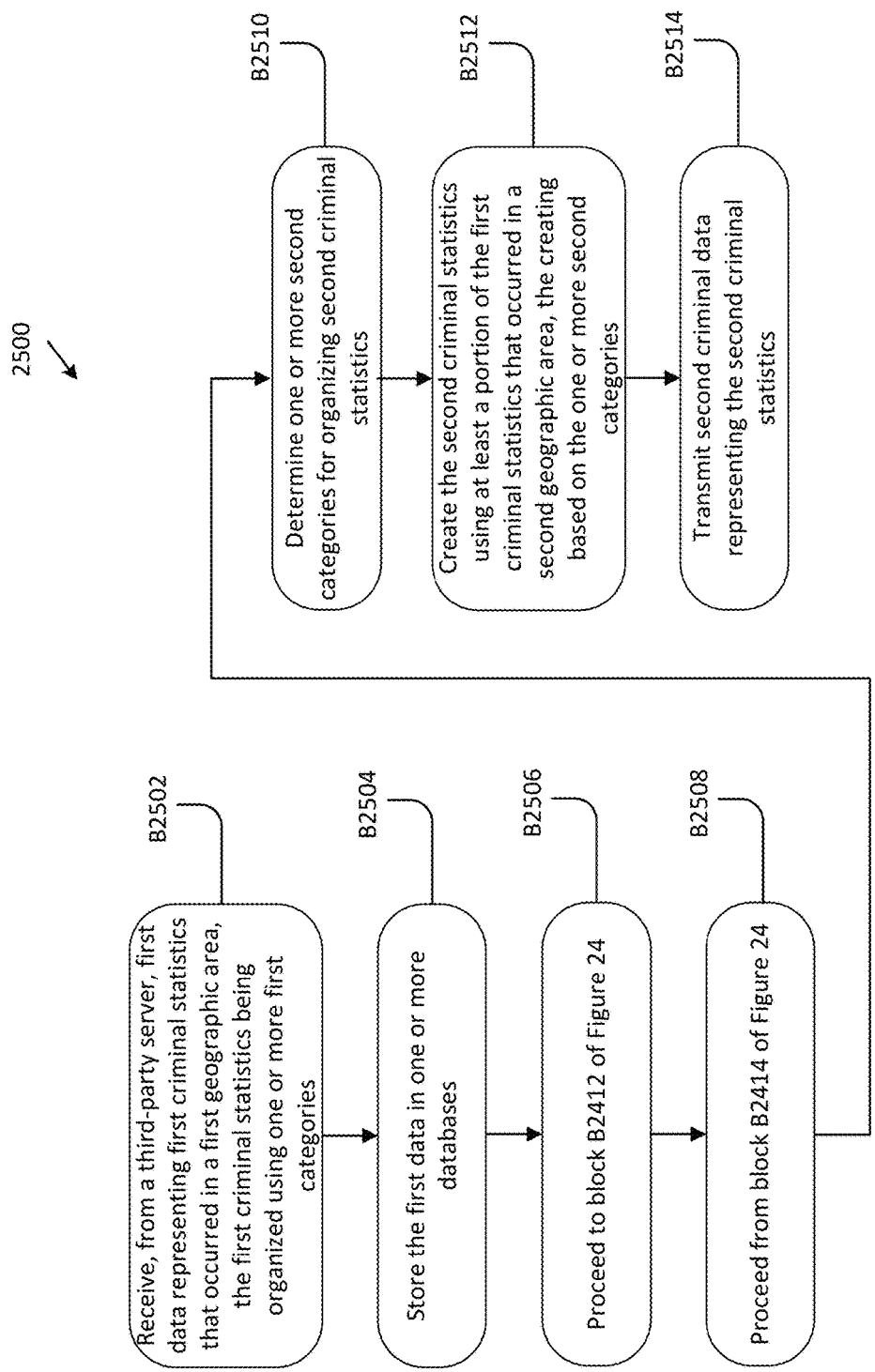
FIG. 25 is a flowchart illustrating an example process for utilizing first criminal statistics to create second criminal statistics for a user according to various aspects of the present disclosure.

FIG. 25 is a flowchart illustrating an example process 2500 for utilizing first criminal statistics to create second criminal statistics for a user according to various aspects of the present disclosure. The process 2500, at block B2502, receives, from a third-party server, first data representing first criminal statistics that occurred in a first geographic area, the first criminal statistics being organized using one or more first categories. For example, the processor 1406 of the backend server 1122 may receive, using the communication module 1402, and from one or more third-party services 1130, the first criminal data 1416 representing the first criminal statistics, the first criminal statistics being organized into first categories 1418. In some examples, the first criminal statistics represented by the first criminal data 1416 may correspond to a geographic area, such as a city, state, or country. In some examples, the first categories 1418 may correspond to categories of criminal behavior (e.g., categories of crimes). For example, the first categories 1418 may include, but are not limited to, one or more of vehicle crimes (e.g., burglary, theft, etc.), assaults, break-ins (e.g., burglary to a property, vehicle, etc.), shootings, murder, homicides, kidnapping, sex crimes, robberies, fraud, arson, embezzlement, forgery, solicitation, parcel theft, stabbing, suspicious package, armed robberies, theft, breaking and entering, vandalism, and/or any types of attempted crime and/or suspicious activity.

The process 2500, at block B2504, stores the first data in one or more databases. For example, based on receiving the first criminal data 1416, the processor 1406 of the backend server 1122 may store the first criminal data 1416 in one or more databases, such as the storage devices 1120.

The process 2500, at block B2504, may proceed to block B2412 of the example process 2400 of FIG. 24.

The process 2500, at block B2506, may proceed from block B2414 of the example process 2400 of FIG. 24.

The process 2500, at block B2508, determines one or more second categories for organizing second criminal statistics. For example, the processor 1406 of the backend server 1122 may determine the one or more second categories for organizing the second criminal statistics. In some examples, the processor 1406 of the backend server 1122 may determine the one or more second categories based on the categories 1428 from the statistics request 1420. In some examples, the processor 1406 of the backend server 1122 may determine the one or more second categories based on using default categories that the backend server 1122 used when generating criminal statistics. For example, the processor 1406 of the backend server 1122 may use the default categories when the statistics request 1420 does not include the categories 1428. Still, in some examples, the processor 1406 of the backend server 1122 may determine the one or more second categories based on the one or more second categories (e.g., categories 1428) being associated with a user account 1430 of a user receiving the second criminal statistics.

In some examples, the one or more second categories (e.g., the categories 1428) may correspond to categories of criminal behavior (e.g., categories of crimes). For example, the second categories may include, but are not limited to, one or more of vehicle crimes (e.g., burglary, theft, etc.), assaults, break-ins (e.g., burglary to a property, vehicle, etc.), shootings, murder, homicides, kidnapping, sex crimes, robberies, fraud, arson, embezzlement, forgery, solicitation, parcel theft, stabbing, suspicious package, armed robberies, theft, breaking and entering, vandalism, and/or any types of attempted crime and/or suspicious activity. In some examples, the first categories 1418 may be similar to the one or more second categories. In some examples, one or more of the first categories 1418 may be different than one or more of the second categories.

For example, the first categories 1418 may include each of the types of crimes and/or suspicious activity listed above. However, because the list may be extensive and not easily digestible, the backend server 1122 may utilize an algorithm to sort the first categories into the second categories. In such an example, the second categories may only include ten categories, where the ten categories may be vehicle crimes, armed robbery, theft, breaking and entering, arson, vandalism, assault, homicide, sex crimes, shootings, stabbings, and suspicious packages. As such, the reports and/or other data/information that is included in the first category of kidnapping (which, in this example, is not included in the second categories) may be analyzed to determine which of the second categories the report and/or other data/information should be included. In some examples, every kidnapping report and/or other data/information may automatically be included in the second category of assault and/or in the second category of breaking and entering. However, in other examples, each report and/or data/information may be separately analyzed (e.g., by analyzing the text associated with a report, or text associated with image data, and/or by using computer vision processing, image processing, audio processing, and/or other processing mechanisms to determine characteristics, features, patterns, and/or sequences of the data/information associated with the report and/or data/information pertaining to the crime and/or suspicious activity). For example, if a report and/or data/information included in the first category of kidnapping includes associated text such as "the victim was forcibly removed for their house and thrown into the back of a vehicle," then the report and/or data/information may be associated with the second categories of assault and/or breaking and entering. In some examples, the report and/or data/information of a crime and/or suspicious activity included in the first category of kidnapping may not be included in any of the second categories. For example, if the textual information associated with the report and/or data/information from the first category of kidnapping includes language such as "the victim is suspected to have been kidnapped," then the report and/or data/information may not relate to any of the second categories, and as a result, may not be included in any of the second categories. In some examples, all of the reports and/or data one or more of the first categories may not be analyzed at all, and my be filtered out.

The process 2500, at block B2512, creates the second criminal statistics using at least a portion of the first criminal statistics that occurred in a second geographic area, the creating based on the one or more second categories. For example, the processor 1406 of the backend server 1122 may create the second criminal statistics using at least a portion of the first criminal statistics that occurred in a second geographic area, such as the second geographic area 1422. When creating the second criminal statistics, the processor 1406 of the backend server 1122 may organize the second criminal statistics into the one or more second categories. For example, the processor 1406 of the backend server 1122 may place each incident (e.g., police report, suspicious activity, information describing image data) represented by the second criminal statistics into a category of the one or more second categories.

In some examples, when one or more of the first categories 1418 are similar to one or more of the second categories, the processor 1406 of the backend server 1122 may include incidents (e.g., police reports, suspicious activities, etc.) from the one or more first categories 1418 into the corresponding one or more similar second categories. For example, if the one or more first categories 1418 includes a burglary category, and the one or more second categories also includes a burglary category, then the processor 1406 of the backend server 1122 may place each incident included in the burglary category from the one or more first categories 1418 into the burglary category from the one or more second categories. For another example, if the one or more first categories 1418 includes a vehicle crimes category, and the one or more second categories also includes a vehicle crimes category, then the processor 1406 of the backend server 1122 may place each incident included in the vehicle crimes category from the one or more first categories 1418 into the vehicle crimes category from the one or more second categories.

In some examples, when one or more of the first categories 1418 differ from one or more of the second categories, the processor 1406 of the backend server 1122 may analyze each of the incidents from the portion of the first criminal statistics that are included in a first category 1418 that does not include a corresponding second category. Based on the analysis, the processor 1406 of the backend server 1122 may determine which category of the one or more second categories the respective incident should be included in. For example, the processor 1406 of the backend server 1122 may analyze one or more words described by each incident to identity key words that are associated with the one or more second categories. Based on the identifying a key word that is associated with a category from the one or more second categories, the processor 1406 of the backend server 1122 may include the respective incident in the category. For example, if an incident includes the word "murder" or the word "killing", then the processor 1406 of the backend server 1122 may include the incident in the murder category.

In some examples, the processor 1406 of the backend server 1122 may determine which category of the one or more second categories that information 1246 describing the image data 1224 should be placed by analyzing the information 1246. For example, if the information 1246 includes a tag associated with a category, then the processor 1406 of the backend server 1122 may include the information 1246 in that category. For instance, if an incident includes the tag "package" or the tag "stolen parcel", then the processor 1406 of the backend server 1122 may include the incident in the parcel theft category. For another example, if the information 1246 includes a comment, message, and/or other description associated with the image data 1224, then the processor 1406 of the backend server 1122 may analyze one or more words included within the information 1246 to identity key words that are associated with the one or more second categories. Based on the identifying a key word that is associated with a category from the one or more second categories, the processor 1406 of the backend server 1122 may include the respective incident in the category. For instance, if the information 1246 includes the word "murder" or the word "killing", then the processor 1406 of the backend server 1122 may include the incident in the murder category.

In some examples, the processor 1406 of the backend server 1122 may determine which category of the one or more second categories that information 1246 describing the image data 1224 should be placed based on historical information. For example, in response to users of the service that provides the criminal statistics and/or in response to administrators of the service classifying the incidents, reports, and/or image data into criminal statistic categories, the backend server 1122 may learn which types of information 1246 should be associated with each of the second categories. For example, if an administrator is classifying the first criminal statistics categories into second criminal statistic categories, the association between the two criminal statistic categories may be learned by the backend server 1122 and applied to future sorting and filtering of the first criminal statistic categories into the second criminal statistic categories. As another example, based on user responses to reports, crime data, and/or image data that is sorted into the second criminal statistic categories, the backend server 1122 may learn the characteristics, patterns, and/or sequences of events from the types of reports, crime data, and/or image data that is most desired and/or intriguing to the users (e.g., based on length of viewing, based on sharing, etc.). For example, if multiple users view image data in the shooting category and stop watching on average after three seconds of viewing, the characteristics, patterns, and/or sequences from the image data may be dissociated with the shooting category. As another example, if multiple users view image data, read reports, and/or view crime data that is in the vehicle theft category, and share the image data, the reports, and/or the crime data with other users, especially if one or more users include textual information such as "Check out this car theft," the backend server 1122 may learn to associate the characteristics, sequences, and/or patterns from the image data, the reports, and/or the crime data with the vehicle theft category.

The process 2500, at block B2514, transmits second criminal data representing the second criminal statistics. For example, the processor 1406 of the backend server 1122 may transmit, using the communication module 1402, the second criminal data 1432 representing the second criminal statistics to the first client device 1108, 1110 or the second client device 1128 (e.g., whichever client device transmitted the statistics request 1420). In response, the first client device 1108, 1110 or the second client device 1128 may receive the second criminal data 1432 and display the second criminal statistics to the user.

Figure 26:
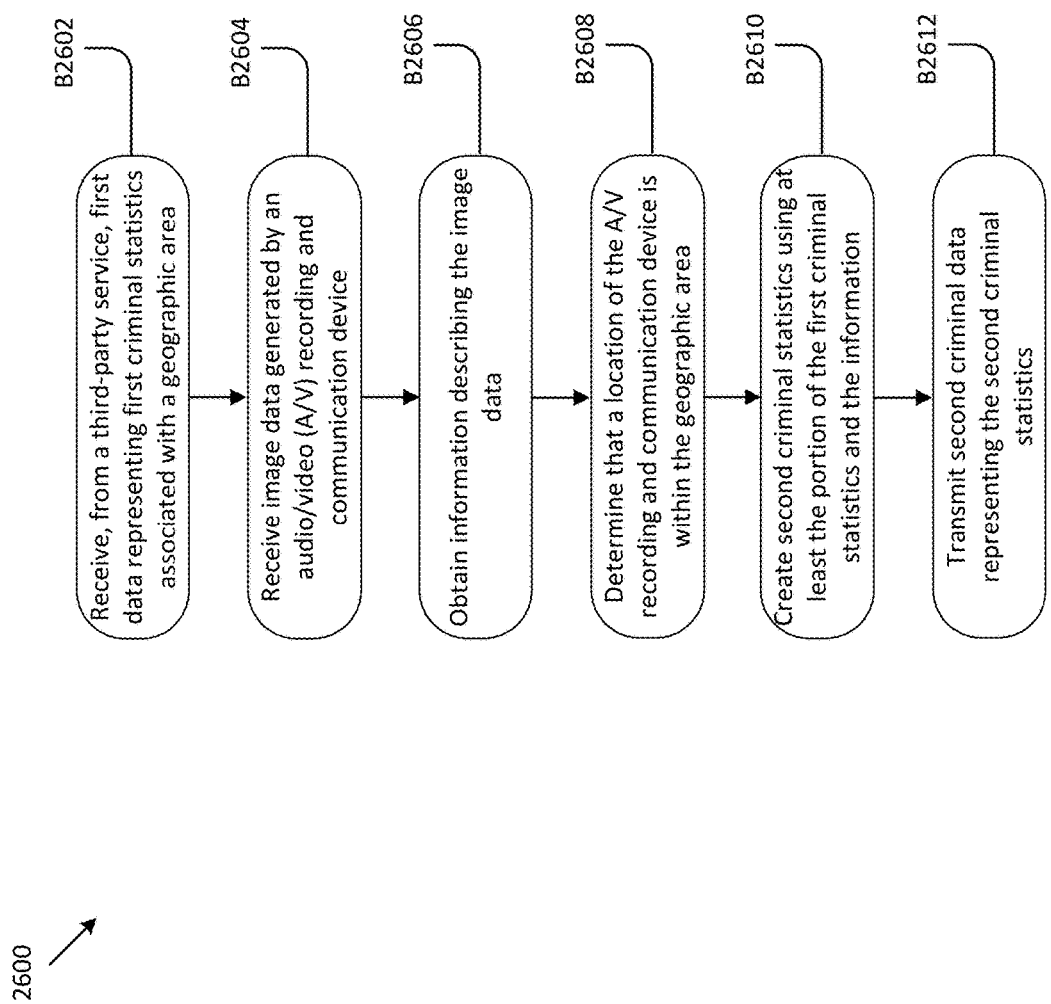
FIG. 26 is a flowchart illustrating an example process for integrating A/V recording and communication device data into criminal statistics according to various aspects of the present disclosure.

FIG. 26 is a flowchart illustrating an example process 2600 for integrating A/V recording and communication device data into criminal statistics according to various aspects of the present disclosure. The process 2600, at block B2602, receives, from a third-party server, first data representing first criminal statistics associated with a geographic area. For example, the processor 1406 of the backend server 1122 may receive, using the communication module 1402, and from one or more third-party services 1130, the first criminal data 1416 representing the first criminal statistics. In some examples, the first criminal statistics represented by the first criminal data 1416 may correspond to a geographic area, such as a city, state, or country. In some embodiments, the processor 1406 of the backend server 1122 may receive the first criminal data 1416 continuously from the one or more third-party services 1130 using the communication module 1402. Additionally, or alternatively, in some embodiment, the processor 1406 of the backend server 1122 may receive the first criminal data 1416 from the one or more third-party services 1130 using the communication module 1402 at given time intervals.

The process 2600, at block B2604, receives image data generated by an audio/video (A/V) recording and communication device. For example, the processor 1406 of the backend server 1122 may receive, using the communication module 1402, the image data 1224 generated by the A/V recording and communication device 1102. In some examples, the processor 1406 of the backend server 1122 may receive, using the communication module 1402, the image data 1224 from the A/V recording and communication device 1102 and/or the hub device 1112. In some examples, the processor 1406 of the backend server 1122 receives the image data 1224 based on the A/V recording and communication device 1102 detecting motion. For instance, the image data 1224 may depict an activity that occurs in a field of view of the camera 1204 of the A/V recording and communication device 1102.

The process 2600, at block B2606, obtains information describing the image data. For example, the processor 1406 of the backend server 1122 may obtain the information 1246 describing the image data 1224. In some examples, the processor 1406 of the backend server 1122 may obtain the information 1246 by receiving, using the communication module 1402, the information 1246 from the first client device 1108, 1110 and/or the hub device 1112 (e.g., such as within consent data 1314). In some examples, the processor 1406 of the backend server 1122 obtains the information 1246 by analyzing the image data 1224 using at least one of computer vision processing and image processing (described in detail above). Based on the analysis, the processor 1406 of the backend server 1122 may determine that the image data 1224 depicts suspicious activity. The processor 1406 of the backend server 1122 may then generate the information 1246, which describes the suspicious activity depicted by the image data 1224.

The process 2600, at block B2608, determines that a location of the A/V recording and communication device is within the geographic area. For example, the processor 1406 of the backend server 1122 may utilize the location data 1238 to determine the location of the A/V recording and communication device 1102. The processor 1406 of the backend server 1122 may then determine that the location of the A/V recording and communication device 1102 is within the geographic area. In some examples, when a statistics request 1420 indicates the second geographic area 1422, the processor 1406 of the backend server 1122 may determine that the location of the A/V recording and communication device 1102 is within the second geographic area 1422.

The process 2600, at block B2610, creates the second criminal statistics using at least a portion of the first criminal statistics and the information. For example, the processor 1406 of the backend server 1122 may create the second criminal statistics using at a portion of the first criminal data 1416 that corresponds to the at least the portion of the first criminal statistics and the information 1246 describing the image data 1224. In some examples, when the statistics request 1420 indicates the second geographic area 1422, the at least the portion of the first criminal data 1416 may represent the at least the portion of the first criminal statistics that occurred within the second geographic area 1422. In some examples, the processor 1406 of the backend server 1122 may further create the second criminal statistics by further organizing the second criminal statistics into the categories 1428.

The process 2600, at block B2612, transmits second criminal data representing the second criminal statistics. For example, the processor 1406 of the backend server 1122 may transmit, using the communication module 1402, the second criminal data 1432 representing the second criminal statistics to the first client device 1108, 1110 or the second client device 1128 (e.g., whichever client device transmitted the statistics request 1420). In response, the first client device 1108, 1110 or the second client device 1128 may receive the second criminal data 1432 and display the second criminal statistics to the user.

Figure 27:
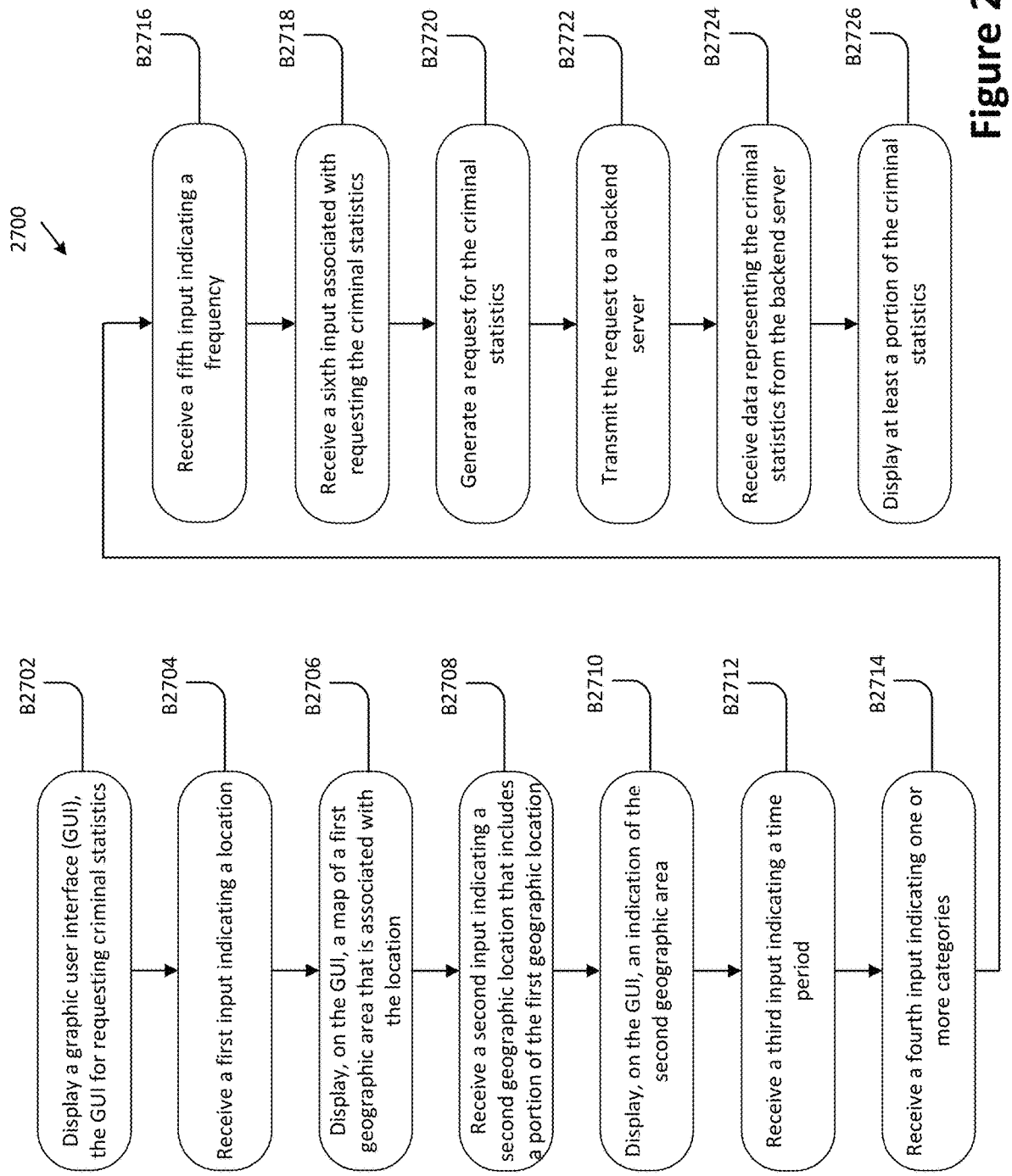
FIG. 27 is a flowchart illustrating an example process for requesting criminal statistics according to various aspects of the present disclosure.

FIG. 27 is a flowchart illustrating an example process 2700 for requesting criminal statistics according to various aspects of the present disclosure. The process 2700, at block B2702, displays a graphical user interface (GUI), the GUI for requesting criminal statistics. For example, the processor 1612 of the second client device 1128 may display the GUI 1622 using the display 1620 (and/or the processor 1512 of the first client device 1108, 1110 may display the GUI 1522 using the display 1520). The GUI 1622 (and/or the GUI 1522) may be for requesting criminal statistics, such as from the backend server 1122.

The process 2700, at block B2704, receives a first input indicating a location. For example, the processor 1612 of the second client device 1128 (and/or the processor 1512 of the first client device 1108, 1110) may receive the first input indicating the location. In some examples, the processor 1612 of the second client device 1128 (and/or the processor 1512 of the first client device 1108, 1110) may receive the first input using a first text box and/or dropdown menu 1812 that enables a user to identify the location. In some examples, the location may include an address of the user's property. In some examples, the location may be the location of the A/V recording and communication device associated with the user, such as the A/V recording and communication device 1102 associated with the first client device 1108, 1110. In other examples, the location may be the location of the client device attempting to request and/or access the criminal statistics. In such an example, the location may be determined using the location services of the client device, such as GPS coordinates generated by an onboard GPS chip.

The process 2700, at bock B2706, displays, on the GUI, a map of a first geographic area that is associated with the location. For example, the processor 1612 of the second client device 1128 may display, on the GUI 1622, the map 1624 of the first geographic area that is associated with the location (and/or the processor 1512 of the first client device 1108, 1110 may display, on the GUI 1522, the map 1524 of the first geographic location that is associated with the location). For example, as illustrated on the example GUI 1802 (which may correspond to the GUI 1522 and/or the GUI 1622) of FIG. 18, the map 1804 (which may correspond to the map 1524 and/or the map 1624) may display the geographic area that includes the location 1806.

The process 2700, at block B2708, receives a second input indicating a second geographic location that includes a portion of the first geographic location. For example, the processor 1612 of the second client device 1128 may receive the second input indicating the second geographic area 1422(2) (and/or the processor 1512 of the first client device 1108, 1110 may receive the second input indicating the second geographic area 1422(1)). In some examples, the processor 1612 of the second client device 1128 (and/or the processor 1512 of the first client device 1108, 1110) may receive the second input via the map 1804 of the GUI 1802.

The process 2700, at block B2710, displays, on the GUI, an indication of the geographic area. For example, the processor 1612 of the second client device 1128 may display, on the GUI 1622, an indication of the second geographic area 1422(2) (and/or the processor 1512 of the first client device 1108, 1110 may display, on the GUI 1522, an indication of the second geographic area 1422(1)). For example, and as illustrated on the example GUI 1802 of FIG. 18, the map 1804 may display an indication of the second geographic area 1810.

The process 2700, at block B2712, receives a third input indicating a time period. For example, the processor 1612 of the second client device 1128 may receive the third input indicating the time period 1424(2) (and/or the processor 1512 of the first client device 1108, 1110 may receive the third input indicating the time period 1424(1)). For example, and as illustrated by the example GUI 1802 of FIG. 18, the processor 1612 of the second client device 1128 (and/or the processor 1512 of the first client device 1108, 1110) may receive the third input using a second text box and/or dropdown menu 1814 that enables the user to identify the time period.

The process 2700, at block B2714, receives a fourth input indicating one or more categories. For example, the processor 1612 of the second client device 1128 may receive the fourth input indicating the one or more categories 1428(2) (and/or the processor 1512 of the first client device 1108, 1110 may receive the fourth input indicating the one or more categories 1428(1)). For example, and as illustrated by the example GUI 1802 of FIG. 18, the processor 1612 of the second client device 1128 (and/or the processor 1512 of the first client device 1108, 1110) may receive the fourth input using a fourth text box and/or dropdown menu 1818 that enables the user to identify the one or more categories.

The process 2700, at block B2716, receives a fifth input indicating a frequency. For example, the processor 1612 of the second client device 1128 may receive the fifth input indicating the frequency 1426(2) (and/or the processor 1512 of the first client device 1108, 1110 may receive the fifth input indicating the frequency 1426(1)). For example, and as illustrated by the example GUI 1802 of FIG. 18, the processor 1612 of the second client device 1128 (and/or the processor 1512 of the first client device 1108, 1110) may receive the fifth input using a third text box and/or dropdown menu 1816 that enables the user to identify the frequency.

The process 2700, at block B2718, receives a sixth input associated with requesting the criminal statistics. For example, the processor 1612 of the second client device 1128 may receive the sixth input associated with requesting the criminal statistics (and/or the processor 1512 of the first client device 1108, 1110 may receive the sixth input associated with requesting the criminal statistics). For example, and as illustrated by the example GUI 1802 of FIG. 18, the processor 1612 of the second client device 1128 (and/or the processor 1512 of the first client device 1108, 1110) may receive the sixth input using a button and/or other graphical element 1820 that enables the user to cause the second client device 1128 (and/or the first client device 1108, 1110) to request the criminal statistics from the backend server 1122.

The process 2700, at block B2720, generates a request for the criminal statistics. For example, based on receiving the sixth input, the processor 1612 of the second client device 1128 may generate a statistics request 1420(2) (and/or the processor 1512 of the first client device 1108, 1110 may generate a statistics request 1420(1)). In some examples, the statistics request 1420(2) may include the second geographic area 1422(2), the time period 1424(2), the frequency 1426(2), and/or the one or more categories 1428(2) (and/or the statistics request 1420(1) may include the second geographic area 1422(1), the time period 1424(1), the frequency 1426(1), and/or the one or more categories 1428(1)).

The process 2700, at block B2722, transmits the request to a backend server. For example, the processor 1612 of the second client device 1128 may transmit, using the communication module 1610, the statistics request 1420(2) to the backend server 1122 (and/or the processor 1512 of the first client device 1108, 1110 may transmit, using the communication module 1510, the statistics request 1420(1) to the backend server 1122).

The process 2700, at block B2724, receives data representing the criminal statistics from the backend server. For example, the processor 1612 of the second client device 1128 may receive, using the communication module 1610, the second criminal data 1432(2) representing the second criminal statistics from the backend server 1122 (and/or the processor 1512 of the first client device 1108, 1110 may receive, using the communication module 1510, the second criminal data 1432(1) representing the second criminal statistics from the backend server 1122). In some examples, the processor 1612 of the second client device 1128 may first receive, using the communication module 1610, a notification 1434(2) from the backend server 1122 that the second criminal statistics are ready to be viewed (and/or the processor 1512 of the first client device 1108, 1110 may first receive, using the communication module 1510, a notification 1434(1) from the backend server 1122 that the second criminal statistics are ready to be viewed). In such examples, and in response to receiving the input, the processor 1612 of the second client device 1128 may transmit, using the communication module 1610, an additional statistics request 1420(2) to the backend server 1122 for the second criminal statistics (and/or the processor 1512 of the first client device 1108, 1110 may transmit, using the communication module 1510, an additional statistics request 1420(1) to the backend server 1122 for the second criminal statistics).

The process 2700, at block B2726, displays at least a portion of the criminal statistics. For example, the processor 1612 of the second client device 1128 may display at least a portion of the second criminal statistics using the display 1620 (and/or the processor 1512 of the first client device 1108, 1110 may display at least a portion of the second criminal statistics using the display 1520).

The process 2700 of FIG. 27 may be implemented in a variety of embodiments, including those discussed above. However, the below-detailed embodiments are not intended to be limiting, and are provided merely as example embodiments of the present disclosure. Other embodiments similar to those outlined herein may also fall within the scope of the present disclosure.

For example, the processor 1612 of the second client device 1128 may cause a GUI 1802 (which may correspond to GUI 1622) to be displayed on the display 1620 (e.g., block B2702). While displaying the GUI 1802, the processor 1612 of the second client device 1128 may receive, using the input interface 1604, a first input associated with a geographic location of a user's address, which may be located in San Diego (e.g., block B2704). In some examples, the first input is received using the first text box and/or dropdown menu 1812. In response, the processor 1612 of the second client device 1128 may cause a map 1804, which may include a portion of San Diego, to be displayed on the GUI 1800 (e.g., block B2706). The processor 1612 of the second client device 1128 may then receive, using the user interface 1604, a second input indicating a second geographic area 1422(2), such as an area 1810 around the user's address in San Diego (e.g., block B2708). In response, the processor 1612 of the second client device 1128 may cause the second geographic area 1810 to be displayed on the map 1804 (e.g., block B2710).

Next, the processor 1612 of the second client device 1128 may receive, using the input interface 1604, a third input indicating a time period 1424(2), such as the last week (e.g., block B2712). In some examples, the third input is received using the second text box and/or dropdown menu 1814. Next, the processor 1612 of the second client device 1128 may receive, using the input interface 1604, a fourth input indicating one or more categories 1428(2), such as murders, larceny, and the like (e.g., block B2714). In some examples, the fourth input is received using the fourth text box and/or dropdown menu 1818. Additionally, the processor 1612 of the second client device 1128 may receive, using the input interface 1604, a fifth input indicating frequency 1426(2), such as every week (e.g., block B2716). In some examples, the fifth input is received using the third text box and/or dropdown menu 1816. The processor 1612 of the second client device 1128 may then receive, using the input interface 1604, a sixth input associated with requesting criminal statistics (e.g., block B2718). In some examples, the sixth input is received using the button and/or other graphical element 1820.

In response, the processor 1612 of the second client device 1128 may generate a statistics request 1420(2) that includes the geographic area 1422(2), the time period 1424(2), the frequency 1426(2), and the categories 1428(2) (e.g., block B2720). The processor 1612 of the second client device 1128 may then transmit, using the communication module 1610, the statistics request 1420(2) to the backend server 1122 (e.g., block B2722). Based on transmitting the statistics request 1420(2), the processor 1612 of the second client device 1128 may receive, using the communication module 1610, the second criminal data 1432(2) representing the criminal statistics (e.g., block B2724). The criminal statistics may be associated with the area 1810 around the user's address, include incidents that occurred in the last week, and be organized based on murders, larceny, and the like. The processor 1612 of the second client device 1128 may then cause a display of a portion of the criminal statistics using the display 1620 (e.g., block B2726).

Figure 28:
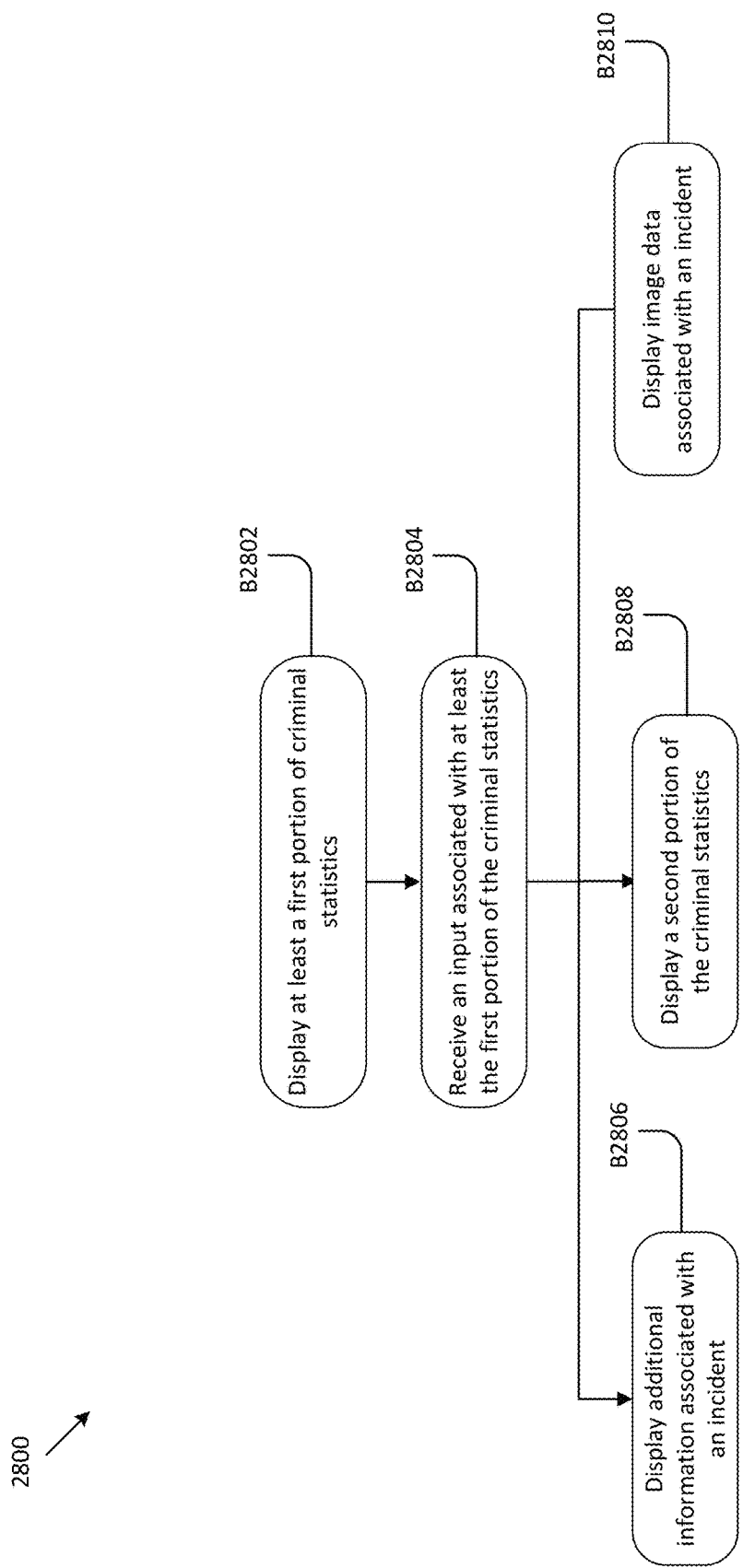
FIG. 28 is a flowchart illustrating an example process for displaying criminal statistics according to various aspects of the present disclosure.

FIG. 28 is a flowchart illustrating an example process 2800 for displaying criminal statistics according to various aspects of the present disclosure. The process 2800, at block B2802, displays at least a first portion of criminal statistics. For example, the processor 1612 of the second client device 1128 may display at least a portion of the criminal statistics using the display 1620 (and/or the processor 1512 of the first client device 1108, 1110 may display at least a portion of the criminal statistics using the display 1520). In some examples, block B2802 of the example process 2800 from FIG. 28 may correspond to block B2726 of the example process 2700 of FIG. 27.

The process 2800, at block B2804, receives an input associated with the at least the first portion of the criminal statistics. For example, the processor 1612 of the second client device 1128 may receive, using the input interface 1604 (and/or the processor 1512 of the first client device 1108, 1110 may receive, using the input interface 1604), the input associated with the first portion of the criminal statistics. In some examples, the input may correspond to a selection of an icon associated with an incident (e.g., a criminal report, information 1246 describing image data 1224, the image data 1224 itself, etc.) that is included in the at least the portion of the criminal statistics. In some examples, the input may indicate that the user wishes to view a second portion of the criminal statistics.

Based on the input, the process 2800, at block B2806, may display additional information associated with an incident. For example, if the input corresponds to a selection of an icon associated with an incident, such as a criminal report, the processor 1612 of the second client device 1128 may display additional information associated with the incident using the display 1620 (and/or the processor 1512 of the first client device 1108, 1110 may display additional information associated with the incident using the display 1520). In some examples, the additional information may correspond to at least a portion of the police report. In some examples, the additional information may correspond to information about a suspect associated with the incident.

Additionally, or alternatively, based on the input, the process 2800, at block B2808, may display a second portion of the criminal statistics. For example, if the input indicates that the user wishes to view the second portion of the criminal statistics, the processor 1612 of the second client device 1128 may display the second portion of the criminal statistics using the display 1620 (and/or the processor 1512 of the first client device 1108, 1110 may display the second portion of the criminal statistic using the display 1520). In some examples, the input may correspond to a selection of a category, and the second portion of the criminal statistics may include incidents associated with the category. In some examples, the input may correspond to changing the geographic area being displayed, and the second portion of the criminal statistics may include incidents associated with the new geographic area. In some examples, the input may correspond to navigating through the criminal statistics, and the second portion of the criminal statistics may include additional incidents associated with the geographic area being displayed to the user.

Additionally, or alternatively, and based on the input, the process 2800, at block B2810, may display image data associated with an incident. For example, if the input corresponds to a selection of an icon associated with information 1246 describing image data 1224, the processor 1612 of the second client device 1128 may display the image data 1224 using the display 1620 (and/or the processor 1512 of the first client device 1108, 1110 may display the image data 1224 using the display 1520). In some examples, the processor 1612 of the second client device 1128 may further display additional information associated with the image data 1224, such as comments and/or additional details describing the suspicious behavior, using the display 1620 (and/or the processor 1512 of the first client device 1108, 1110 may further display the additional information using the display 1520).

The processes described herein may be used by systems, such as the backend server 1122, to create criminal statistics that are tailored to users requesting the criminal statistics and/or include data associated with suspicious activities that occur in the geographic areas surrounding the users' properties. For example, based on receiving a statistics request 1420 that indicates a geographic area 1422, the backend server 1122 may use data representing criminal activities, such as criminal reports, that occurred within the geographic area 1422 to create the criminal statistics for the user. Additionally, in some examples, the backend server 1122 may utilize information 1246 describing image data 1224, the image data 1224, and/or other data that is generated by one or more A/V recording and communication devices 1102 located within the geographic area 1422 associated with the user to create the criminal statistics for the user. As such, by creating criminal statistics that are specific to the indicated geographic area 1422, and which include the additional information 1246, the backend server 1122 is capable to curating criminal statistics that are easily digestible and also tailored specifically to the user. As a result, the user may be better informed about the crimes and/or other suspicious activity that are occurring around the geographic area 1422 surrounding the user's property. Using this information, the user may take various actions to protect the user's family, pets, and/or property, as well as protect families, pets, and/or property in the surrounding area (e.g., the street on which the property is located, the neighborhood the property is in, etc.).

Figure 29:
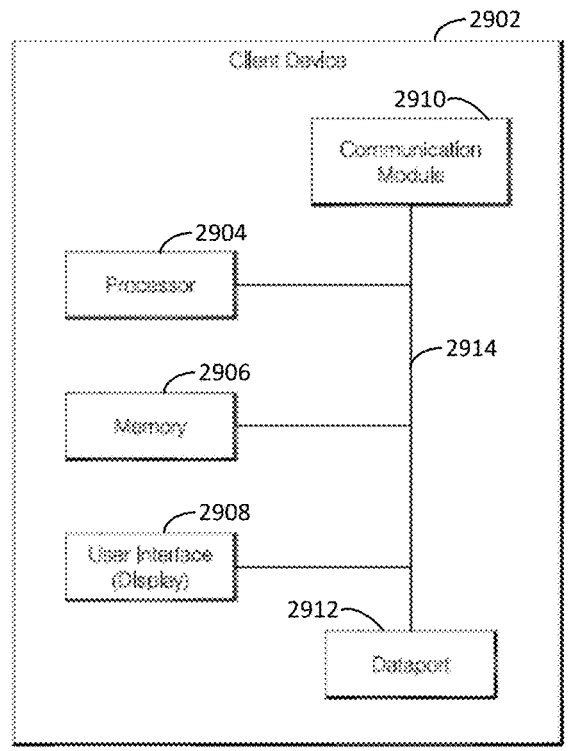
FIG. 29 is a functional block diagram of a client device on which example embodiments may be implemented according to various aspects of the present disclosure.

FIG. 29 is a functional block diagram of a client device 2902 on which the present embodiments may be implemented according to various aspects of the present disclosure. The user's client device 114 described with reference to FIG. 1 and/or the client device 1108, 1110 described with reference to FIG. 11 may include some or all of the components and/or functionality of the client device 2902. The client device 2902 may comprise, for example, a smartphone.

With reference to FIG. 29, the client device 2902 includes a processor 2904, a memory 2906, a user interface 2908, a communication module 2910, and a dataport 2912. These components are communicatively coupled together by an interconnect bus 2914. The processor 2904 may include any processor used in smartphones and/or portable computing devices, such as an ARM processor (a processor based on the RISC (reduced instruction set computer) architecture developed by Advanced RISC Machines (ARM).). In some embodiments, the processor 2904 may include one or more other processors, such as one or more conventional microprocessors, and/or one or more supplementary co-processors, such as math co-processors.

The memory 2906 may include both operating memory, such as random access memory (RAM), as well as data storage, such as read-only memory (ROM), hard drives, flash memory, or any other suitable memory/storage element. The memory 2906 may include removable memory elements, such as a CompactFlash card, a MultiMediaCard (MMC), and/or a Secure Digital (SD) card. In some embodiments, the memory 2906 may comprise a combination of magnetic, optical, and/or semiconductor memory, and may include, for example, RAM, ROM, flash drive, and/or a hard disk or drive. The processor 2904 and the memory 2906 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 2904 may be connected to the memory 2906 via the dataport 2912.

The user interface 2908 may include any user interface or presentation elements suitable for a smartphone and/or a portable computing device, such as a keypad, a display screen, a touchscreen, a microphone, and a speaker. The communication module 2910 is configured to handle communication links between the client device 2902 and other, external devices or receivers, and to route incoming/outgoing data appropriately. For example, inbound data from the dataport 2912 may be routed through the communication module 2910 before being directed to the processor 2904, and outbound data from the processor 2904 may be routed through the communication module 2910 before being directed to the dataport 2912. The communication module 2910 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 2912 may be any type of connector used for physically interfacing with a smartphone and/or a portable computing device, such as a mini-USB port or an IPHONE®/IPOD® 30-pin connector or LIGHTNING® connector. In other embodiments, the dataport 2912 may include multiple communication channels for simultaneous communication with, for example, other processors, servers, and/or client terminals.

The memory 2906 may store instructions for communicating with other systems, such as a computer. The memory 2906 may store, for example, a program (e.g., computer program code) adapted to direct the processor 2904 in accordance with the present embodiments. The instructions also may include program elements, such as an operating system. While execution of sequences of instructions in the program causes the processor 2904 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 30:
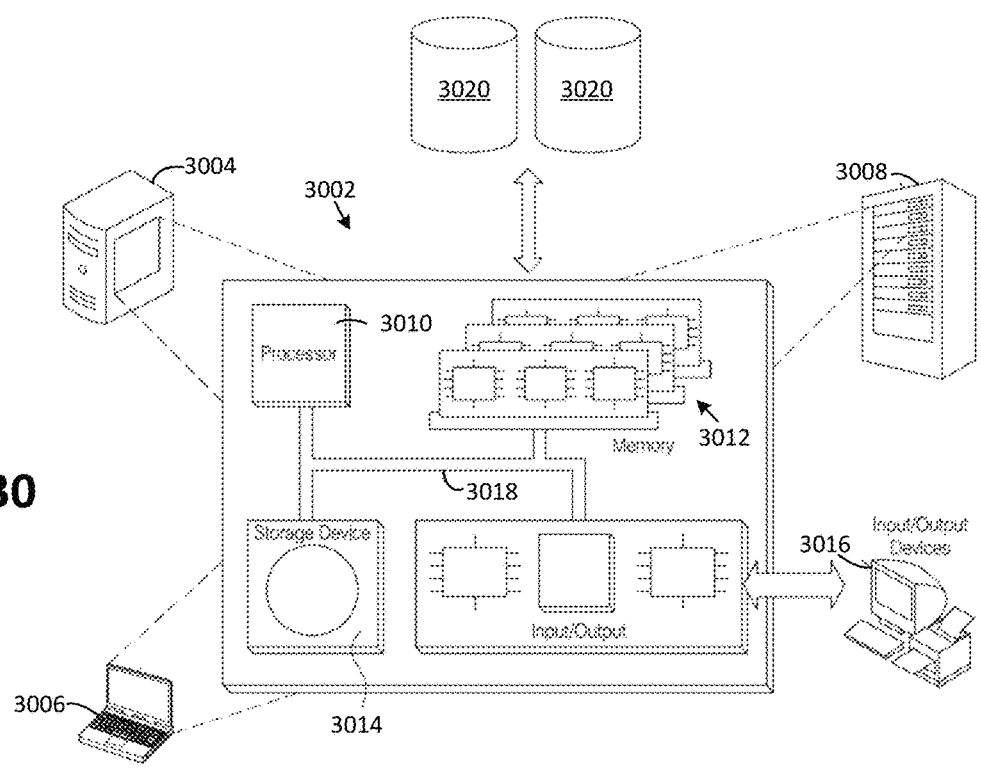
FIG. 30 is a functional block diagram of a general-purpose computing system on which example embodiments may be implemented according to various aspects of present disclosure.

FIG. 30 is a functional block diagram of a general-purpose computing system on which the present embodiments may be implemented according to various aspects of the present disclosure. The computer system 3002 may be embodied in at least one of a personal computer (also referred to as a desktop computer) 3004, a portable computer (also referred to as a laptop or notebook computer) 3006, and/or a server 3008. A server is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 3002 may execute at least some of the operations described above. The computer system 3002 may include at least one processor 3010, memory 3012, at least one storage device 3014, and input/output (I/O) devices 3016. Some or all of the components 3010, 3012, 3014, 3016 may be interconnected via a system bus 3018. The processor 3010 may be single- or multi-threaded and may have one or more cores. The processor 3010 may execute instructions, such as those stored in the memory 3012 and/or in the storage device 3014. Information may be received and output using one or more I/O devices 3016.

The memory 3012 may store information, and may be a computer-readable medium, such as volatile or non-volatile memory. The storage device(s) 3014 may provide storage for the system 3002, and may be a computer-readable medium. In various aspects, the storage device(s) 3014 may be a flash memory device, a hard disk device, an optical disk device, a tape device, or any other type of storage device.

The I/O devices 3016 may provide input/output operations for the system 3002. The I/O devices 3016 may include a keyboard, a pointing device, and/or a microphone. The I/O devices 3016 may further include a display unit for displaying graphical user interfaces, a speaker, and/or a printer. External data may be stored in one or more accessible external databases 3020.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random-access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

Example Clauses

In a first aspect, a method comprises: receiving, from a third-party server, first criminal data representing first criminal statistics from within a first geographic area; storing the first criminal data in one or more databases; receiving, from an audio/video (A/V) recording and communication device, image data generated by a camera of the A/V recording and communication device; receiving, from a first client device associated with the A/V recording and communication device, consent for sharing the image data, the consent including at least information describing a suspicious activity depicted by the image data; storing the image data and the information in the one or more databases; receiving, from at least one of the first client device and a second client device, a criminal statistics request for second criminal statistics, the criminal statistics request indicating a second geographic area that includes at least a portion of the first geographic area; based on the receiving of the criminal statistics request, identifying a portion of the first criminal statistics that occurred within the second geographic area; based on the receiving of the criminal statistics request, determining that a location of the A/V recording and communication device is within the second geographic area; curating the second criminal statistics using at least the portion of the first criminal statistics that occurred within the second geographic area and the information describing the suspicious activity depicted by the image data; and transmitting, to the at least one of the first client device and the second client device, second criminal data representing the second criminal statistics.

In an embodiment of the first aspect, the method further comprises: determining that the first criminal statistics are associated with one or more first criminal categories, and wherein the curating of the second criminal statistics includes at least filtering at least the portion of the first criminal statistics that occurred within the second geographic area and the information describing the suspicious activity depicted by the image data into one or more second criminal categories.

In another embodiment of the first aspect, the criminal statistics request further indicates the one or more second criminal categories for filtering the second criminal statistics.

In another embodiment of the first aspect, the information indicates a criminal category of the one or more second criminal categories, and wherein the curating the second criminal statistics is further based on the information indicating the criminal category.

In another embodiment of the first aspect, the criminal statistics request further indicates a period of time associated with the second criminal statistics, and the method further comprises: determining that the portion of the first criminal statistics occurred during the period of time; and determining that the image data was captured by the A/V recording and communication device during the period of time.

In another embodiment of the first aspect, the criminal statistics request further indicates one or more criminal categories, and the method further comprises: determining that the portion of the first criminal statistics are associated with the one or more criminal categories; and determining, based on the information, that the suspicious activity depicted by the image data is associated with a criminal category of the one or more criminal categories.

In another embodiment of the first aspect, the criminal statistics request further indicates one or more criminal categories, and the method further comprises: analyzing the image data to determine that the image data depicts the suspicious activity; and determining that the suspicious activity is associated with a criminal category of the one or more criminal categories.

In another embodiment of the first aspect, the image data is analyzed using at least one of computer vision processing and image processing.

In another embodiment of the first aspect, the criminal statistics request further indicates a frequency for receiving the second criminal statistics, and the curating of the second criminal statistics is further based on the frequency.

In another embodiment of the first aspect, the criminal statistics request is a first criminal statistics request, and the method further comprises: transmitting, to the at least one of the first client device and the second client device, a notification associated with the second criminal statistics; and receiving, from the at least one of the first client device and the second client device, a second criminal statistics request to view the second criminal statistics, the transmitting of the second criminal data representing the second criminal statistics to the at least one of the first client device and the second client device is based on the receiving of the second criminal statistics request to view the second criminal statistics.

In another embodiment of the first aspect, the receiving the image data from the A/V recording and communication device is via a hub device of a security system.

In another embodiment of the first aspect, the method further comprises: associating the second geographic area with a user profile, the user profile is associated with a user of the A/V recording and communication device; and after the transmitting of the second criminal data representing the second criminal statistics, curating at least third criminal statistics for the user using the second geographic area associated with the user profile.

In a second aspect, a method comprises: receiving first criminal data representing first criminal statistics that occurred within a geographic area; receiving, from an audio/video (A/V) recording and communication device, image data generated by a camera of the A/V recording and communication device; obtaining information describing the image data; determining that a location of the A/V recording and communication device is located within the geographic area; creating second criminal statistics using at least a portion of the first criminal statistics and the information describing the image data; and transmitting, to a client device, second criminal data representing the second criminal statistics.

In an embodiment of the second aspect, the geographic area is a first geographic area, and the method further comprises: determining a second geographic area associated with the second criminal statistics, the second geographic area corresponding to a portion of the first geographic area; and determining that the at least the portion of the first criminal statistics is associated with the second geographic area, the creating of the second criminal statistics using the at least the portion of the first criminal statistics is based on the determining that the at least the portion of the first criminal statistics is associated with the second geographic area.

In another embodiment of the second aspect, the method further comprises: receiving, from the client device, a criminal statistics request for the second criminal statistics, the criminal statistics request indicating the second geographic area.

In another embodiment of the second aspect, the method further comprises: associating the second geographic area with a user profile, the user profile is associated with a user of the A/V recording and communication device, and the determining the second geographic area associated with the second criminal statistic comprises analyzing the user profile to determine the second geographic area associated with the second criminal statistics.

In another embodiment of the second aspect, the method further comprises: determining that the first criminal statistics are associated with one or more first criminal categories, the creating of the second criminal statistics includes at least organizing at least the portion of the first criminal statistics and the information describing the image data into one or more second criminal categories.

In another embodiment of the second aspect, the method further comprises: receiving, from the client device, a criminal statistics request for the second criminal statistics, the criminal statistics request indicating the one or more second criminal categories.

In another embodiment of the second aspect, the information indicates a criminal category of the one or more second criminal categories, and the creating the second criminal statistics is based on the information indicating the criminal category.

In another embodiment of the second aspect, the method further comprises: determining that the portion of the first criminal statistics occurred during a period of time; and determining that the image data was captured by the A/V recording and communication device during the period of time, the creating of the second criminal statistics using at least the portion of the first criminal statistics and the information describing the image data is based on the determining that the portion of the first criminal statistics occurred during the period of time and the determining that the image data was captured by the A/V recording and communication device during the period of time.

In another embodiment of the second aspect, the method further comprises: determining that the portion of the first criminal statistics are associated with one or more criminal categories; and determining, based on the information, that the image data is associated with a criminal category of the one or more criminal categories, the creating of the second criminal statistics using the at least the portion of the first criminal statistics and the information describing the image data is based on the determining that the portion of the first criminal statistics are associated with the one or more criminal categories and the determining that the image data is associated with the criminal category of the one or more criminal categories.

In another embodiment of the second aspect, the method further comprises: analyzing the image data to determine that the image data depicts a suspicious activity, the obtaining of the information comprises generating the information describing the suspicious activity depicted by the image data.

In another embodiment of the second aspect, the method further comprises: determining that the suspicious activity is associated with a criminal category of one or more criminal categories, the creating of the second criminal statistics using the at least the portion of the first criminal statistics and the information describing the image data is based on the determining that the suspicious activity is associated with the criminal category of the one or more criminal categories.

In another embodiment of the second aspect, the image data is analyzed using at least one of computer vision processing and image processing In another embodiment of the second aspect, the method further comprises: determining that a given period of time has passed since creating previous criminal statistics, the creating of the second criminal statistics using the at least the portion of the first criminal statistics and the information describing the image data is based on the determining that the given period of time has passed.

In another embodiment of the second aspect, the method further comprises: transmitting, to the client device, a notification associated with the second criminal statistics; and receiving, from the client device, a request to view the second criminal statistics, the transmitting of the second criminal data representing the second criminal statistics to the client device is based on the receiving of the request to view the second criminal statistics.

In another embodiment of the second aspect, the receiving the image data from the A/V recording and communication device is via a hub device of a security system.

In a third aspect, a method comprises: receiving, from a third-party server, first criminal data representing first criminal statistics that occurred within a first geographic area, the first criminal statistics being organized using one or more first categories associated with one or more first types of crimes; storing the first criminal data in one or more databases; receiving, from a client device, a criminal statistics request for second criminal statistics, the criminal statistics request indicating a second geographic area that corresponds to a portion of the first geographic area; based on the receiving of the criminal statistics request, identifying a portion of the first criminal statistics that occurred within the second geographic area; determining one or more second categories for organizing the second criminal statistics, the one or more second categories being associated with one or more second types of crime; creating the second criminal statistics using the at least the portion of the first criminal statistics that occurred within the second geographic area, the creating including at least organizing the second criminal statistics using the one or more second categories associated with the one or more second types of crimes; and transmitting, to the client device, second criminal data representing the second criminal statistics.

In an embodiment of the third aspect, the method further comprises: receiving, from an audio/video (A/V) recording and communication device, image data generated by the audio/video A/V recording and communication device; and determining that a location of the A/V recording and communication device is located within the second geographic area, the creating of the second criminal statistics further uses the image data.

In another embodiment of the third aspect, the receiving the image data from the A/V recording and communication device is via a hub device of a security system.

In another embodiment of the third aspect, the client device is a first client device, and the method further comprises: receiving, from at least one of the first client device and a second client device, information associated with the image data; and based on the information, determining that the image data is associated with a category of the one or more second categories, the creating the second criminal statistics using the image data comprises creating the second criminal statistics using the information based on the determining that the image data is associated with the category of the one or more second categories.

In another embodiment of the third aspect, the method further comprises: analyzing the image data to determine that the image data depicts a suspicious activity; and determining that the suspicious activity is associated with a category of the one or more second categories, the creating the second criminal statistics using the image data is based on the determining that the image data depicts the suspicious activity that is associated with the category of the one or more second categories.

In another embodiment of the third aspect, the criminal statistics request further indicates the one or more second categories for organizing the second criminal statistics.

In another embodiment of the third aspect, the criminal statistics request further indicates a period of time associated with the second criminal statistics, and the method further comprises: determining that the portion of the first criminal statistics occurred during the period of time.

In another embodiment of the third aspect, the criminal statistics request further indicates a frequency for receiving the second criminal statistics, and the creating of the second criminal statistics is based on the frequency.

In another embodiment of the third aspect, the method further comprises: transmitting, to the client device, a notification associated with the second criminal statistics; and receiving, from the client device, a request to view the second criminal statistics, the transmitting of the second criminal data representing the second criminal statistics to the client device is based on the receiving of the request to view the second criminal statistics.

In another embodiment of the third aspect, the method further comprises: associating the second geographic area with a user profile, the user profile is associated with a user; and after the transmitting of the second criminal data representing the second criminal statistics, creating at least third criminal statistics for the user using the second geographic area associated with the user profile.

In a fourth aspect, a method comprises: receiving, from a third-party source, first criminal data representing first criminal statistics that occurred within a first geographic area, the first criminal statistics being organized using one or more first categories; identifying a portion of the first criminal statistics that occurred within a second geographic area; determining one or more second categories for organizing the at least the portion of the first criminal statistics that occurred within the second geographic area; creating second criminal statistics using the portion of the first criminal statistics that occurred within the second geographic area, the second criminal statistics being organized using the one or more second categories; and transmitting, to a client device, second criminal data representing the second criminal statistics.

In an embodiment of the fourth aspect, the method further comprises: receiving, from the client device, a criminal statistics request for the second criminal statistics, the criminal statistics request indicating at least one of the second geographic location and the one or more second categories.

In another embodiment of the fourth aspect, the method further comprises: receiving, from an audio/video (A/V) recording and communication device, image data generated by the A/V recording and communication device; and determining that a location of the A/V recording and communication device is located within the second geographic area, the creating of the second criminal statistics further uses the image data.

In another embodiment of the fourth aspect, the receiving the image data from the A/V recording and communication device is via a hub device of a security system.

In another embodiment of the fourth aspect, the client device is a first client device, and the method further comprises: receiving, from at least one of the first client device and a second client device, information associated with the image data; and based on the information, determining that the image data is associated with a category of the one or more second categories, the creating the second criminal statistics using the image data comprises creating the second criminal statistics using the information based on the determining that the image data is associated with the category of the one or more second categories.

In another embodiment of the fourth aspect, the method further comprises: analyzing the image data to determine that the image data depicts a suspicious activity; and determining that the suspicious activity is associated with a category of the one or more second categories, the creating the second criminal statistics using the image data is based on the determining that the image data depicts the suspicious activity that is associated with the category of the one or more second categories.

In another embodiment of the fourth aspect, the method further comprises: determining that the portion of the first criminal statistics occurred during a period of time, the creating second criminal statistics using the portion of the first criminal statistics is further based on the determining that the portion of the first criminal statistics occurred during the period of time.

In another embodiment of the fourth aspect, the method further comprises: determining that a given period of time has passed since creating previous criminal statistics, the creating of the second criminal statistics using the at least the portion of the first criminal statistics is based on the determining that the given period of time has passed.

In another embodiment of the fourth aspect, the method further comprises: transmitting, to the client device, a notification associated with the second criminal statistics; and receiving, from the client device, request to view the second criminal statistics, the transmitting of the second criminal data representing the second criminal statistics to the client device is based on the receiving of the request to view the second criminal statistics.

In another embodiment of the fourth aspect, the method further comprises: associating the second geographic area with a user profile, the user profile is associated with a user; and creating at least third criminal statistics for the user using the second geographic area associated with the user profile.

In a fifth aspect, a method is implemented by a client device that includes a display, a communication module, and a processor, the method comprising: causing, by the processor, a graphical user interface (GUI) to be displayed on the display, the GUI for requesting criminal statistics; receiving, by the processor, a first input indicating a location; based on the receiving of the first input, causing, by the processor, a map of a first geographic area that is associated with the location to be displayed on the GUI; receiving, by the processor, a second input indicating a second geographic area, the second geographic area including a portion of the first geographic area; based on the receiving of the second input, causing, by the processor, an indication of the second geographic area to be displayed on the GUI; receiving, by the processor, a third input associated with requesting the criminal statistics associated with the second geographic area; based on the receiving of the third input, transmitting, by the processor and using the communication module, a criminal statistics request to a network device, the criminal statistics request indicating at least the second geographic area; receiving, by the processor and using the communication module, and from the network device, first criminal data representing the criminal statistics, the criminal statistics being based on second criminal data associated with the second geographic area and information describing image data captured by one or more audio/video (A/V) recording and communication devices located within the second geographic area; and based on the receiving of the crime first data, causing, by the processor, at least a portion of the criminal statistics to be displayed on the display.

In an embodiment of the fifth aspect, the method further comprises: receiving, using the processor, a fourth input indicating a period of time associated with the criminal statistics, the criminal statistics request further indicates the period of time, and the criminal statistics are associated with criminal reports that correspond to the period of time.

In another embodiment of the fifth aspect, the method further comprises: receiving, using the processor, a fourth input indicating one or more criminal categories associated with the criminal statistics, the criminal statistics request further indicates the one or more criminal categories, and the at least the portion of the criminal statistics are further displayed on the display based on the one or more criminal categories.

In another embodiment of the fifth aspect, the method further comprises: receiving, using the processor, a fourth input indicating a frequency for receiving the criminal statistics, the criminal statistics request further indicates the frequency.

In another embodiment of the fifth aspect, the method further comprises: causing, by the processor, one or more first indicators to be displayed on the display, the one or more indicators illustrating locations of criminal reports that are associated with the at least the portion of the criminal statistics; and causing, by the processor, a second indicator to be displayed on the display, the second indicator illustrating a location associated with the image data.

In another embodiment of the fifth aspect, the method further comprises: receiving, using the processor, a fourth input indicating a selection of a first indicator of the one or more first indicators, the first indicator corresponding to a criminal report associated with the at least the portion of the criminal statistics; and based on the receiving of the fourth input, causing, by the processor, information associated with the criminal report to be displayed on the display.

In another embodiment of the fifth aspect, the method further comprises: receiving, using the processor, a fourth input indicating a selection of the second indicator associated with the image data; and based on the receiving of the fourth input, causing, by the processor, the image data to be displayed on the display.

In another embodiment of the fifth aspect, the at least the portion of the criminal statistics is a first portion of the criminal statistics, and the method further comprises: receiving, by the processor, a fourth input to view a second portion of the criminal statistics; and causing, by the processor, the second portion of the criminal statistics to be displayed on the display.

In another embodiment of the fifth aspect, the causing the at least the portion of the criminal statistics to be displayed on the display comprise causing, by the processor, the at least the portion of the criminal statistics to be displayed on the map of the first geographic area.

In another embodiment of the fifth aspect, the criminal statistics request is a first criminal statistics request, and the method further comprises: receiving, by the processor and using the communication module, a notification from the network device, the notification indicating that the criminal statistics are available; receiving, by the processor, a fourth input associated with viewing the criminal statistics; and transmitting, by the processor and using the communication module, and to the network device, a second criminal statistics request to view the criminal statistics, the receiving of the first criminal data representing the criminal statistics is based on the transmitting of the second criminal statistics request to view the criminal statistics.

In a sixth aspect, a computer program product is provided, the computer program product embodied in code executable by a processor, which when executed causes the processor to perform operations comprising: causing a graphical user interface (GUI) to be displayed on a display, the GUI for requesting criminal statistics; receiving a first input indicating a location; based on the receiving of the first input, causing a map of a first geographic area that is associated with the location to be displayed on the GUI; receiving a second input indicating a second geographic area, the second geographic area including a portion of the first geographic area; based on the receiving of the second input, causing an indication of the second geographic area to be displayed on the GUI; receiving a third input indicating one or more criminal categories associated with the criminal statistics; transmitting a criminal statistics request to a network device, the criminal statistics request indicating at least the second geographic area and the one or more criminal categories; and based on the transmitting of the criminal statistics request, receiving, from the network device, first criminal data representing the criminal statistics, the criminal statistics being based on: second criminal data representing one or more criminal reports associated with the one or more criminal categories, the one or more criminal reports being associated with the second geographic area; and information describing image data captured by one or more audio/video (A/V) recording and communication devices located within the second geographic area.

In an embodiment of the sixth aspect, the operations further comprising: causing at least a portion of the criminal statistics to be displayed on the display.

In another embodiment of the sixth aspect, the operations further comprising: causing an indicator associated with a criminal report of the one or more criminal reports to be displayed on the map, the indicator is displayed at a location on the map that corresponds to a location associated with the criminal report.

In another embodiment of the sixth aspect, the operations further comprising: causing at least an indicator associated with a criminal category of the one or more criminal categories to be displayed on the display; and causing a value to be displayed on the display, the value corresponding to a number of criminal reports that correspond to the criminal category.

In another embodiment of the sixth aspect, the operations further comprising: receiving a fourth input indicating a period of time associated with the criminal statistics, the criminal statistics request further indicates the period of time, and the one or more criminal reports are associated with the period of time.

In another embodiment of the sixth aspect, the operations further comprising: receiving a fourth input indicating a frequency for receiving the criminal statistics, the criminal statistics request further indicates the frequency.

In another embodiment of the sixth aspect, the operations further comprising: causing indicators to be displayed on the display, the indicators depicting locations of at least a portion of the one or more criminal reports and a location associated with image data captured by an A/V recording and communication device of the one or more A/V recording and communication devices.

In another embodiment of the sixth aspect, the operations further comprising: receiving a fourth input indicating a selection of a criminal report of the one or more criminal reports; and based on the receiving of the fourth input, causing information associated with the criminal report to be displayed on the display.

In another embodiment of the sixth aspect, the operations further comprising: receiving a fourth input indicating a selection of an icon associated with the image data captured by an A/V recording and communication device of the one or more A/V recording and communication devices; and based on the receiving of the fourth input, causing the image data to be displayed on the display.

In another embodiment of the sixth aspect, the operations further comprising: causing a first portion of the criminal statistics to be displayed on the display; receiving a fourth input to view a second portion of the criminal statistics; and causing the second portion of the criminal statistics to be displayed on the display.

In another embodiment of the sixth aspect, the criminal statistics request is a first criminal statistics request, and the operations further comprise: receiving a notification from the backend device, the notification indicating that the criminal statistics are available; receiving a fourth input associated with viewing the criminal statistics; and transmitting, to the network device, a second criminal statistics request to view the criminal statistics, the receiving of the first criminal data representing the criminal statistics is based on the transmitting of the second criminal statistics request to view the criminal statistics.

In a seventh aspect, a method is implemented by a client device that includes a display, a communication module, and a processor, the method comprising: causing, by the processor, a graphical user interface (GUI) to be displayed on the display, the GUI for requesting criminal statistics; receiving, by the processor, a first input indicating a location; based on the receiving of the first input, causing, by the processor, a map of a first geographic area that is associated with the location to be displayed on the GUI; receiving, by the processor, a second input indicating a second geographic area, the second geographic area including a portion of the first geographic area; transmitting, by the processor and using the communication module, a criminal statistics request to a network device, the criminal statistics request indicating at least the second geographic area; based on the transmitting of the criminal statistics request, receiving, by the processor and using the communication module, and from the network device, first criminal data representing the criminal statistics, the criminal statistics being based on second criminal data associated with the second geographic area; and causing, by the processor, at least a portion of the criminal statistics to be displayed on the display.

In an embodiment of the seventh aspect, the method further comprises: based on the receiving of the second input, causing, by the processor, an indication of the second geographic area to be displayed on the map.

In another embodiment of the seventh aspect, the method further comprises: receiving, using the processor, a third input indicating a period of time associated with the criminal statistics, the criminal statistics request further indicates the period of time, and the criminal statistics are associated with criminal reports that correspond to the period of time.

In another embodiment of the seventh aspect, the method further comprises: receiving, using the processor, a third input indicating one or more criminal categories associated with the criminal statistics, the criminal statistics request further indicates the one or more criminal categories, and the at least the portion of the criminal statistics are further displayed on the display based on the one or more criminal categories.

In another embodiment of the seventh aspect, the method further comprises: receiving, using the processor, a third input indicating a frequency for receiving the criminal statistics, the criminal statistics request further indicates the frequency.

In another embodiment of the seventh aspect, the method further comprises: causing, by the processor, one or more indicators to be displayed on the display, the one or more indicators illustrating locations of criminal reports that are associated with the at least the portion of the criminal statistics.

In another embodiment of the seventh aspect, the method further comprises: receiving, using the processor, a third input indicating a selection of a criminal report associated with the at least the portion of the criminal statistics; and based on the receiving of the third input, causing, by the processor, information associated with the criminal report to be displayed on the display.

In another embodiment of the seventh aspect, the criminal statistics are further based on information describing image data captured by one or more audio/video (A/V) recording and communication devices located within the second geographic location.

In another embodiment of the seventh aspect, the method further comprises: receiving, using the processor, a third input indicating a selection of an icon associated with the image data; and based on the receiving of the third input, causing, by the processor, the image data to be displayed on the display.

In another embodiment of the seventh aspect, the at least the portion of the criminal statistics is a first portion of the criminal statistics, and the method further comprises: receiving, by the processor, a third input to view a second portion of the criminal statistics; and causing, by the processor, the second portion of the criminal statistics to be displayed on the display.

In another embodiment of the seventh aspect, the causing the at least the portion of the criminal statistics to be displayed on the display comprise causing, by the processor, the at least the portion of the criminal statistics to be displayed on the map of the first geographic area.

In another embodiment of the seventh aspect, the criminal statistics request is a first criminal statistics request, and the method further comprises: receiving, by the processor and using the communication module, a notification from the network device, the notification indicating that the criminal statistics are available; receiving, by the processor, a third input associated with viewing the criminal statistics; and transmitting, by the processor and using the communication module, a second criminal statistics request to view the criminal statistics to the network device, the receiving of the first criminal data representing the criminal statistics is based on the transmitting of the second criminal statistics request to view the criminal statistics.

In an eighth aspect, a computer program product is provided, the computer program product embodied in code executable by a processor, which when executed causes the processor to perform operations comprising: causing a graphical user interface (GUI) to be displayed on a display, the GUI for requesting criminal statistics; receiving a first input indicating a location; based on the receiving of the first input, causing a map of a geographic area that is associated with the location to be displayed on the GUI; receiving a second input indicating one or more criminal categories; transmitting a criminal statistics request to a network device, the criminal statistics request indicating at least a portion of the geographic area and the one or more criminal categories; and based on the transmitting of the criminal statistics request, receiving, from the network device, first criminal data representing the criminal statistics, the criminal statistics being based on: second criminal data representing one or more criminal reports associated with the one or more criminal categories; and information describing image data captured by one or more audio/video (A/V) recording and communication devices located within the at least the portion of the geographic area.

In an embodiment of the eighth aspect, the operations further comprising: causing at least a portion of the criminal statistics to be displayed on the display.

In another embodiment of the eighth aspect, the operations further comprising: receiving a third input indicating a second geographic area, the second geographic area including a portion of the first geographic area; and causing an indication of the second geographic area to be displayed on the map, the at least the portion of the geographic area indicated by the criminal statistics request is the second geographic area.

In another embodiment of the eighth aspect, the operations further comprising: causing an indicator associated with a criminal report of the one or more criminal reports to be displayed on the map, the indicator is displayed at a location on the map that corresponds to a location associated with the criminal report.

In another embodiment of the eighth aspect, the operations further comprising: causing at least an indicator associated with a criminal category of the one or more criminal categories to be displayed on the display; and causing a value to be displayed on the display, the value corresponding to a number of criminal reports that correspond to the criminal category.

In another embodiment of the eighth aspect, the operations further comprising: receiving a third input indicating a period of time associated with the criminal statistics, the criminal statistics request further indicates the period of time, and the one or more criminal reports and the information are associated with the period of time.

In another embodiment of the eighth aspect, the operations further comprising: receiving a third input indicating a frequency for receiving the criminal statistics, the criminal statistics request further indicates the frequency.

In another embodiment of the eighth aspect, the operations further comprising: causing one or more first indicators to be displayed on the display, the one or more first indicators depicting locations of at least a portion of the one or more criminal reports; and causing a second indictor to be displayed on the display, the second indicator depicting a location associated with the image data captured by an A/V recording and communication device of the one or more A/V recording and communication devices.

In another embodiment of the eighth aspect, the operations further comprising: receiving a third input indicating a selection of a criminal report of the one or more criminal reports; and based on the receiving of the third input, causing information associated with the criminal report to be displayed on the display.

In another embodiment of the eighth aspect, the operations further comprising: receiving a third input indicating a selection of an icon associated with the image data; and based on the receiving of the third input, causing the image data to be displayed on the display.

In another embodiment of the eighth aspect, the operations further comprising: causing a first portion of the criminal statistics to be displayed on the display; receiving a third input to view a second portion of the criminal statistics; and causing the second portion of the criminal statistics to be displayed on the display.

In another embodiment of the eighth aspect, the criminal statistics request is a first criminal statistics request, and the operations further comprise: receiving a notification from the backend device, the notification indicating that the criminal statistics are available; receiving a third input associated with viewing the criminal statistics; and transmitting, to the network device, a second criminal statistics request to view the criminal statistics, the receiving of the first criminal data representing the criminal statistics is based on the transmitting of the second criminal statistics request to view the criminal statistics.

In a ninth aspect, a method comprises: receiving, from a third-party server, first criminal data representing first criminal statistics from within a first geographic area; storing the first criminal data in one or more databases; receiving, from an audio/video (A/V) device, image data generated by the A/V device; receiving, from a first client device associated with the A/V device, consent data representing consent for sharing the image data, the consent including at least information describing a suspicious activity depicted by the image data; storing the image data in the one or more databases; receiving, from a second client device, request data representing a request for second criminal statistics, the request indicating a second geographic area that includes at least a portion of the first geographic area; after receiving the request data, identifying a portion of the first criminal statistics that occurred within the second geographic area; determining that a location of the A/V device is within the second geographic area; generating the second criminal statistics using at least the portion of the first criminal statistics that occurred within the second geographic area and the information describing the suspicious activity depicted by the image data; and transmitting, to the second client device, second criminal data representing the second criminal statistics.

In an embodiment of the ninth aspect, wherein the request further indicates a period of time associated with the second criminal statistics, and wherein the method further comprises: determining that the portion of the first criminal statistics occurred during the period of time; and determining that the image data was captured by the A/V device during the period of time.

In another embodiment of the ninth aspect, wherein the request further indicates one or more criminal categories, and wherein the method further comprises: determining that the portion of the first criminal statistics are associated with the one or more criminal categories; and determining, using the information, that the suspicious activity depicted by the image data is associated with a criminal category of the one or more criminal categories.

In a tenth aspect, a method comprises: storing first data representing first criminal statistics that occurred within a geographic area; storing image data generated by an electronic device; storing information describing the image data; determining that a location of the electronic device is within the geographic area; generating second data representing second criminal statistics, the second criminal statistics including at least a portion of the first criminal statistics and the information describing the image data; and transmitting the second data to a client device.

In an embodiment of the tenth aspect, wherein the geographic area is a first geographic area, and wherein the method further comprises: determining a second geographic area associated with the second criminal statistics, the second geographic area including at least a portion of the first geographic area; and determining that the at least the portion of the first criminal statistics occurred within the second geographic area, wherein determining that the location of the electronic device is within the geographic area comprises determining that the location of the electronic device is within the second geographic area.

In another embodiment of the tenth aspect, the method further comprising receiving, from the client device, third data representing a request for the second criminal statistics, the request indicating the second geographic area.

In another embodiment of the tenth aspect, the method further comprising: associating the second geographic area with user profile data, wherein the user profile data is associated with the client device, wherein determining the second geographic area associated with the second criminal statistics comprises determining that the user profile data is associated with the second geographic area.

In another embodiment of the tenth aspect, the method further comprising: receiving third data representing consent for sharing the image data with a geographic network; and determining, using the third data representing the consent, to include the image data in the second criminal statistics.

In another embodiment of the tenth aspect, the method further comprising: determining that the first criminal statistics are associated with one or more first criminal categories, wherein the second data organizes the at least the portion of the first criminal statistics and the information into one or more second criminal categories.

In another embodiment of the tenth aspect, the method further comprising: receiving, from the client device, third data representing a request for the second criminal statistics, the request indicating one or more criminal categories, wherein the second data organizes the at least the portion of the first criminal statistics and the information into the one or more categories.

In another embodiment of the tenth aspect, the method further comprising: determining at least a category associated with the second criminal statistics; determining that the information indicates the category; and after determining that the information indicates the category, determining to include the information in the second criminal statistics.

In another embodiment of the tenth aspect, the method further comprising: determining a period of time associated with the second criminal statistics; determining that the at least the portion of the first criminal statistics occurred during the period of time; and determining that the electronic device generated the image data during the period of time.

In another embodiment of the tenth aspect, the method further comprising: analyzing the image data; determining that the image data depicts a suspicious activity; and generating the information describing the image data, the information indicating at least the suspicious activity depicted by the image data.

In another embodiment of the tenth aspect, the method further comprising: determining that a given period of time has elapsed since generating third criminal statistics; wherein generating the second criminal statistics occurs after the given period of time has elapsed.

In another embodiment of the tenth aspect, the method further comprising: transmitting, to the client device, third data representing a notification associated with the second criminal statistics; and receiving, from the client device, fourth data representing a request for the second criminal statistics, wherein transmitting the second data to the client device occurs after receiving the fourth data.

In another embodiment of the tenth aspect, the method further comprising: receiving, from the client device, third data representing a request for the image data; and sending the image data to the client device.

In an eleventh aspect, a system comprises: one or more processors; and one or more computer-readable media storing instructions that, when executed by the one or more processors, cause the one or more processors to perform operations comprising: storing first data representing first criminal statistics that occurred within a geographic area; storing image data generated by an electronic device; receiving, from a first client device, information associated with the image data; generating second data representing second criminal statistics, the second criminal statistics including at least a portion of the first criminal statistics and the information describing the image data; and transmitting the second data to a second client device.

In an embodiment of the eleventh aspect, the one or more computer-readable media storing further instructions that, when executed by the one or more processors, cause the one or more processors to perform further operations comprising: determining that the electronic device is located within the geographic area; and determining to include the information describing the image data within the second criminal statistics.

In another embodiment of the eleventh aspect, wherein the geographic area is a first geographic area, and wherein the one or more computer-readable media store further instructions that, when executed by the one or more processors, cause the one or more processors to perform further operations comprising: determining a second geographic area associated with the second criminal statistics, the second geographic area including at least a portion of the first geographic area; and determining that the at least the portion of the first criminal statistics occurred within the second geographic area; and determining that the electronic device is located within the second geographic area.

In another embodiment of the eleventh aspect, the one or more computer-readable media storing further instructions that, when executed by the one or more processors, cause the one or more processors to perform further operations comprising: determining a period of time associated with the second criminal statistics; determining that the at least the portion of the first criminal statistics occurred during the period of time; and determining that the electronic device generated the image data during the period of time.

What is claimed is:

1. A method comprising:
   receiving location data associated with a first audio/video (A/V) device, the location data representing at least a first location;
   receiving, from a user device associated with the first A/V device, an indication of a first geographic area that includes the first location;
   sending, to the user device, first data representing first criminal statistics associated with the first geographic area;
   receiving, from one or more computing devices, second data representing second criminal statistics associated with a second geographic area;
   determining that a period of time has elapsed since the sending of the first data to the user device;
   based at least in part on the period of time elapsing, determining that a portion of the second criminal statistics is associated with the first geographic area, the portion of the second criminal statistics representing at least:
      a criminal category; and
      a first number of incidents, associated with the criminal category, that occurred within the first geographic area during the period of time;
   and
   sending, to the user device, third data representing at least the portion of the second criminal statistics.

2. A method comprising:
   storing first data representing first criminal statistics;
   receiving location data associated with an electronic device;
   storing image data generated by the electronic device;
   storing information describing the image data;
   determining, based at least in part on the first data, a first number of incidents, associated with a criminal category, that have occurred within a geographic area;
   determining, based at least in part on the location data, that a location of the electronic device is within the geographic area;
   determining, based at least in part on the information, that the image data is associated with the criminal category;
   determining, based at least in part on the first number of incidents and the image data being associated with the criminal category, a second number of incidents, associated with the criminal category, that have occurred within the geographic area;
   generating second criminal statistics that include at least the second number of incidents; and
   sending, to a user device, second data representing the second criminal statistics.

3. The method of claim 2, further comprising receiving, from the user device, a request for the second criminal statistics, the request indicating the geographic area.

4. The method of claim 2, further comprising:
associating the geographic area with user profile data, wherein the user profile data is associated with the user device; and
determining the geographic area based at least in part on the user profile data.

5. The method of claim 2, further comprising:
receiving consent for sharing the image data; and
determining, using the consent, to include the information describing the image data in the second criminal statistics.

6. The method of claim 2, further comprising:
determining that the first criminal statistics are associated with the criminal category,
wherein the second criminal statistics are also associated with the criminal category.

7. The method of claim 2, further comprising:
receiving, from the user device, a request for the second criminal statistics, the request indicating the criminal category,
wherein the second criminal statistics are associated with the criminal category.

8. The method of claim 2, further comprising:
determining a period of time associated with the second criminal statistics;
determining that the first number of incidents occurred during the period of time; and
determining that the electronic device generated the image data during the period of time.

9. The method of claim 2, further comprising:
analyzing the image data;
determining that the image data represents a suspicious activity; and
generating the information describing the image data, the information indicating at least the suspicious activity represented by the image data.

10. The method of claim 2, further comprising:
determining that a given period of time has elapsed since generating third criminal statistics,
wherein the generating of the second criminal statistics is based at least in part on the given period of time elapsing.

11. The method of claim 2, further comprising:
sending, to the user device, a notification associated with the second criminal statistics; and
receiving, from the user device, a request for the second criminal statistics,
wherein the sending of the second data to the user device is based at least in part on the receiving of the request.

12. A system comprising:
one or more processors; and
one or more computer-readable media storing instructions that, when executed by the one or more processors, cause the one or more processors to perform operations comprising:
   receiving location data associated with a first audio/video (A/V) device, the location data representing at least a first location;
   receiving, from a user device associated with the first A/V device, an indication of a geographic area that includes the first location;
   generating first criminal statistics associated with the geographic area;
   sending, to the user device, first data representing first criminal statistics;
   storing second data representing second criminal statistics;

determining that a period of time has elapsed since the generating of the first criminal statistics;

determining, based at least in part on the second data, a portion of the second criminal statistics that are associated with the geographic area, the portion of the second criminal statistics representing a first number of incidents, associated with a criminal category, that have occurred within the geographic area during the period of time; and sending, to the user device, third data representing the portion of the second criminal statistics.

13. The system as recited in claim 12, one or more computer-readable media storing further instructions that, when executed by the one or more processors, cause the one or more processors to perform further operations comprising, receiving, from the user device, a request for the second criminal statistics.

14. The method as recited in claim 1, further comprising:
receiving image data generated by a second A/V device;
determining that a second location associated with the second A/V device is within the first geographic area; and
sending the image data to the user device.

15. The method as recited in claim 1, further comprising:
receiving image data generated by a second A/V device;
determining that the image data is associated with the criminal category;
determining, based at least in part on the first number of incidents and the image data being associated with the criminal category, a second number of incidents, associated with the criminal category, that occurred within the first geographic area during the period of time; and
generating the third data, the third data representing the second number of incidents.

16. The method as recited in claim 1, further comprising:
storing user profile data, the user profile data associated with the location data; and
based at least in part on the receiving of the indication, associating the first geographic area with the user profile data.

17. The method as recited in claim 1, further comprising:
sending, to the user device, a notification associated with the portion of the second criminal statistics; and
receiving, from the user device, a request for the portion of the second criminal statistics,
and wherein the sending of the third data is based at least in part on the receiving of the request.

18. The system as recited in claim 12, one or more computer-readable media storing further instructions that, when executed by the one or more processors, cause the one or more processors to perform further operations comprising:
receiving image data generated by a second A/V device;
determining that a second location associated with the second A/V device is within the geographic area; and
sending the image data to the user device.

19. The system as recited in claim 12, one or more computer-readable media storing further instructions that, when executed by the one or more processors, cause the one or more processors to perform further operations comprising:
receiving image data generated by a second A/V device;
determining that the image data is associated with the criminal category;
determining, based at least in part on the first number of incidents and the image data being associated with the criminal category, a second number of incidents, associated with the criminal category, that occurred within the geographic area during the period of time; and
generating the third data, the third data representing the second number of incidents.

\* \* \* \* \*